(12) United States Patent
Shin et al.

(10) Patent No.: US 11,804,086 B2
(45) Date of Patent: *Oct. 31, 2023

(54) METHOD AND SYSTEM FOR MANAGING DOOR ACCESS USING BEACON SIGNAL

(71) Applicant: SUPREMA INC., Seongnam-si (KR)

(72) Inventors: Dong Mok Shin, Seongnam-si (KR); Seong Bin Choi, Seongnam-si (KR); Jae Won Lee, Seongnam-si (KR)

(73) Assignee: SUPREMA INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,355

(22) Filed: Jun. 28, 2022

(65) Prior Publication Data
US 2022/0335759 A1 Oct. 20, 2022

Related U.S. Application Data

(63) Continuation of application No. 16/930,290, filed on Jul. 15, 2020, now Pat. No. 11,373,468, which is a
(Continued)

(30) Foreign Application Priority Data

Feb. 29, 2016 (KR) .................. 10-2016-0024430
Feb. 29, 2016 (KR) .................. 10-2016-0024437
(Continued)

(51) Int. Cl.
*G07C 9/00* (2020.01)
*G07C 9/28* (2020.01)

(52) U.S. Cl.
CPC ..... *G07C 9/00309* (2013.01); *G07C 9/00563* (2013.01); *G07C 9/00571* (2013.01);
(Continued)

(58) Field of Classification Search
CPC .. G07C 9/00309; G07C 9/28; G07C 9/00563; G07C 9/00571; G07C 2009/00769; G07C 2209/63
See application file for complete search history.

(56) References Cited

U.S. PATENT DOCUMENTS

2002/0183882 A1 12/2002 Dearing et al.
2008/0290990 A1 11/2008 Schaffzin et al.
(Continued)

FOREIGN PATENT DOCUMENTS

CN 103544757 A 1/2014
CN 103971435 A 8/2014
(Continued)

OTHER PUBLICATIONS

Korean Office Action issued in corresponding application No. 10-2016-0024430, dated Mar. 3, 2021.
(Continued)

*Primary Examiner* — Sisay Yacob
(74) *Attorney, Agent, or Firm* — Maschoff Brennan

(57) ABSTRACT

A method and system allow management of access to a door using a beacon signal. A user access authority determination unit controls access of a user to a target door based beacon data from beacons installed near a door. The user carries a terminal that obtains the beacon data based on a proximity to the beacons. The method includes identifying the target door based on identification information of the beacons extracted from the beacon data. A type of user movement is determined. The type of user movement includes an entering movement that the user enters into an inner side from an outer side through the target door and an exiting movement that the user exits the inner side to the outer side through the target door. An access authentication process to be per-
(Continued)

formed to unlock the target door is determined according to the determined type of user movement.

34 Claims, 54 Drawing Sheets

Related U.S. Application Data continuation of application No. 16/201,272, filed on Nov. 27, 2018, now Pat. No. 10,755,503, which is a continuation of application No. 15/715,010, filed on Sep. 25, 2017, now Pat. No. 10,192,378, which is a continuation of application No. 15/233,937, filed on Aug. 10, 2016, now Pat. No. 9,805,533.

(60) Provisional application No. 62/258,964, filed on Nov. 23, 2015.

(30) Foreign Application Priority Data

| Feb. 29, 2016 | (KR) | 10-2016-0024445 |
| Feb. 29, 2016 | (KR) | 10-2016-0024450 |
| Feb. 29, 2016 | (KR) | 10-2016-0024458 |
| Feb. 29, 2016 | (KR) | 10-2016-0024461 |
| Feb. 29, 2016 | (KR) | 10-2016-0024463 |
| May 23, 2016 | (KR) | 10-2016-0062937 |

(52) U.S. Cl.
CPC ..... *G07C 9/28* (2020.01); *G07C 2009/00769* (2013.01); *G07C 2209/63* (2013.01)

(56) References Cited

U.S. PATENT DOCUMENTS

| 2011/0218709 | A1 | 9/2011 | Hermann |
| 2012/0256197 | A1 | 10/2012 | Matsuhisa et al. |
| 2014/0049361 | A1 | 2/2014 | Ahearn et al. |
| 2014/0125453 | A1* | 5/2014 | McIntyre ............ G07C 9/00309 340/5.7 |
| 2015/0294517 | A1 | 10/2015 | Herrala |
| 2016/0055689 | A1* | 2/2016 | Raina ................. G07C 9/15 340/5.7 |
| 2016/0055690 | A1* | 2/2016 | Raina ................. H04W 40/244 340/5.61 |
| 2016/0055693 | A1* | 2/2016 | Somani ............... G07C 9/28 340/5.61 |
| 2016/0055697 | A1* | 2/2016 | Raina ................. G07C 9/15 340/5.7 |
| 2016/0163137 | A1* | 6/2016 | Strulovitch ........ G07C 9/00309 340/5.61 |
| 2022/0031588 | A1 | 3/2022 | Schott et al. |
| 2022/0335759 | A1 | 10/2022 | Shin et al. |

FOREIGN PATENT DOCUMENTS

| CN | 104050743 A | 9/2014 |
| CN | 104063930 A | 9/2014 |
| CN | 104063931 A | 9/2014 |
| CN | 104537735 A | 4/2015 |
| CN | 104809791 A | 7/2015 |
| JP | 2006-343886 A | 12/2006 |
| JP | 2008-14001 A | 1/2008 |
| JP | 2010-165111 A | 7/2010 |
| JP | 2010-272935 A | 12/2010 |
| JP | 2011-074633 A | 4/2011 |
| JP | 2011-179314 A | 9/2011 |
| JP | 2012-208661 A | 10/2012 |
| JP | 2013-044169 A | 3/2013 |
| JP | 2013-204233 A | 10/2013 |
| JP | 2014-522924 A | 9/2014 |
| KR | 10-2005-0020388 A | 3/2005 |
| KR | 10-2005-0106339 A | 11/2005 |
| KR | 10-2006-0133176 A | 12/2006 |
| KR | 10-2008-0016733 A | 2/2008 |
| KR | 10-2010-0035730 A | 4/2010 |
| KR | 10-2012-0101894 A | 9/2012 |
| KR | 10-1274617 B1 | 2/2013 |
| KR | 10-2013-0047082 A | 5/2013 |
| KR | 10-1236581 B1 | 6/2013 |
| KR | 10-2014-0070220 A | 6/2014 |
| KR | 10-1545953 B1 | 8/2015 |
| KR | 10-2015-0107151 A | 9/2015 |
| KR | 102208552 B1 | 1/2021 |
| KR | 102368733 B1 | 3/2022 |
| KR | 20220031588 A | 3/2022 |

OTHER PUBLICATIONS

Korean Office Action issued in corresponding application No. 10-2016-0024445, dated Mar. 3, 2021.
Korean Office Action issued in corresponding application No. 10-2016-0024437, dated Mar. 3, 2021.
Japanese Notice of Allowance issued in corresponding application No. 2018-520442, dated Jan. 19, 2021.
European Search Report in application No. 16868869.5 dated Oct. 1, 2018.
International Search Report in application No. PCT/KR2016/013537 dated Feb. 27, 2017.
JP Notice of Rejection Reason in application No. 2018-520442 dated Jun. 25, 2019.
JP Office Action in Application No. 2018-520442 dated Jan. 7, 2020.
CN Office Action in Application No. 201680068484.0 dated Mar. 23, 2020.
CN Office Action in Application No. 201680068484.0 dated Oct. 21, 2020.
Notice of Allowance in Application No. 10-2022-0023972 dated Oct. 27, 2022.
CN Office Action in Application No. 201680068484.0 dated Jul. 16, 2021.
JP Office Action in Application No. 2020-186194 dated Oct. 19, 2021.
KR Notice of Allowance in Application No. 10-2016-0024461 dated Nov. 23, 2021.
KR Notice of Allowance in Application No. 10-2016-0024461 dated Nov. 24, 2021.
KR Office Action in Application No. 10-2021-0152690 dated Dec. 1, 2021.
CN Office Action in Application No. 201680068484.0 dated Nov. 22, 2021.
EP Office Action in Application No. 16 868 869.5 dated Aug. 11, 2021.
KR Office Action in Application No. 10-2021-0148519 dated Nov. 17, 2021.
KR Office Action in Application No. 10-2021-0148525 dated Nov. 17, 2021.
KR Office Action in Application No. 10-2021-0152670 dated Nov. 30, 2021.
KR Office Action in Application No. 10-2021-0152688 dated Nov. 30, 2021.
KR Office Action in Application No. 10-2016-0024450 dated May 29, 2021.
KR Office Action in Application No. 10-2016-0024458 dated May 29, 2021.
KR Office Action in Application No. 10-2016-0024461 dated May 29, 2021.
KR Office Action in Application No. 10-2016-0024463 dated May 29, 2021.
KR Office Action in Application No. 10-2016-0062937 dated Jun. 1, 2021.
KR Notice of Allowance in Application No. 10-2016-0024430 dated Aug. 10, 2021.
KR Notice of Allowance in Application No. 10-2016-0024437 dated Aug. 10, 2021.

(56) References Cited

OTHER PUBLICATIONS

KR Notice of Allowance in Application No. 10-2016-0024445 dated Aug. 10, 2021.
KR Notice of Allowance in Application No. 10-2016-0024450 dated Aug. 10, 2021.
KR Notice of Allowance in Application No. 10-2016-0024458 dated Aug. 10, 2021.
KR Notice of Allowance in Application No. 10-2016-0024463 dated Aug. 10, 2021.

* cited by examiner (a)          (b)          (c)

FIG. 50
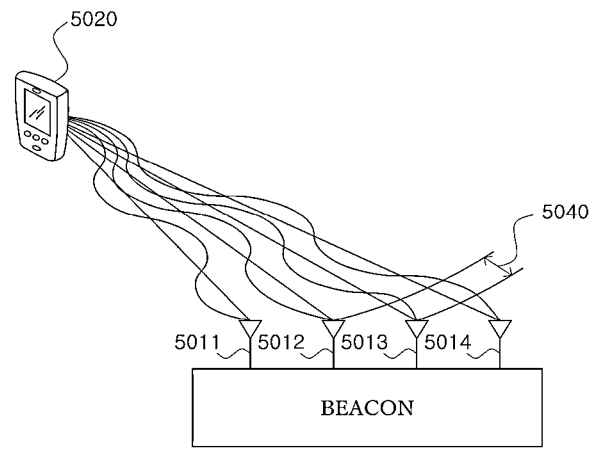
(a)
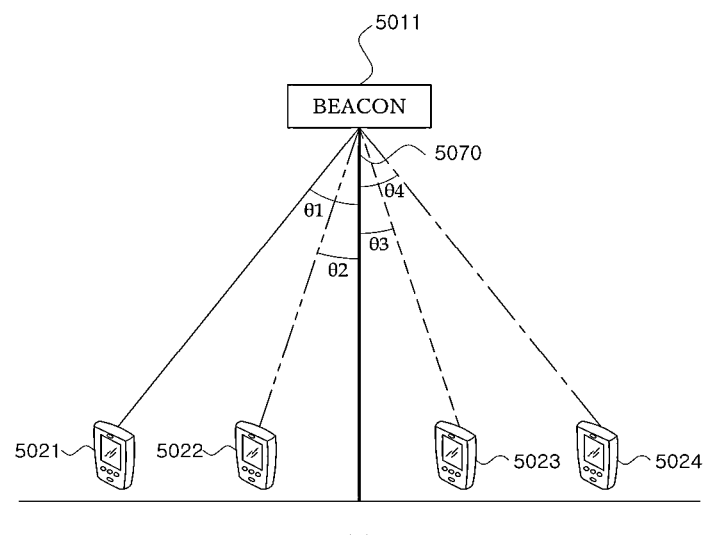
(b)

METHOD AND SYSTEM FOR MANAGING DOOR ACCESS USING BEACON SIGNAL

CROSS-REFERENCE TO RELATED APPLICATION

This application is a continuation of U.S. application Ser. No. 16/930,290, filed Jul. 15, 2020, which is a continuation of U.S. application Ser. No. 16/201,272, filed Nov. 27, 2018, which is a continuation of U.S. application Ser. No. 15/715, 010, filed Sep. 25, 2017, which is a continuation of U.S. application Ser. No. 15/233,937, filed Aug. 10, 2016, which claims priority to and the benefit of U.S. Provisional Application No. 62/258,964 filed Nov. 23, 2015, Korean Patent Application No. 10-2016-0024430 filed on Feb. 29, 2016, Korean Patent Application No. 10-2016-0024437 filed on Feb. 29, 2016, Korean Patent Application No. 10-2016-0024445 filed on Feb. 29, 2016, Korean Patent Application No. 10-2016-0024450 filed on Feb. 29, 2016, Korean Patent Application No. 10-2016-0024458 filed on Feb. 29, 2016, Korean Patent Application No. 10-2016-0024461 filed on Feb. 29, 2016, Korean Patent Application No. 10-2016-0024463 filed on Feb. 29, 2016, and Korean Patent Application No. 10-2016-0062937 filed on May 23, 2016, the disclosures of which are incorporated herein by reference.

BACKGROUND

1. Field

Embodiments of the present disclosure relate to a method and system for managing door access using a beacon signal.

2. Discussion of Related Art

An access management system is a system that recognizes and manages a visitor who intends to access a specific space through a door. The access management system is being widely used in general offices and houses as well as an access restricted facility with high security. A conventional authentication method used in such an access management system includes an authentication method using a magnetic card, a smart card, a non-contact wireless card, etc., and an authentication method using biometric information such as a fingerprint and an iris of a visitor.

In such a conventional authentication method, a visitor may access a door only after the visitor performs authentication through an authentication device installed near the door. As described above, authentication needs to be performed through a separate authentication device. Thus, when there are a plurality of visitors, it takes a long time to perform authentication. In addition, there is an inconvenience that a user needs to always carry a separate authentication means such as a magnetic card, etc., and also there is a difficulty in that, when such an authentication means is lost, an illegal visitor who steals the separate authentication means can enter the door.

Recently, in order to overcome such a difficulty, efforts are being made to enhance user convenience and also increase security of an access management system.

SUMMARY

The present disclosure is directed to providing a method and system for managing door access which may increase security of an access management system and may also enhance user convenience.

The present disclosure is also directed to providing a method and system for managing door access which may increase user convenience and security by accurately measuring a position of a terminal using signals transmitted and received between a beacon and the terminal.

According to an aspect of the present disclosure, there is provided an access control method of a user access authority determination unit that controls access of a user to a target door based on a signal including beacon data from a plurality of beacons installed near a door, wherein the user carries a terminal and the terminal obtains the signal including the beacon data based on a proximity to the plurality of beacons, the access control method including identifying the target door based on an identification information of the plurality of beacons extracted from the beacon data; determining a type of user movement, wherein the type of user movement include a entering movement that the user enters into an inner side from an outer side through the target door and exiting movement that the user exits the inner side to the outer side through the target door; and determining an access authentication process to be performed to unlock the target door, wherein the access authentication process is determined according to the determined type of user movement.

Among the plurality of beacons, a first beacon may be installed to the outer side with respect to the target door, and a second beacon may be installed to the inner side with respect to the target door.

The identifying of the target door may include identifying the target door using at least one of identification information of the first beacon and identification information of the second beacon.

The determining whether the user enters or exits through the target door may include: checking whether the user is located at the outer side or the inner side with respect to the target door; and determining that the type of user movement is the entering movement when it is checked that the user is located at the outer side, or determining that the type of user movement is the exiting movement when it is checked that the user is located at the inner side.

The identification information of the plurality of beacons may be used to check whether the user is located at the outer side or the inner side with respect to the target door.

The determining a type of user movement may include determining that the user is located at the outer side with respect to the target door when the terminal acquires only the identification information of the first beacon.

The determining a type of user movement may include determining that the user is located at the inner side with respect to the target door when the terminal acquires only the identification information of the second beacon.

A distance between the first beacon and the terminal and a distance between the second beacon and the terminal are used to check whether the user is located at the outer side or the inner side with respect to the target door.

The checking whether the user is located at the outer side or the inner side with respect to the target door may include determining that the user is located at the outer side with respect to the target door when the distance between the first beacon and the terminal is smaller than the distance between the second beacon and the terminal, or determining that the user is located at the inner side with respect to the target door when the distance between the first beacon and the terminal is greater than the distance between the second beacon and the terminal.

The distance between the first beacon and the terminal may be checked based on a received-signal strength of a signal including the identification information of the first beacon, which is measured by the terminal, or the distance between the second beacon and the terminal may be checked based on a received-signal strength of a signal including the identification information of the second beacon, which is measured by the terminal.

The distance between the first beacon and the terminal may be checked using information regarding a received-signal strength of a signal including first beacon data including the identification information of the first beacon at a position separated a predetermined distance from the first beacon, which is extracted from the first beacon data, or the distance between the second beacon and the terminal is checked using information regarding a received-signal strength of a signal including second beacon data including the identification information of the second beacon at a position separated a predetermined distance from the second beacon, which is extracted from the second beacon data.

Additional information including at least one of access information of the user, commuting information of the user, and a log for the terminal may be used to check whether the user is located at the outer side or the inner side with respect to the target door.

The determining the access authentication process may include determining the access authentication process as a first access authentication process including a user authentication operation when it is determined that the type of user movement is the entering movement or determining the access authentication process as a second access authentication process not including the user authentication operation when it is determined that the type of user movement is the exiting movement.

The access control method may further include acquiring user authentication information of the user when the access authentication process is determined as the first access authentication process; and determining whether to unlock the target door using the user authentication information of the user.

The access control method may further include determining whether to unlock the target door without using user authentication information of the user when the access authentication process is determined as the second access authentication process.

When the access authentication process is determined as the first access authentication process during a predetermined time after the target door is determined to be unlocked using user authentication information acquired from the user at a first time, whether to unlock the target door may be determined using the user authentication information.

The determining of the access authentication process may include determining the access authentication process as the second access authentication process when it is determined that the type of user movement is the entering movement during a predetermined time after the access authentication process is determined as the first access authentication process and the target door is unlocked.

According to another aspect of the present disclosure, there is provided an access control method of a user access authority determination unit that controls access of a user to a target door based on a signal including beacon data from a beacon installed near a door, wherein the user carries a terminal and the terminal obtains the signal including the beacon data based on a proximity to the beacon, the access control method including identifying the target door based on an identification information of the beacon extracted from the beacon data; determining a type of user movement, wherein the type of user movement include a entering movement that the user enters into an inner side from an outer side through the target door and exiting movement that the user exits the inner side to the outer side through the target door; and determining an access authentication process to be performed to unlock the target door, wherein the access authentication process is determined according to the determined type of user movement, wherein additional information including at least one of access information of the user, commuting information of the user, and a log for the terminal is used to determination of the type of user movement.

According to another aspect of the present disclosure, there is provided an electronic device for controlling access of a user to a target door based on a signal including beacon data from at least one beacon installed near a door, wherein the user carries a terminal and the terminal obtains the signal including the beacon data based on a proximity to the at least one beacon, the electronic device including a communication interface configured to communicate with the terminal; and a processor configured to acquire identification information of the at least one beacon extracted from the beacon data through the communication interface, identify the target door based on the identification information of at least one beacon, determining a type of user movement, wherein the type of user movement include a entering movement that the user enters into an inner side from an outer side through the target door and exiting movement that the user exits the inner side to the outer side through the target door, and determine an access authentication process to be performed to unlock the target door, wherein the access authentication process is determined according to the determined type of user movement.

When the at least one beacon is a plurality of beacons, at least one of identification information of the plurality of beacons and a distance between each of the plurality of beacons and the terminal may be used to check whether the user is located at the outer side or the inner side with respect to the target door.

When the at least one beacon is a single beacon, additional information including at least one of access information of the user, commuting information of the user, and a log for the terminal may be used to check whether the user is located at the outer side or the inner side with respect to the target door.

According to another aspect of the present disclosure, there is provided an access management system including at least one beacon configured to broadcast beacon data; and a server configured to control access of a user, who carries a terminal that approaches the at least one beacon and acquires the beacon data, to a target door corresponding to the at least one beacon. The server is configured to identify the target door corresponding to the at least one beacon using the identification information of the at least one beacon, determine whether the user enters an inner side from an outer side with respect to the target door or exits the inner side to the outer side with respect to the target door, and determine an access authentication process to be performed to unlock the target door according to whether the user enters or exits through the target door.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 50 is a diagram for describing measurement of a position of a terminal according to another embodiment.

DETAILED DESCRIPTION OF EXEMPLARY EMBODIMENTS

Figure 1:
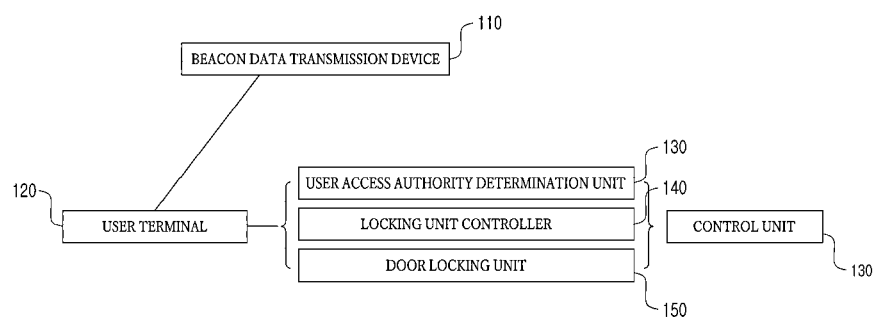
FIG. 1 is a diagram for describing an access management system according to an embodiment.

Hereinafter, embodiments will be described in detail with reference to the accompanying drawings. However, the present disclosure is not restricted or limited to the embodiments. In addition, like reference numerals in the drawings denote like elements.

In the figures, the thickness of layers and regions is exaggerated for clarity.

Also, when it is mentioned that an element or layer is 'on' another element or layer, the element or layer may be formed directly on another element or layer, or a third element or layer may be interposed therebetween. Like reference numerals refer to like elements throughout the specification.

Moreover, detailed descriptions about well-known functions or configurations associated with the present disclosure will be ruled out in order not to unnecessarily obscure subject matters of the present disclosure. It should also be noted that, although ordinal numbers (such as first and second) are used in the following description, they are used only to distinguish similar components.

Hereinafter, an element according to the present disclosure will be described in detail with reference to the accompanying drawings. The suffixes "module" and "unit" for elements used in the following description are given or used interchangeably only for facilitation of preparing this specification, and thus they are not granted a specific meaning or function.

Hereinafter, an access management system will be described. The access management system may denote a system that performs management to allow only a person who has access authority to pass through a door. The access management system may be used in an indoor environment such as an office, an institution, or the like, or may also be used in an outdoor environment in which there is a restricted area outside a building, such as a military base.

<Configuration of Access Management System>

FIG. 1 is a diagram for describing an access management system according to an embodiment.

Referring to FIG. 1, an access management system may include a beacon data transmission device 110, a user terminal 120, and a control unit. Components shown in FIG. 1 are not essential, and thus the access management system may include more or fewer components than those shown in FIG. 1. In the following description, components of the access management system, terms of the access management system, and operations of the access management system will be described.

Also, the components of the access management system may transmit or receive signals to or from one another. The signals include data or information, and thus hereinafter, transmission or reception of the signals may be represented as transmission or reception of the data or transmission or reception of the information.

1. Components of Access Management System (Preferred Embodiment)

(1) Beacon Data Transmission Device 110

The beacon data transmission device 110 may be defined as a device that transmits information to an external device. Here, the external device may include another device that may communicate with the beacon data transmission device 110 as well as the user terminal 120 and the control unit. The beacon data transmission device 110 may use a low-frequency communication scheme, a Light Emitting Diode (LED) communication scheme, a Wireless Fidelity (WiFi) communication scheme, a Bluetooth communication scheme or the like to transmit the information to the external device. It should be appreciated that various communication schemes other than the above-described communication schemes may be used to transmit the information.

The beacon data transmission device 110 may transmit a signal to the external device unidirectionally or may transmit and receive a signal to and from the external device bidirectionally.

In an embodiment, when the beacon data transmission device 110 transmits a signal to the external device unidirectionally, the beacon data transmission device 110 may transmit the signal in a broadcast manner. Also, when the signal is transmitted, the beacon data transmission device 110 may transmit beacon data.

In some embodiments of the present disclosure, the beacon data may include at least one of identification information and transmission power information of the beacon data transmission device 110.

As is apparent from various embodiments of the present disclosure to be described below, the beacon data may be appropriately used by an access management system described in the present disclosure to perform access management. In particular, in various embodiments of the present disclosure, the beacon data may be used to acquire information regarding a relative location between a user (or a terminal carried by the user) and a specific door or determine whether the user enters or exits through the specific door. A configuration and functions of the beacon data transmission device 110, and the beacon data will be described below in detail.

(2) User Terminal 120

The user terminal 120 may be defined as a device that may communicate with an external device near the user terminal 120 and has to be carried by a user to access the door.

For example, the user terminal 120 is a handheld device capable of communication that is carried by the user, and may include a cell phone, a smartphone, a personal digital assistant (PDA), a portable multimedia player (PMP), etc. In particular, advantageously, the user terminal 120 may be a device that is easy for the user to always carry in order to achieve objectives of the present disclosure. As an example, the user terminal 120 may include a wearable device such as a wearable watch, a wearable band, or the like.

However, in some embodiments of the present disclosure, the user terminal 120 may include a vehicle in which the user is sitting.

In various embodiments of the present disclosure, the user terminal 120 may receive the above-described beacon data and then appropriately process the received beacon data.

For example, the user terminal 120 may acquire information regarding a distance of the user terminal 120 to the beacon data transmission device 110 by utilizing a variety of information included in the beacon data.

As another example, upon receiving the beacon data, the user terminal 120 may transmit the received data as it is to a user access authority determination unit 130, or may selectively extract information needed for access management from a variety of information included in the beacon data and transmit the extracted information to the user access authority determination unit 130.

Also, in various embodiments of the present disclosure, the user terminal 120 may acquire user authentication information needed to authenticate the user and may appropriately perform a process corresponding thereto.

For example, the user terminal 120 may acquire biometric information including a fingerprint, a voice, a pulse, and an iris of the user. In this case, the user terminal 120 may compare the acquired biometric information with biometric information of a specific user that is prestored in the user terminal 120 to perform identification (i.e., authentication) of the user. Alternatively, the user terminal 120 may transmit the acquired biometric information to the user access authority determination unit 130 without performing authentication.

Also, in various embodiments of the present disclosure, the user terminal 120 may transmit user identification information (e.g., UID) of the user terminal 120 to the user access authority determination unit 130. In this case, in an embodiment of the present disclosure, the user terminal 120 may compare the acquired biometric information with the pre-stored biometric information of the specific user and may transmit the user identification information (e.g., UID) of the user terminal 120 to the user access authority determination unit 130 only when the user is identified through the comparison result. In addition, in another embodiment of the present disclosure, the user terminal 120 may transmit the user identification information (e.g., UID) of the user terminal 120 to the user access authority determination unit 130 without performing authentication.

A configuration and operation of the user terminal 120 will be further apparent from various embodiments of the present disclosure to be described below.

(3) User Access Authority Determination Unit 130

The user access authority determination unit 130 may be defined as a device that authenticates access authority of the user who carries the user terminal 120.

The user access authority determination unit 130 may be defined as a device that determines whether the user is allowed to pass through a specific door.

The user access authority determination unit 130 may perform a user authentication operation to be described below in order to determine whether the user is allowed to pass through a door. The user access authority determination unit 130 may utilize the above-described biometric information of the user in order to perform the user authentication operation.

Also, the user access authority determination unit 130 may further perform at least one of an operation of checking access authority of the user on the basis of door-related additional information regarding the specific door and user-related additional information regarding the authenticated user.

In some embodiments of the present disclosure, the user access authority determination unit 130 may be implemented in the form of a server. Here, the server is a device that is connected to a network and configured to store and process data, and the network may be the Internet, or an intranet in a security region in which the present disclosure is implemented. However, when the user access authority determination unit 130 is implemented in the form of a server, the server should be capable of communicating with the user terminal 120.

Alternatively, in some embodiments of the present disclosure, the user access authority determination unit 130 may be implemented to be included in the user terminal 120.

Alternatively, in some embodiments of the present disclosure, the user access authority determination unit 130 may be implemented to be included in a locking unit 150 to be described below. However, when the user access authority determination unit 130 may be implemented to be included in the locking unit 150, the locking unit 150 should be capable of communicating with the user terminal 120.

(4) Locking Unit Controller 140

The locking unit controller 140 may be defined as a device that controls an operation of the locking unit 150 to be described below. The locking unit controller 140 may be connected with the locking unit 150 in a wired or wireless manner.

In general, the locking unit controller 140 may be configured in the form of an access restriction controller (or a distribution panel or an electronic distribution panel).

In some embodiments, the locking unit controller 140 may be implemented in the form of a server.

Also, in other embodiments, the locking unit controller 140 may be implemented to be included in the user terminal 120.

In various embodiments of the present disclosure, when the user access authority determination unit 130 determines that the user is allowed to pass through a specific door, a control signal for controlling the locking unit 150 may be generated. Upon receiving the control signal, the locking unit controller 140 may control an operation of the locking unit 150 according to the received control signal.

(5) Door Locking Unit 150

The door locking unit 150 may be defined as a means for locking or unlocking a door. When the door locking unit 150 locks the door, the door cannot be changed from a closed state to an open state. On the other hand, when the door locking unit 150 unlocks the door, the door may be changed from the closed state to the open state. That is, on a condition that the door is locked, the door is not opened although an external force is applied to the door. However, on a condition that the door is unlocked, the door may be opened when an external force is applied to the door.

In some embodiments of the present disclosure, the door locking unit 150 may lock or unlock the door under the control of the locking unit controller 140. However, the door locking unit 150 and the locking unit controller 140 may not necessarily be implemented as physically distinct devices, but may be physically implemented as one device.

For convenience of description, hereinafter, the user access authority determination unit, the locking unit controller, and the door locking unit may be collectively referred to as a "control unit."

However, the term "control unit" used herein as a collective concept does not mean that the user access authority determination unit, the locking unit controller, and the door locking unit are implemented as one physical device. The user access authority determination unit, the locking unit controller, and the door locking unit may be implemented in a selective combination of different devices that may be physically distinct from one another.

In addition, the sentence "a device communicates with a control unit" used herein does not mean that the device should be capable of communicating with all of the user access authority determination unit, the locking unit controller, and the door locking unit unless specially stated otherwise. The sentence "a device communicates with a control unit" may be used even when the device is capable of communicating with at least one of the user access authority determination unit, the locking unit controller, and the door locking unit.

2. Components of Access Management System
(Exemplary Embodiment)

Distinct physical components constituting an access management system for describing various embodiments of the present disclosure will be described below.

A beacon 200 to be described below may be a physical device in which the above-described beacon data transmission device 110 is implemented.

Also, a terminal 300 to be described below may be a physical device in which the above-described user terminal 120 is implemented.

Also, a server 400 to be described below may be a physical device in which the above-described user access authority determination unit 130 is implemented.

Also, an access restriction controller 500 to be described below may be a physical device in which the above-described locking unit controller 140 is implemented.

Also, a locking unit 600 to be described below may be a physical device in which the above-described door locking unit 150 is implemented.

(1) Beacon

Figure 2:
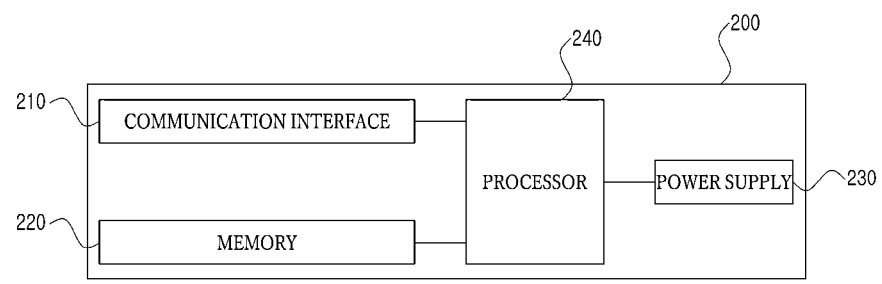
FIG. 2 is a block diagram showing a beacon according to an embodiment.

FIG. 2 is a block diagram showing a beacon according to an embodiment.

Referring to FIG. 2, the beacon 200 may include a communication interface 210, a memory 220, a power supply 230, and a processor 240. The components shown in FIG. 2 are not essential, and thus the beacon 200 may be implemented to include more or fewer components than those shown in FIG. 2.

The communication interface 210 may indicate an interface that enables uni-directional communication from the beacon 200 to an external device or bi-directional communication between the beacon 200 and an external device. The beacon 200 may communicate with a terminal or a control unit through the communication interface 210. The communication interface 210 may include a wireless communication interface.

In an embodiment, the wireless communication interface may include a Bluetooth communication interface, for example, a Bluetooth Low Energy (BLE) communication interface. However, the wireless communication interface may include, but is not limited to, wireless Internet interfaces such as Wireless LAN (WLAN) and WiFi, direct and short-range communication interfaces such as Radio Frequency Identification (RFID), Infrared Data Association (IrDA), Ultra Wideband (UWB), ZigBee, Near Field Communication (NFC), WiHD, and WiGig.

The memory 220 may store a program (e.g., a beacon-related access management application) for appropriately controlling an operation that should be performed by the beacon 200 and may also store input or output data (e.g., identification information of the beacon 200) in order to implement an access management method according to various embodiments of the present disclosure.

The power supply 230 supplies power needed to operate the beacon 200. In an embodiment, like a battery, the power supply 230 may store electric energy and supply the stored electric energy to each component of the beacon 200.

The processor 240 typically controls the overall operation of the beacon 200. In an embodiment, the processor 240 may execute the beacon-related access management application and may perform an operation of the beacon needed for access management according to the beacon-related access management application.

Before simple block configurations of the terminal 300, the server 400, the access restriction controller 500, and the locking unit 600 are described, beacon data to be described in various embodiment of the present disclosure will be described first.

1) Beacon Data

The beacon data may be defined as data included in a signal the beacon 200 transmits to an external device. The beacon data may include at least one of beacon identification information (e.g., BID) and transmission power information of the beacon 200.

The beacon identification information of the beacon 200 may be defined as information for identifying the specific beacon 200 from among a plurality of beacons. The beacon identification information may be expressed as a beacon identifier (BID). The BID may consist of a combination of a plurality of characters or a plurality of values. In order to identify the specific beacon 200 by the BID, each beacon has a different BID. According to some embodiments of the present disclosure, the BID may include a universal unique identifier (UUID) (e.g., 16 bytes), a major value (e.g., 2 bytes) and a minor value (e.g., 2 bytes). In such an example, all of a UUID, a major value, and a minor value of a first beacon are different from all of a UUID, a major value, and a minor value of a second beacon.

Also, the transmission power information may indicate the amount of power used for the beacon 200 to transmit a signal including the beacon data. According to some embodiments of the present disclosure, the beacon data may include a tx power level as the transmission power information. The tx power level may indicate information regarding received-signal strength of a signal including beacon data that is received by an external device at a position separated by a certain distance (e.g., 1 m) from the beacon 200.

Next, simple block configurations of the terminal 300, the server 400, the access restriction controller 500, and the locking unit 600 will be sequentially described.

(2) Terminal

Figure 3:
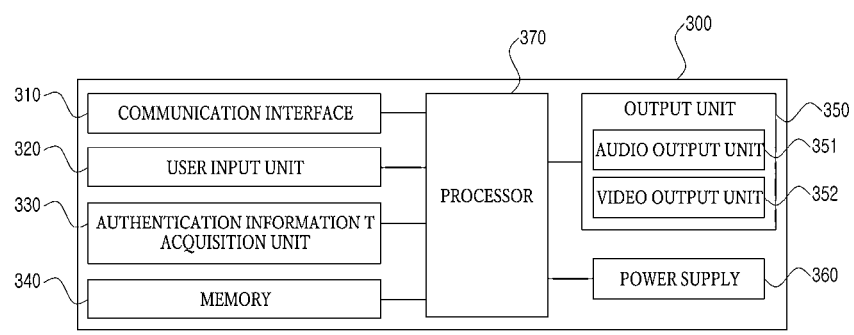
FIG. 3 is a block diagram showing a terminal according to an embodiment.

FIG. 3 is a block diagram showing a terminal according to an embodiment.

Referring to FIG. 3, the terminal 300 may include a communication interface 310, a user input unit 320, authentication information acquisition unit 330, a memory 340, an output unit 350, a power supply 360, a processor 370, etc. The components shown in FIG. 3 are not essential, and thus the terminal 300 may be implemented to include more or fewer components than those shown in FIG. 3.

The communication interface 310 may indicate an interface that enables communication between the terminal 300 and a communication system or between the terminal 300 and a network in which the terminal 300 is located. The communication interface 310 may include a wireless communication interface.

In an embodiment, the wireless communication interface may include a BLE communication interface. For example, the terminal 300 may acquire a signal from the beacon according to a BLE standard scheme and transmit data (e.g., response data or ack data corresponding to the signal acquired from the beacon) to the beacon using the wireless communication interface.

In addition, embodiments of the present disclosure are not limited thereto, and the wireless communication interface may include a wireless Internet interface such as WLAN, WiFi, WiFi Direct, Wireless broadband (Wibro), World Interoperability for Microwave Access (Wimax), High Speed Downlink Packet Access (HSDPA), and Long Term Evolution (LTE) and a short-range communication interface such as IrDA communication. For example, the terminal 300 may communicate with a control device using the wireless Internet interface.

The user input unit 320 generates input data used by a user to control an operation of the terminal. The user input unit 320 may include a keypad, a dome switch, a touch pad (e.g., static pressure/capacitance), a jog wheel, or a jog switch.

The authentication information acquisition unit 330 may be defined as a unit for acquiring authentication information, which is information for identifying an authorized user of a terminal, from the user.

The authentication information acquisition unit 330 may include at least one of a fingerprint recognition sensor for recognizing a fingerprint of the user, a facial recognition sensor (or camera) for recognizing a face, an iris recognition sensor for recognizing an iris, a vein recognition sensor for recognizing a vein, an electrocardiogram sensor for recognizing an electrocardiogram, a microphone for recognizing a sound (e.g., voice), an electromyogram sensor for recognizing an electromyogram, and a motion recognition sensor for recognizing gesture information of the user (e.g., a camera, an acceleration sensor, a gyro sensor, and a geomagnetic sensor, etc.). In addition, the terminal 300 may acquire encryption information (e.g., a predetermined pattern, password, or authentication string) from the input data received through the user input unit 320.

The memory 340 may store a program (e.g., a terminal-related access management application) for operating the processor 370 and may also temporarily store input or output data (e.g., beacon data, information regarding a beacon, and received-signal strength of a signal received from a beacon). The memory 340 may store data regarding various patterns of vibration and sound that are output when a touch input is applied to the touch screen.

The memory 340 may include at least one of storage devices including a flash memory, a hard disk, a multimedia card micro type memory, a card-type memory (e.g., secure digital (SD) memory, XD memory, etc.), a random access memory (RAM), a static random access memory (SRAM), a read-only memory (ROM), an electrically erasable programmable read-only memory (EEPROM), and a programmable read-only memory (PROM). The terminal 300 may operate in association with a web storage for performing the storage function of the memory 340 on the Internet.

The output unit 350 is configured to generate an output associated with visual and auditory senses and may include an audio output unit 351, a video output unit 352, etc.

The audio output unit 351 acoustically outputs information regarding the terminal 300. That is, the audio output unit 351 outputs an acoustic signal associated with a function performed by the terminal 300. Alternatively, the audio output unit 351 may acoustically output audio data stored in the memory 340. The audio output unit 351 may be implemented as a speaker, a buzzer, etc.

The video output unit 352 visually outputs information processed by the terminal 300. For example, when the terminal-related access management application is running on the terminal 300, a user interface (UI) or a graphic user interface (GUI) provided by the terminal-related access management application may be displayed.

In a case in which the video output unit 352 and a sensor for sensing a touch operation (hereinafter, referred to as a "touch sensor") are mutually layered in a structure (hereinafter, simply referred to as a "touch screen"), the video output unit 352 may be used as an input device as well as an output device. The touch sensor may be configured to convert a variation of pressure applied to a specific portion of the video output unit 352 or a variation capacitance occurring in a specific portion of the video output unit 352 into an electrical input signal. The touch sensor may be configured to detect a touch pressure as well as a touched position or area.

The power supply 360 supplies power needed to operate the terminal 300. The power supply 360 may also supply power applied from the outside to each component needed to operate the terminal 300. In addition, like a battery, the power supply 360 may store electric energy and then supply the stored electric energy to each component.

Typically, the processor 370 controls the overall operation of the terminal 300. In an embodiment, the processor 370 may execute the terminal-related access management application and may perform an access management operation according to the terminal-related access management application.

(3) Server

Figure 4:
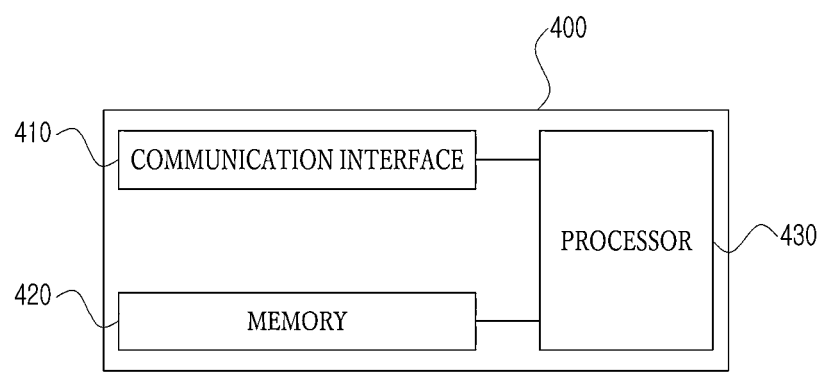
FIG. 4 is a block diagram showing a server according to an embodiment.

FIG. 4 is a block diagram showing a server according to an embodiment.

Referring to FIG. 4, the server 400 may include a communication interface 410, a memory 420, and a processor 430, The components shown in FIG. 4 are not essential, and thus the server 400 may be implemented to include more or fewer components than those shown in FIG. 4.

The communication interface 410 may indicate an interface that enables communication between the server 400 and a communication system or between the server 400 and a network in which the server 400 is located. The communication interface 410 may include a wired communication interface and a wireless communication interface.

The wired communication interface includes any interface that may communicably connect to an external device in a wired manner. For example, the wired communication interface may include a communication interface such as RS232, RS485, or RS422.

The wireless communication interface includes any interface that may communicably connect to an external device in a wireless manner. For example, the wireless communication interface may include a wireless Internet interface such as WLAN, WiFi, and WiFi Direct and a short-range communication interface such as Bluetooth, BLE, and IrDA.

The server 400 may transmit and receive data to and from the beacon 200, the terminal 300, the access restriction controller 500, the locking unit 600, or the like through the communication interface 410 as necessary.

The memory 420 may store a program (e.g., a server-related access management application) for operating the processor 430 and may also temporarily store input or output data (e.g., beacon data, information regarding a beacon, information regarding a terminal, information regarding a door, and received-signal strength of a signal received from a beacon by a terminal).

Typically, the processor 430 controls the overall operation of the server 400. In an embodiment, the processor 430 may execute the server-related access management application and may perform an access management operation according to the server-related access management application.

The server-related access management application may be programmed to operate the server 400 as the user access authority determination unit 130 or as the locking unit controller 140.

(4) Access Restriction Controller

Figure 5:
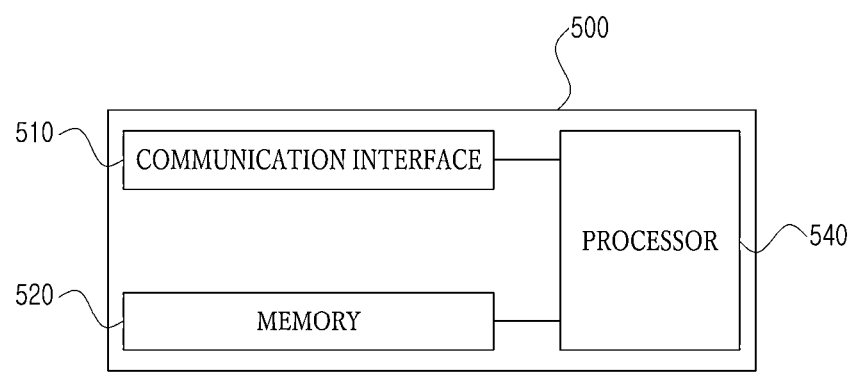
FIG. 5 is a block diagram showing an access restriction controller according to an embodiment.

FIG. 5 is a block diagram showing an access restriction controller according to an embodiment.

Referring to FIG. 5, the access restriction controller 500 may include a communication interface 510, a memory 520, and a processor 530. The components shown in FIG. 5 are not essential, and thus the access restriction controller 500 may be implemented to include more or fewer components than those shown in FIG. 5.

The communication interface 510 may indicate an interface that enables communication between the access restriction controller 500 and a communication system or between the access restriction controller 500 and a network in which the access restriction controller 500 is located. The communication interface 510 may include a wired communication interface and a wireless communication interface.

The wired communication interface includes any interface that may communicably connect to an external device in a wired manner. For example, the wired communication interface may include a communication interface such as RS232, RS485, or RS422. The wireless communication interface includes any interface that may communicably connect to an external device in a wireless manner. For example, the wireless communication interface may include a wireless Internet interface such as WLAN, WiFi, and WiFi Direct and a short-range communication interface such as Bluetooth, BLE, and IrDA. The access restriction controller 500 may transmit and receive data to and from the beacon 200, the terminal 300, the server 400, the locking unit 600, or the like through the communication interface 510.

The memory 520 may store a program (e.g., an access management application) for operating the processor 530 and may also temporarily store input or output data (e.g., a control message).

The processor 530 controls the overall operation of the access restriction controller 500. In an embodiment, the processor 530 may execute an access-restriction-controller-related access management application and may perform an access management operation according to the access-restriction-controller-related access management application.

(5) Locking Unit

Figure 6:
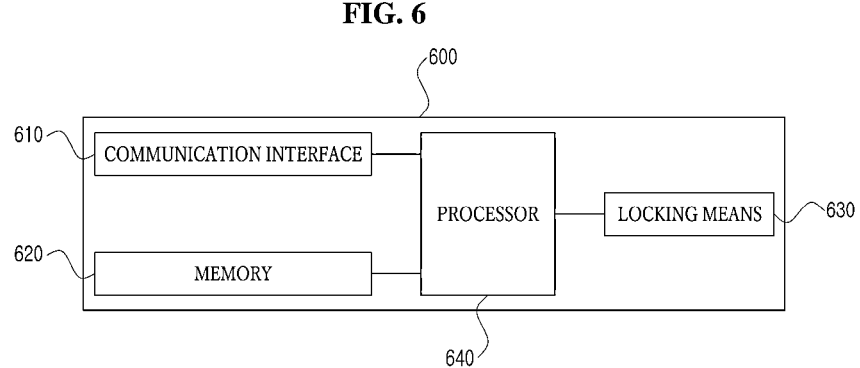
FIG. 6 is a block diagram showing a locking unit according to an embodiment.

FIG. 6 is a block diagram showing a locking unit according to an embodiment.

Referring to FIG. 6, the locking unit 600 may include a communication interface 610, a memory 620, a locking means 630, and a processor 640. The components shown in FIG. 6 are not essential, and thus the locking unit 600 may be implemented to include more or fewer components than those shown in FIG. 6. For example, the locking unit 600 may include only the locking means 630.

The communication interface 610 may indicate an interface that enables communication between the locking unit 600 and a communication system or between the locking unit 600 and a network in which the locking unit 600 is located. The communication interface 610 may include a wired communication interface and a wireless communication interface.

The wired communication interface includes any interface that may communicably connect to an external device in a wired manner. For example, the wired communication interface may include a communication interface such as RS232, RS485, or RS422. The wireless communication interface includes any interface that may communicably connect to an external device in a wireless manner. For example, the wireless communication interface may include a wireless Internet interface such as WLAN, WiFi, and WiFi Direct and a short-range communication interface such as Bluetooth, BLE, and IrDA. As an example, the locking unit 600 may use the wireless communication interface to communicate with a terminal or a server.

The locking unit 600 may transmit and receive data to and from the beacon 200, the terminal 300, the server 400, the access restriction controller 500, or the like through the communication interface 610.

The memory 620 may store a program (e.g., the access management application) for operating the processor 640 and may also temporarily store input or output data (e.g., a password of a locking unit).

The locking means 630 may be physically configured to selectively restrict movement of a door.

As an example, the locking means 630 may be disposed on a door and a frame at which the door is installed. In this case, the locking means 630 may be physically installed to be separable at a first part of the door and a second part of the frame. The locking means 630 may be implemented to lock or unlock the door according to an appropriate physical state between the first part and the second part or a variation of the physical state between the first part and the second part.

For example, a slidable bar is movably provided in any one of the first part and the second part, and a hole into which the bar may be inserted is provided in the other of the first part and the second part. The locking means 630 may be configured to control the door to be locked and unlocked according to a relative position of the bar with respect to the hole.

Typically, the processor 640 controls the overall operation of the locking unit 600. In an embodiment, the processor 640 may execute a locking-unit-related access management application and may perform an access management operation according to the locking-unit-related access management application. That is, the processor 640 may control the locking means 630 to lock or unlock the door.

3. Terms

The following terms may be defined in the access management system.

(1) Access

"Access" may be defined as an act in which a user carrying a terminal passes through a door. "Access" may include an entry in which a user carrying a terminal moves from an outer side to an inner side through a door and an exit in which a user carrying a terminal moves from the inner side to the outer side through the door.

(2) Inner Side/Outer Side with Respect to Door

An inner side with respect to a door may denote a region in which a person with no access authority is restricted from entering through the door while an outer side with respect to a door may denote an opposite side of the inner side with respect to the door. For example, an authorized user, who has access authority to a specific door, can enter the inner side from the outer side through the door according to embodiments of the present disclosure. However, an unauthorized person, who does not have access authority, cannot enter the inner side from the outer side through door according to embodiments of the present disclosure.

In an embodiment, "Inner side" and "outer side" with respect to a door are concepts that may be defined with respect to a single door. Thus, an inner side with respect to a first door may be an outer side with respect to a second door. Alternatively, the inner side with respect to the first door and the inner side with respect to the second door may be the same region, and the outer side with respect to the first door and the outer side with respect to the second door may be different regions. Alternatively, the outer side with respect to the first door and the outer side with respect to the second door may be the same region, and the inner side with respect to the first door and the inner side with respect to the second door may be different regions.

In an embodiment, "inner side" may be represented as "inner region", "indoor side" "indoor region". And "outer side" may be represented as "outer region", "outdoor side" "outdoor region".

(3) Received-Signal Strength

Received-signal strength may be defined as information indicating strength of a signal received by a terminal from a beacon. The received-signal strength may be represented using a received-signal strength indicator (RSSI) that is well known in the art, but may denote another value that may indicate strength of the received signal other than the RSSI.

In an embodiment, the received-signal strength may be expressed in units of decibel/milliwatt (dBm). As an example, the received-signal strength may be expressed as a value between 0 dBm and −99 dBm. In this case, a signal level of 0 dBm may be stronger than a signal level of −99 dBm.

(4) User Identification Information (e.g., UID)

User identification information may be defined as information used to identify a user of a specific terminal from among a plurality of users of terminals. The user identification information may be represented as a user identifier (UID).

The UID may be unique information assigned to the user or unique information assigned to a terminal of the user.

In an embodiment, on a condition that the UID is unique information assigned to the user, the UID may be set when the user of the terminal is registered or joined in an access management system. For example, the UID may include an ID assigned to the user of the terminal by the access management system or an ID used by the user of the terminal to log in to a terminal-related access management application.

In an embodiment, on a condition that the UID is unique information assigned to the terminal, the UID may be set upon manufacture of the terminal, by a control program for controlling the terminal, or under control of an external device rather than the terminal. For example, the UID may include at least one of a UUID, a UID, an IP Address, a MAC Address, a CPU (MCU) serial number or a hard disk drive (HDD) serial number, and a communication number of the terminal.

(5) Door Identification Information (e.g., DID)

Door identification information may be defined as information used to identify a specific door among a plurality of doors. The door identification information may be expressed as a Door Identifier (DID). The DID may be identification information assigned to a locking unit corresponding to a door. The DID may be stored in a beacon, a terminal, a user access authority determination unit, a locking unit controller, or a locking unit.

(6) Lock/Unlock State of Door

A door unlock state may denote a state in which a door is opened (i.e., a door-opened state) when an external force is applied to the door while the door is closed (i.e., a door-closed state). A door lock state may denote a state in which a door is not opened although an external force is applied to the door while the door is closed.

(7) Closed/Opened State of Door

A door-closed state denotes a state in which an inner side and an outer side with respect to a door are not connected but are cut off from each other. A door-opened state denotes a state in which an inner side and an outer side with respect to a door are connected each other.

4. Operation

In an access management system, the following operations may be defined.

(1) Operation of Controlling Door to be Unlocked

An operation of controlling a door to be unlocked denotes a series of operations for unlocking the door. The door being unlocked denotes that the door is allowed to be opened when a force is applied to the door.

The operation of controlling a door to be unlocked may include an unlock command generating operation for generating a door unlock command, an unlock command transmitting operation for transmitting the generated unlock command to a locking unit or a locking unit controller, and a door unlocking operation for physically controlling a locking means to unlock the door.

(2) Operation of Controlling a Door to be Closed or Opened

An operation of controlling a door to be closed or opened may be defined as an operation of changing the closed/opened state from a current state to the other state. For example, when the door is implemented as an automatic door in which a driver for implementing movement of the door is connected to the door, the closed/opened state of the door may be appropriately controlled by an operation of the driver.

In some embodiments, when the door is implemented as an automatic door as described above, the operation of controlling the door to be locked or unlocked may be used to have the same meaning as the operation of controlling the door to be closed or opened.

(3) Operation of Determining Proximity to Door

An operation of determining proximity to a door may denote an operation of determining whether a user of a terminal approaches the door to access the door. The operation of determining proximity to a door may be performed on the basis of whether the user of the terminal is located in a door proximity region.

The door proximity region may denote a region in which the user of the terminal has to be located to access the door. Also, the door proximity region may be formed at an inner side and an outer side symmetrically about the door, but may also be formed asymmetrically.

In some embodiments of the present disclosure, the door proximity region may be at least a portion of a beacon broadcasting region. For example, the door proximity region may be the entirety of the beacon broadcast region, but may be a portion of the beacon broadcast region in which a terminal may receive a signal with strength equal to or greater than a specific received-signal strength.

2) Operation of Determining Entry or Exit

An operation of determining an entry or exit may be defined as an operation of determining whether a terminal enters an inner side from an outer side through a door or exits the inner side to the outer side through the door.

3) Operation of Determining Access Authentication Process

An access authentication process may indicate a series of operations that have to be performed by a user access authority determination unit to determine whether the user of the terminal may access the door. In some embodiments of the present disclosure, the access authentication process may be a first access authentication process including a door access authority authenticating operation and a user authenticating operation or a second access authentication process including the door access authority authenticating operation.

(4) User Authentication Operation

A user authentication operation may be defined as an operation of determining whether user authentication information acquired from a user who desires to pass through a door matches preregistered user authentication information.

In some embodiments of the present disclosure, a series of operations of reading out prestored user authentication information, acquiring user authentication information from a user who desires to pass through the door, and comparing the acquired user authentication information with the prestored user authentication information to determine whether the acquired user authentication information matches the stored user authentication information may be defined as the user authentication operation.

In an embodiment of the present disclosure, the user authentication operation may be performed to determine whether to unlock the door. For example, when it is determined that the acquired user authentication information matches the stored user authentication information, the door may be unlocked.

Also, in another embodiment of the present disclosure, the user authentication operation may be performed to acquire a UID of the user. For example, when it is determined that the acquired user authentication information matches the stored user authentication information, a UID matching the stored user authentication information may be extracted from among a plurality of UIDs.

In some embodiments of the present disclosure, the user authentication information may include biometric information such as a fingerprint, a face, an iris, a vein, a voice, an electrocardiogram, and an electromyogram of the user. Also, the authentication information may include gesture information of the user, and may also include encryption information such as a predetermined pattern, password, or authentication string.

(5) Operation of Authenticating Authority to Access Door

An operation of authenticating authority to access a door may be defined as an operation of determining whether a user who desires to pass through a door has authority to pass through the door.

For example, when authority information for passing through a door is matched and stored for each door (hereinafter, referred to as door-assigned authority information) and when authority information for passing through a door is matched and stored for each user (hereinafter, referred to as user-assigned authority information), the operation of determining whether the user has authority to access a door on the basis of information about the two authorities may be defined as the operation of authenticating authority to access a door.

The system associated with various embodiments of the present disclosure, and the elements, operations, and terms of the system have been described above. The above-described system, elements, operations, and terms may also be applied to embodiments of various access management methods to be described below. In particular, unless specifically stated otherwise, various access management methods to be described below will be described as being implemented by the above-described access management system. However, it should be noted that the access management method to be described below need not be necessarily operated in the access management system having the above-described configuration and function and may also be applied to an access management system having a different configuration from the above-described access management system.

<Access Control in Access Management System>

Figure 7:
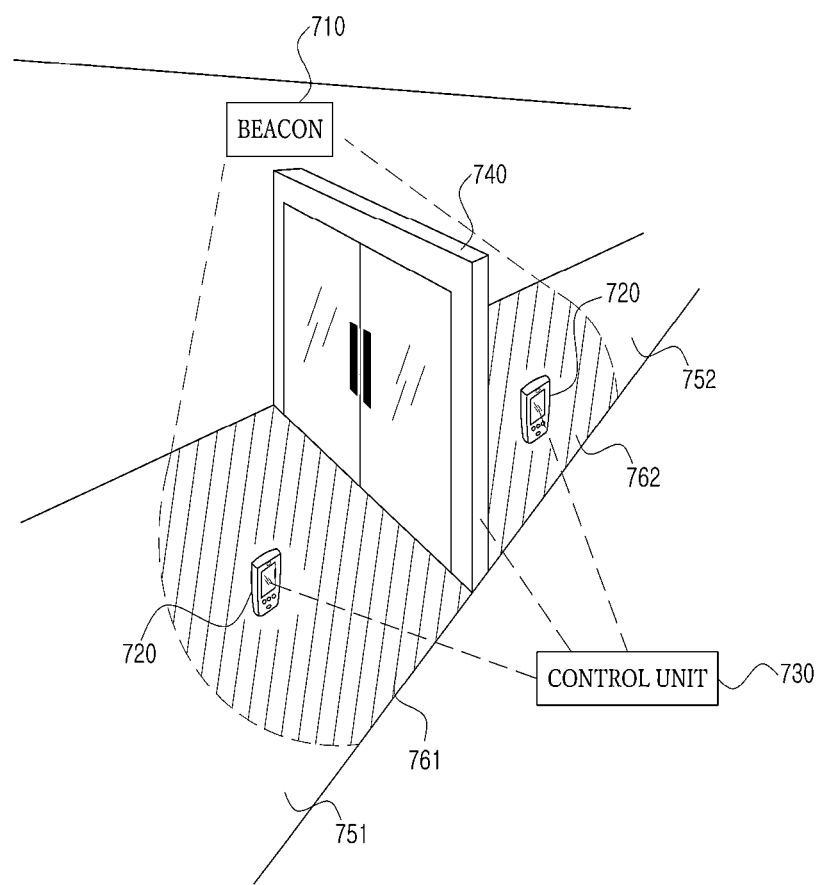
FIG. 7 is a diagram for describing an access control in an access management system according to an embodiment.

FIG. 7 is a diagram for describing an access control in an access management system according to an embodiment.

Referring to FIG. 7, an access management system may include a beacon 710, a terminal 720, and a control unit 730.

In particular, FIG. 7 shows a system in which the beacon 710 and a door 740 correspond to each other on a one-to-one basis. Also, the terminal 720 shown in FIG. 7 is a device that a user carries, and the user is not shown in FIG. 7.

An outer side 751 and an inner side 752 may be divided by the door 740. In particular, a door proximity region 761 determined on the basis of the beacon 710 may be further defined at the outer side 751. When it is determined that the terminal 720 has entered the door proximity region 761 at the outer side 751, a predetermined access management operation may be initiated. Similarly, a door proximity region 762 determined on the basis of the beacon 710 may be further defined at the inner side 752. When it is determined that the terminal 720 has entered the door proximity region 761 at the outer side 751, the predetermined access management operation may be initiated.

The sum of the door proximity region 761 at the outer side 751 and the door proximity region 762 at the inner side 752 may be smaller than a broadcasting range of the beacon 710.

When the beacon 710 is disposed to be biased to the inner side 752 or the outer side 751 with respect to the door 740, the door proximity region 761 at the outer side 751 and the door proximity region 762 at the inner side 752 may be asymmetrical about the door 740. That is, when the beacon 710 is disposed at the outer side 751 with respect to the door 740, the door proximity region 761 at the outer side 751 with respect to the door 740 may be greater than the door proximity region 762 at the inner side 752 with respect to the door 740.

According to some embodiments of the present disclosure, unlike the conventional access management system, the user authentication information for determining access authority of the user may be acquired by the terminal 720 the user carries instead of being acquired by a fixed device that is installed near the door.

A program for performing an access management operation may be installed in the terminal 720 according to the present disclosure. According to some embodiments of the present disclosure, when the terminal 720 receives the beacon data, the program may be executed to start a series of operations for the access management operation according to the present disclosure.

When the terminal 720 receives the beacon data, the terminal 720 may appropriately process the beacon data and then transmit information for the access management operation to the control unit 730 according to the present disclosure or, alternatively, may transmit the beacon data to the control unit 730 without special processing.

Figure 8:
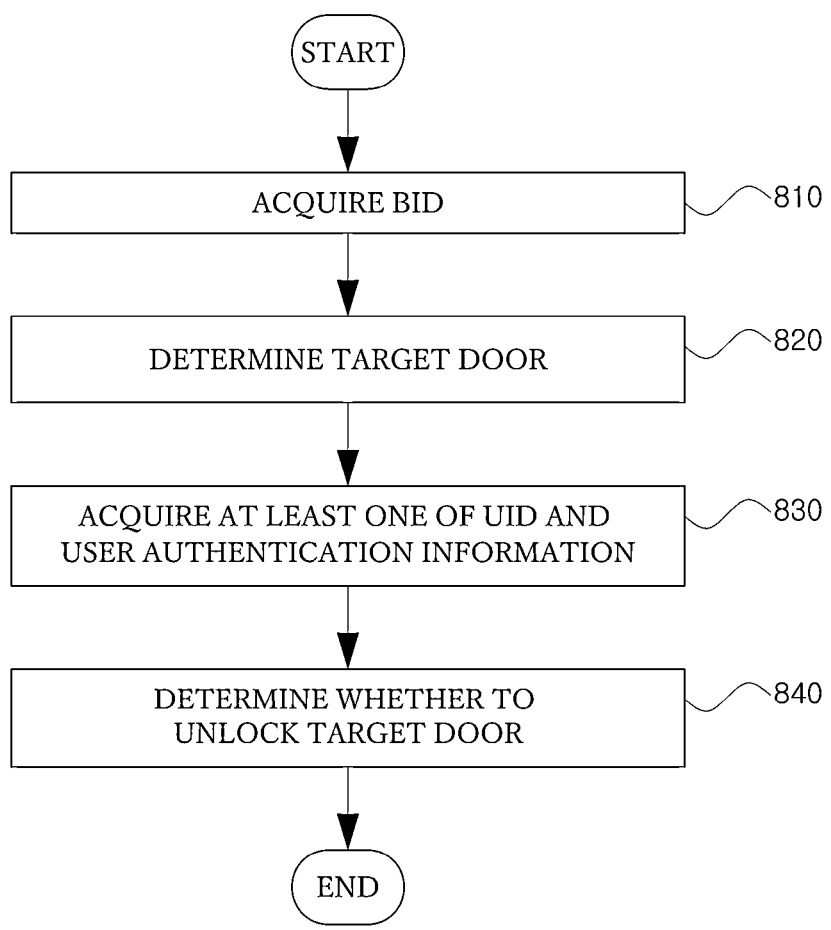
FIG. 8 is a flowchart for describing an access management method according to an embodiment.

FIG. 8 is a flowchart for describing an access management method according to an embodiment.

Referring to FIG. 8, an access management method according to some embodiments of the present disclosure includes acquiring a BID (S810), determining a target door on which an lock/unlock control operation is to be performed on the basis of the acquired BID (S820), acquiring at least one of a UID and user authentication information (S830), and determining whether to unlock the target door on the basis of the acquired at least one of the UID and the user authentication (S840). The steps of the access management method will be described below in detail.

According to some embodiments of the present disclosure, the step of acquiring the BID (S810) may be performed. The step of acquiring the BID (S810) may be initiated by the terminal 720. As described above, the terminal 720 may acquire the BID from beacon data included in a signal transmitted by the beacon 710. Finally, the BID acquired by the terminal 720 may be transmitted to the above-described user access authority determination unit 130. When the user access authority determination unit 130 is implemented in a server (e.g., a server that may be included in the control unit 730) as described above, the BID may be finally transmitted to the server. This may be regarded as a request made by the terminal 720 to the server to access a door corresponding to the BID. Alternatively, when the user access authority determination unit 130 is implemented to be included in the terminal 720, the BID need not be transmitted to another external device.

Next, according to some embodiments of the present disclosure, the step of determining a target door on which a lock/unlock control operation is to be performed on the basis of the acquired BID (S820) may be performed.

The step of determining the target door (S820) may be performed by the user access authority determination unit 130. That is, when the user access authority determination unit 130 is implemented in the above-described server (e.g., the server included in the control unit 730), the step of determining the target door (S820) may be performed by the server. On the other hand, when the user access authority determination unit 130 is configured to be included in the terminal 720, the step of determining the target door (S820) may be performed by the terminal 720.

In detail, the step of determining the target door (S820) may be performed on the basis of the BID by the following method.

In order to implement an access management determination method according to some embodiments of the present disclosure, a database in which a plurality of BIDs match information regarding doors corresponding to beacons 710 having the plurality of BIDs should be implemented, and the user access authority determination unit 130 may access the database. For example, the user access authority determination unit 130 may include the database and may be configured to communicate with the database to transmit and receive necessary information.

In this case, the user access authority determination unit 130 may acquire information regarding a door that is stored while matching the beacon 710 having the acquired BID on the basis of the acquired BID. The information regarding the door may be a DID or may also be identification information of a locking unit installed in the door. In this case, among the plurality of doors in information regarding the plurality of doors stored in the database, a door matching the acquired BID is the target door.

According to some embodiments of the present disclosure, the step of acquiring at least one of the UID and the user authentication information (S830) may be performed. Step S830 may be performed after the above-described steps S810 and S820. However, embodiments of the present disclosure are not limited thereto, and it should be noted that step S830 may be performed at the same time as step 810 or performed between steps S810 and S820.

i) The UID and the user authentication information may be initially acquired by the terminal 720, or ii) only the user authentication information may be initially acquired by the terminal 720 and the UID may be acquired by the user access authority determination unit 130. This will be described in detail below.

First, according to some embodiments of the present disclosure, the UID and the user authentication information may be initially acquired by the terminal 720.

Here, the terminal 720 acquiring the UID may denote an operation of reading out a UID stored in a memory of the terminal 720. The terminal 720 acquiring the user authentication information may denote receiving the user authentication information (e.g., a fingerprint, a specific gesture, a specific pattern, and a password of the user) from the user by the above-described authentication information acquisition unit 330.

The UID and the user authentication information acquired by the terminal 720 may be transmitted to the user access authority determination unit 130. When the user access authority determination unit 130 is implemented in a server (e.g., a server that may be included in the control unit 730), as described above, the UID and the user authentication information may be finally transmitted to the server. Alternatively, when the user access authority determination unit 130 is implemented to be included in the terminal 720, the UID and the user authentication information need not be transmitted to another external device. Thus, the user access authority determination unit 130 may acquire the UID and the user authentication information by receiving the UID and the user authentication information from the terminal 720.

Also, according to other embodiments of the present disclosure, the user authentication information may be initially acquired by the terminal 720, and the UID may be acquired by the user access authority determination unit 130 on the basis of the user authentication information.

Here, the user access authority determination unit 130 acquiring the UID on the basis of the user authentication information may denote that the user access authority determination unit 130 acquires the UID using a result of a user authentication operation that is based on the user authentication information.

In detail, the user access authority determination unit 130 may compare the acquired user authentication information with the above-described user authentication information stored in the database to perform the user authentication operation on the basis of the acquired user authentication information. That is, the user authentication information (e.g., a fingerprint, a specific gesture, a specific pattern, and a specific password of the user) acquired through the terminal 720 may be determined to match the user authentication information prestored in the database. In this case, in order to determine whether the acquired user fingerprint matches a stored user fingerprint, conventional fingerprint recognition technology may be applied. A detailed description of the fingerprint recognition technology may unnecessarily obscure the technical spirit of the present disclosure and thus will be omitted. In addition, in order to determine whether the acquired gesture information matches stored gesture information, conventional gesture recognition technology may be applied. A detailed description of the gesture recognition technology may unnecessarily obscure the technical spirit of the present disclosure and thus will be omitted herein.

When it is determined that the acquired user authentication information matches the stored user authentication information, that is, when the user is authenticated as an authentication result of the user authentication operation, the user access authority determination unit 130 may extract a UID of the user among a plurality of UIDs from a database in which the plurality of UIDs are stored. That is, the user authentication operation may serve as a preprocessing operation for extracting the UID of the user. In addition, when it is determined that the acquired user authentication information does not match the stored user authentication information, that is, when the user is not authenticated as an authentication result of the user authentication operation, the user access authority determination unit 130 may not extract a UID of the user from the database.

In addition, as described above, the UID may be acquired by the user access authority determination unit 130. When the user access authority determination unit 130 is implemented to be included in the terminal 720 as described above, the terminal 720 may perform the user authentication operation to acquire the UID. In addition, the UID may not be transmitted to another external device. However, as necessary, the UID may be transmitted to another external device (e.g., a server).

In addition, as described above, the UID may be acquired by the server (e.g., a server that may be included in the control unit 730). i) The server may acquire the user authentication information from the terminal 720 and perform the user authentication operation to acquire the UID.

In addition, according to a security policy of an operating system of the terminal 720, the user authentication information acquired from the terminal 720 may not be transferred to an external device. ii) In this case, the server may acquire an authentication result of a user authentication operation performed by the terminal 720 rather than the user authentication information. When it is confirmed from the acquired authentication result that the user is authenticated, the server may extract the UID from the above-described database. When it is confirmed from the acquired authentication result that the user is not authenticated, the server may not extract the UID from the above-described database. iii) Also, the server may receive the UID from the terminal 720 in which the user authentication operation has been performed.

The UID and the user authentication information need not be acquired simultaneously. In addition, the UID and the user authentication information need not be transmitted simultaneously to the user access authority determination unit 130. For example, the UID may be first acquired at a first time point, and the user authentication information may be acquired at a second time point that is later than the first time point. Furthermore, when the UID and the user authentication information need to be transmitted to another external device (e.g., a user access authority determination unit implemented in a server), the UID may be first transmitted to the external device at a third time point, and the user authentication information may be transmitted to the external device at a fourth time point later than the third time point.

In addition, not all of the UID and the user authentication information need to be acquired. In order to perform step S840, the user access authority determination unit 130 may acquire only the UID or only the user authentication information as necessary.

Next, according to some embodiments of the present disclosure, the step of determining whether to unlock the target door (S840) may be performed on the basis of the acquired at least one of the UID and the user authentication information.

When the user authentication operation is not performed in step S830, step S840 may include a user authentication operation. In this case, the user authentication operation may be performed in order to determine whether to unlock the target door. On the other hand, when the user authentication operation is performed in step S830, that is, when the user authentication operation is performed to acquire the UID, step S840 may not include the user authentication operation. The two cases will be described in detail below.

First, when the user authentication operation is not performed in step S830, step S840 may include the above-described user authentication operation. That is, through the user authentication operation, according to an embodiment of the present disclosure, step S840 may be performed by authenticating a user who desires to pass through the target door.

Step S840 may be performed by the user access authority determination unit 130. The user access authority determination unit 130 may perform the step of determining whether to unlock the door on the basis of the UID and the user authentication information in the following method.

The acquired UID may be compared with the plurality of UIDs registered in the above-described database. Whether the acquired UID is included in the plurality of UIDs may be determined. When the acquired UID is included in the plurality of UIDs, the user access authority determination unit 130 may determine that the user of the terminal 720 is a user who is normally registered in the access management system according to an embodiment of the present disclosure.

In some embodiments of the present disclosure, a plurality of doors may be installed, and a user of a terminal that may access each of the plurality of doors may be predetermined. For example, among the plurality of doors, a user of the terminal 720 may be set to pass through a first door and not to pass through a second door.

For this, a UID of the user of the terminal that may pass through each of the plurality of doors may be predetermined in the above-described database. In this case, the user access authority determination unit 130 may determine whether the UID of the user of the terminal 720 is included in UIDs of users who may pass through the target door from the above-described database. When the UID of the user of the terminal 720 is included, the user access authority determination unit 130 may determine that the user of the terminal 720 may access the target door.

In addition, information regarding accessible doors that may be accessed by a user of a specific UID may be prestored in the above-described database. In this case, the user access authority determination unit 130 may use the UID of the user of the terminal 720 to determine whether the user of the terminal 720 can access the target door from the information regarding the accessible doors.

In addition, the user access authority determination unit 130 may compare the acquired user authentication information with the user authentication information matching the acquired UID that is stored in the database to perform the user authentication operation. The description of step S830 may be applied to the user authentication operation, and thus a detailed description thereof will be omitted.

Thus, when a user who desires to pass through the target door is normally authenticated as a result of the user authentication operation, the user access authority determination unit 130 may determine that the target door is allowed to be unlocked. Thus, the above-described door unlock control operation may be performed.

In addition, when the user authentication operation is performed in step S830, step S840 may not include the user authentication operation. In detail, in step S830, the user authentication operation is performed to acquire the UID as the authentication result of the user authentication operation. In step S840, whether to unlock the target door may be determined on the basis of the UID.

Step S840 may be performed by the user access authority determination unit 130. When the user access authority determination unit 130 acquires the UID, the user access authority determination unit 130 may determine to unlock the target door in response to the acquisition of the UID.

In detail, the UID may be extracted among the plurality of UIDs registered in the above-described database. Since the UID is extracted, the user access authority determination unit 130 may determine that the user of the terminal 720 is a user who is normally registered in the access management system according to an embodiment of the present disclosure.

In addition, when the plurality of doors are installed, as described above, the user access authority determination unit 130 may determine whether the UID of the user of the terminal 720 is included in UIDs of users who can pass through the target door from the database. When the UID of the user of the terminal 720 is included, the user access authority determination unit 130 may determine that the user of the terminal 720 is accessible to the target door. In addition, the user access authority determination unit 130 may use the UID of the user of the terminal 720 to determine whether the user of the terminal 720 can access the target door from the information regarding the accessible doors stored in the database.

Also, as the user authentication operation is performed in step S830, it may be omitted in step S840. It should be appreciated that, as necessary, the user authentication operation may be performed in step S840 to determine whether to unlock the target door according to an authentication result of the user authentication operation even though the user authentication operation is performed in step S830.

Also, in some embodiments of the present disclosure, when the user authentication operation is performed in step S830 or step S840, the user authentication information may not be acquired for a predetermined time. This is to enhance user convenience. For example, when the user authentication operation is performed once upon an entrance to an office, the user authentication information may not be acquired during his/her working hours (or before the user leaves the office).

In detail, in step S830 or step S840, during a predetermined authentication omission time after the user authentication operation is performed, the user authentication operation may be performed using user authentication information that was acquired through the user authentication operation performed before the predetermined authentication omission time.

In addition, the user access authority determination unit 130 may not perform the user authentication operation during the predetermined time. For example, when it is determined that the user is a user who is normally registered in the access management system, the user access authority determination unit 130 may determine to unlock the target door without performing the user authentication operation or acquiring authentication result information indicating whether the user authentication information matches pre-stored user authentication information.

Subsequently, after a predetermined use omission time, the user authentication information may be acquired to perform the user authentication operation in step S830 or step S840.

In addition, when it is determined that the target door is allowed to be unlocked, the terminal 720 may inform the user that the target door is to be unlocked. For example, the terminal 720 may output a predetermined GUI that informs that the target door is to be unlocked through the video output unit.

On the other hand, when the user who desires to pass through the target door is not normally authenticated as a result of the user authentication operation, for example, when it is determined that the acquired UID is not found in the database or when it is determined that the acquired user authentication information does not match the stored user authentication information, the door unlock control operation for unlocking the target door should not be performed.

Various modifications of the access management methods according to some embodiments of the present disclosure will be described below with reference to FIGS. 9 to 12.

Figure 9:
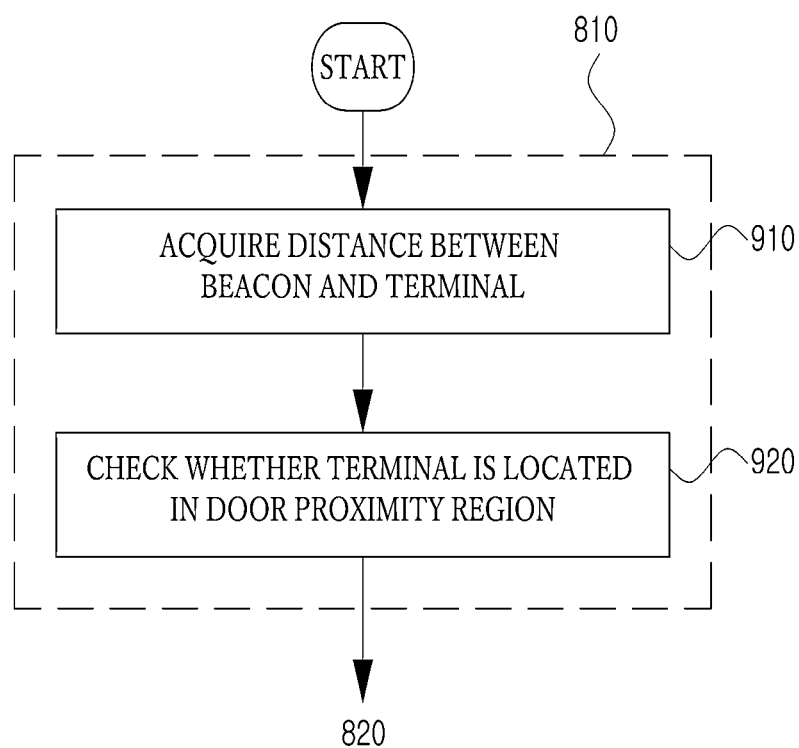
FIG. 9 is a flowchart for describing step S810 of FIG. 8 in detail.

FIG. 9 is a flowchart for describing step S810 of FIG. 8 in detail.

In some embodiments, the step of acquiring the BID (S810) may include checking a distance between the beacon 710 and the terminal 720 (S910) and determining whether the terminal 720 is located in a door proximity region (S920). The steps of step S810 will be described below in detail.

According to some embodiments of the present disclosure, a step of checking a distance between the beacon 710 and the terminal 720 may be performed. Step S910 may be performed by the user access authority determination unit 130. As described in step S810, the user access authority determination unit 130 may acquire the BID.

The user access authority determination unit 130 may use a received-signal strength measured by the terminal 120 and transmission power information included in beacon data to identify the beacon 710 and the terminal 720.

For this, the user access authority determination unit 130 may acquire the received-signal strength and the transmission power information. As described above, the terminal 720 may receive a signal transmitted by the beacon 710. In this case, the terminal 720 may measure a strength of the received signal to acquire the received-signal strength. In addition, the terminal 720 may extract the transmission power information from the beacon data included in the signal transmitted by the beacon 710. Finally, the received-signal strength and the transmission power information acquired by the terminal 720 may be transmitted to the above-described user access authority determination unit 130. When the user access authority determination unit 130 is implemented in a server (e.g., a server that may be included in the control unit 730) as described above, the received-signal strength and the transmission power information may be finally transmitted to the server. Alternatively, the terminal 720 may not extract the transmission power information from the beacon data included in the signal transmitted by the beacon 710. In this case, the terminal 720 may transmit the beacon data to the server, and the server may extract the transmission power information from the beacon data. In addition, when the user access authority determination unit 130 is implemented to be included in the terminal 720, the received-signal strength and the transmission power information need not be transmitted to another external device.

Also, the user access authority determination unit 130 may calculate a distance between the beacon 710 and the terminal 720 using a relationship between the received-signal strength and the transmission power information. For example, similarly to the above-described tx power level, the transmission power information may include information regarding a received-signal strength at a time point when the terminal 720 receives the signal transmitted by the beacon 710 at a certain distance from the beacon 710. As a detailed example, the user access authority determination unit 130 may check that a received-signal strength measured by the terminal 720 is −50 dBm through the received-signal strength, and may check that a received-signal strength measured at a distance of 1 m from the beacon 710 is −34 dBm through the transmission power information. In this case, the user access authority determination unit 130 may calculate a distance between the beacon 710 and the terminal 720 using the relationship between the measured received-signal strength and the received-signal strength extracted from the transmission power information. A detailed description of the distance calculation operation may unnecessarily obscure the technical spirit of the present disclosure and thus will be omitted herein.

In addition, according to some embodiments of the present disclosure, a step of determining whether the terminal 720 is located in a door proximity region (S920) may be performed.

In an embodiment, the door proximity region may be set on the basis of the beacon 710. When the distance between the beacon 710 and the terminal 720, which is checked in step S910, is equal to or less than a distance between the beacon 710 and a boundary of the door proximity region, the user access authority determination unit 130 may determine that the terminal 720 is located in the door proximity region.

According to some embodiments of the present disclosure, the BID may be transmitted to the user access authority determination unit 130 only when the distance between the beacon 710 and the terminal 720 is within the door proximity region instead of being unconditionally transmitted from the terminal 720 to the user access authority determination unit 130.

When it is determined that the terminal 720 is located in the door proximity region, the terminal 720 may execute a terminal-related access management program installed in the terminal 720 in a foreground to perform the above-described access management method. In this case, the terminal-related access management program installed in the terminal 720 may be executed in a background inside the terminal 720. While the terminal-related access management program is executed in the background, the terminal 720 may selectively perform an operation of determining whether the BID is received and transmitting the received BID to the user access authority determination unit and/or an operation of determining whether the terminal is located in the door proximity region when the BID is received.

Also, in some embodiments of the present disclosure, when it is determined that the terminal 720 is located in the door proximity region, the user access authority determination unit 130 may inform that the terminal 720 is located in the door proximity region. For example, the user access authority determination unit 130 may visually inform that the terminal 720 is located in the door proximity region through the video output unit, may acoustically inform that the terminal 720 is located in the door proximity region through the audio output unit, or may generate vibration of the terminal 720 to inform that the terminal 720 is located in the door proximity region.

In some embodiments, communication of the terminal 720 may be deactivated. In this case, the terminal 720 cannot receive the BID from the beacon 710.

In this case, the terminal 720 may receive a communication activation signal from the beacon 710 or an external device (e.g., a speaker controlled by the server). The communication activation signal denotes a signal for triggering communication activation of the terminal 720 and may be a signal that performs control to activate a deactivated communication interface of the terminal 720.

As a more detailed example, the communication activation signal may be a data signal or a sound signal that may be transmitted or received through an activated communication interface other than the deactivated communication interface. When the communication activation signal is a sound signal, the sound signal may include a high-frequency signal or a low-frequency signal which cannot be heard by the human ear, and the terminal 720 may use a microphone of the user input unit 320 described in FIG. 3 to acquire the sound signal. According to the communication activation signal, the terminal 720 may receive the BID from the beacon 710 by activating the deactivated communication interface.

In some embodiments, in order to acquire the user authentication information, the terminal 720 may activate an authentication information acquisition unit. In this case, in order to inform the user that the authentication information acquisition unit is activated and ready to receive the user authentication information, the terminal 720 may output a predetermined GUI for receiving the user authentication information through the video output unit. However, the GUI need not be necessarily output through the video output unit, and only the authentication information acquisition unit may be activated.

When the terminal 720 should be unlocked in order to operate the terminal because the terminal 720 is in a standby status, the status of the terminal 720 may be exceptionally controlled such that the user authentication information may be acquired through the authentication information acquisition unit without unlocking the terminal 720 at the same time that the authentication information acquisition unit is activated.

Figure 10:
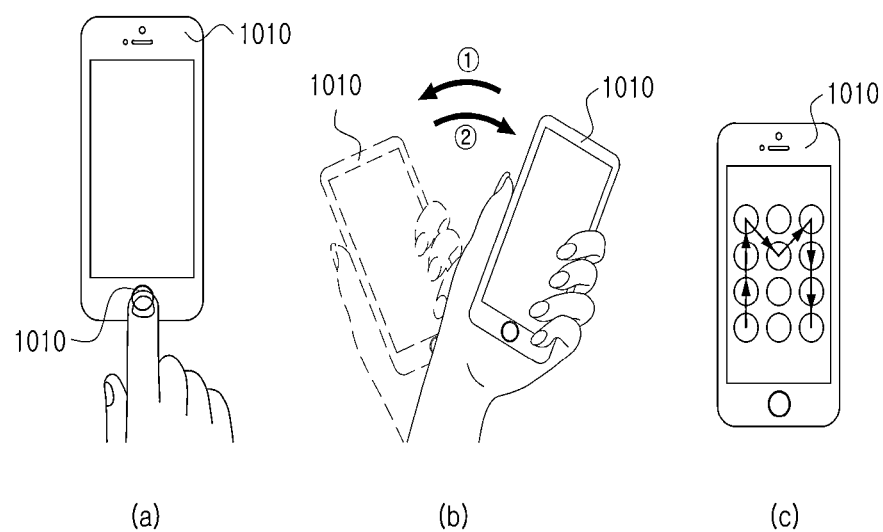
FIG. 10 is a diagram for describing a user authentication operation according to an embodiment.

FIG. 10 is a diagram for describing a method of acquiring user authentication information from a user in order to perform a user authentication operation according to an embodiment.

Referring to FIG. 10, a terminal 1010 of FIG. 10 may indicate an example of the terminal 300 of FIG. 3 and the terminal 720 of FIG. 7.

Referring to (a), the terminal 1010 may include a fingerprint sensor 1011 for recognizing a fingerprint of a user. The terminal 1010 may acquire fingerprint information of the user through the fingerprint sensor 1011 and may transmit the acquired fingerprint information to the user access authority determination unit 130.

Referring to (b), the terminal 1010 may include a motion recognition sensor for recognizing a movement of the terminal 1010 according to a movement of the user. In some embodiments of the present disclosure, the motion recognition sensor may include an acceleration sensor, a gyro sensor, a geomagnetic sensor, etc. For example, the user may move the terminal 1010 according to a specific pattern, and the terminal 1010 may sense the movement of the terminal 1010 through the motion recognition sensor. Thus, the terminal 1010 may transmit information regarding a sensed lateral movement to the user access authority determination unit 130. Hereinafter, a result of sensing the movement of the terminal 1010 by the movement of the user may be referred to as a gesture.

Referring to (c), the terminal 1010 may output a predetermined GUI for receiving pattern information through the video output unit 352 of FIG. 3. The terminal 1010 may receive the pattern information from the user through the user input unit 320 of FIG. 3 and may transmit the acquired pattern information to the user access authority determination unit 130.

Figure 11:
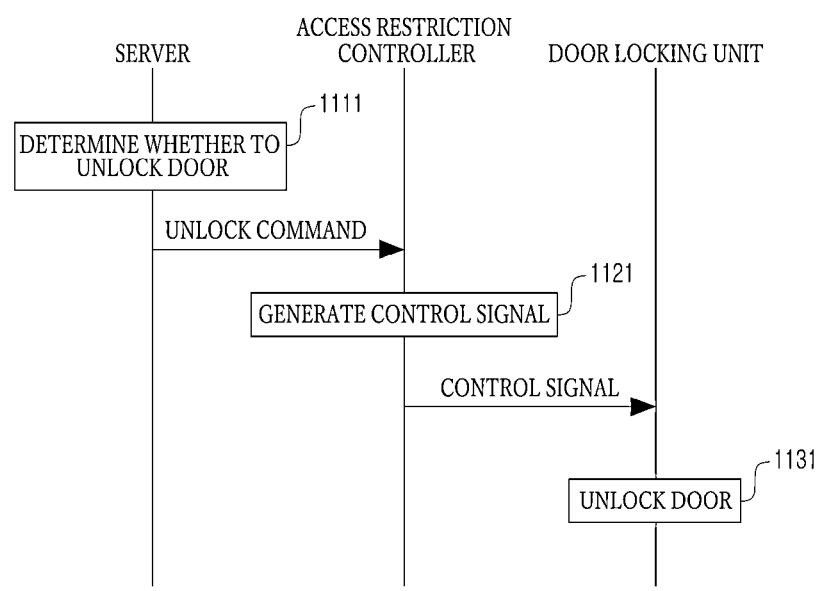
FIG. 11 is a flowchart for describing an unlock control operation according to an embodiment.

FIG. 11 is a flowchart for describing an unlock control operation according to an embodiment.

Referring to FIG. 11, according to some embodiments of the present disclosure, the user access authority determination unit 130 may be included in a server. The server may determine whether to unlock the door according to the steps described above in FIGS. 8 and 9 (S1111).

When the door is determined to be unlocked, the server may generate an unlock command for unlocking the door and transmit the generated unlock command to an access restriction controller.

The access restriction controller may receive the unlock command from the server and generate a control signal according to the received unlock command (S1121). The access restriction controller may transmit the generated control signal to a locking unit.

A door locking unit may perform a door unlock control operation according to the received control signal (S1131). The door locking unit may physically control the locking means 630 of FIG. 6 to unlock the door. According to such an embodiment, even in an environment in which the door locking unit is controlled by the access restriction controller as is generally used, the access management system according to the present disclosure may be implemented using a pre-installed device without needing to replace the door locking unit or the access restriction controller (e.g., without installing a wireless communication interface capable of communicating with the server in the door locking unit), thus saving an establishment cost of the access management system.

Figure 12:
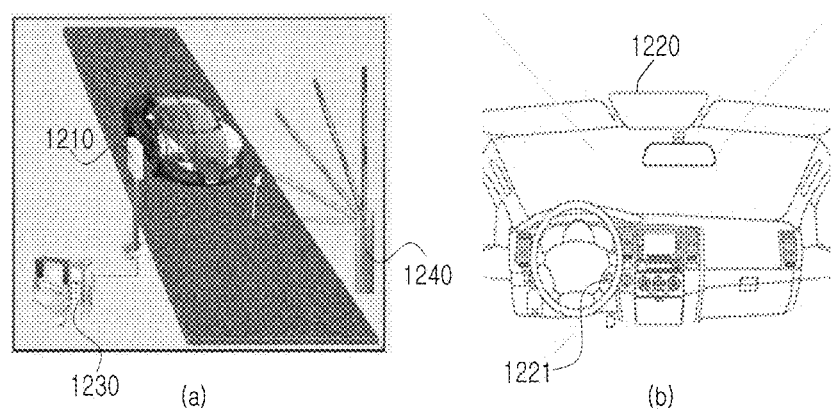
FIG. 12 is a diagram for describing an access control in an access management system according to another embodiment.

FIG. 12 is a diagram for describing an access control in an access management system according to another embodiment.

Referring to FIG. 12, an access management system may include a beacon 1210, a vehicle 1220, and a server 1230. The vehicle 1220 shown in FIG. 12 is an apparatus in which a user rides, and the user is not shown in FIG. 12. In addition, the above-described user access authority determination unit 130 may be included in the server 1230.

Referring to (a), the vehicle 1220 may be an example of the terminal 300 shown in FIG. 3. The vehicle 1220 may communicate with the server 1230 using the communication interface 310 of FIG. 3. Conventional vehicle communication technology (that is, telematics) may be applied to a communication scheme between the vehicle 1220 and the server 1230. A detailed description of the vehicle communication technology may unnecessarily obscure the technical spirit of the present disclosure and thus will be omitted herein.

Also, the vehicle 1220 may acquire beacon data from the beacon 1210. The vehicle 1220 may acquire a BID from the beacon data. As described above in FIG. 8, the server 1230 may acquire the BID and determine a target door 1240 on which a lock/unlock control operation is to be performed on the basis of the BID.

In addition, as shown in (b), the vehicle 1220 may include a fingerprint sensor 1221, and the vehicle 1220 may acquire user authentication information through the fingerprint sensor 1221. As described above in FIG. 8, the server 1230 may acquire at least one of a UID and the user authentication information of the user who rides in the vehicle 1220 and may determine whether to unlock the target door 1240 on the basis of the at least one of the UID and the user authentication information.

When the server 1230 determines to unlock the door, the server 1230 may generate an unlock command. The target door 1240 may acquire the unlock command and be unlocked.

<Access Authentication Process Determination Method>

Figure 13:
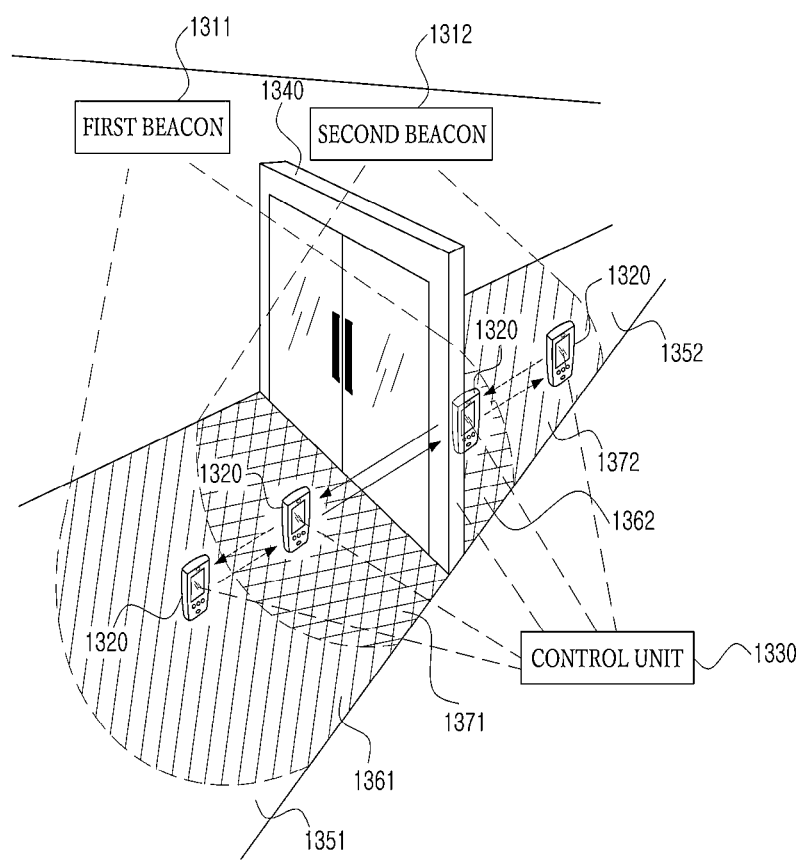
FIG. 13 is a diagram for describing an access authentication process determination method in an access management system when there is a plurality of beacons according to an embodiment.

FIG. 13 is a diagram for describing an access authentication process determination method in an access management system when there is a plurality of beacons according to an embodiment.

Referring to FIG. 13, an access management system may include a first beacon 1311, a second beacon 1312, a terminal 1320, and a control unit 1330.

In particular, FIG. 13 shows a system in which the first beacon 1311 and the second beacon 1312 correspond to a door 1340 on a two-to-one basis. In addition, the terminal 1320 shown in FIG. 13 is a device that a user carries, and the user is not shown in FIG. 13.

An outer side 1351 and an inner side 1352 may be divided by the door 1340. In embodiments of the present disclosure, the user of the terminal 1320 moving from the outer side 1351 to the inner side 1352 with respect to the door 1340 may be defined as entry while the user of the terminal 1320 moving from the inner side 1352 to the outer side 1351 with respect to the door 1340 may be defined as exit.

In addition, the outer side 1351 may include a broadcasting range 1361 of the first beacon and a region 1371 in which the broadcasting range of the first beacon overlaps a broadcasting range of the second beacon. Similarly, the inner side 1352 may include a broadcasting range 1362 of the second beacon and a region 1362 in which the broadcasting range of the first beacon overlaps the broadcasting range of the second beacon.

Also, in some embodiments of the present disclosure, door proximity regions 1361, 1362, 1371, and 1372 may be set on the basis of the first beacon 1311 and the second beacon 1312.

When it is determined that the terminal 1320 has entered the door proximity region 1361, 1362, 1371, or 1372, a predetermined access management operation may be initiated. FIG. 13 shows that the door proximity regions 1361, 1362, 1371, and 1372 match the broadcasting ranges of the first beacon and the second beacon. However, in some embodiments of the present disclosure, the sum of the door proximity regions 1361, 1362, 1371, and 1372 may be smaller than the broadcasting ranges of the first beacon and the second beacon.

When the predetermined access management operation is initiated because the user of the terminal 1320 enters the door proximity region 1361, 1362, 1371, or 1372, a door access authority authentication operation may be performed.

Along with this, as necessary, the user authentication operation may be performed. In this case, the terminal 1320 may also transmit the user authentication information to the control unit 1330 together. For example, according to various embodiments of the present disclosure, a predetermined user authentication operation may be required when the user desires to enter through the door 1340 and may not be required in order to unlock the door when the user desires to exit through the door 1340. That is, different access management operations may be applied to entry and exit. On a condition that the user of the terminal 1320 desires to enter through the door 1340, an authority authentication operation is necessarily needed for the user of the terminal 1320 because the inner side 1352 is a region that only an authorized user who has access authority is allowed to enter. On the other hand, on a condition that the user of the terminal 1320 desires to exit through the door 1340, the exit may be allowed without a separate determination of special access authority. Thus, the user authentication operation may not be performed.

Accordingly, the terminal 1320 may self-determine which access management operation is to be performed on the basis of a variety of information and data. Alternatively, an external device (e.g., a control unit) may receive a determination result for an access management operation needed for a current situation and then perform an appropriate access management operation according to the determination result. The control unit 1330 may perform a series of operations for unlocking the door 1340 on the basis of the beacon data or information received from the terminal 1320.

For example, the control unit 1330 may determine whether the user of the terminal 1320 desires to enter or exit through the door 1340.

As another example, the control unit 1330 may determine whether the user authentication operation is to be performed before the door 1340 is unlocked in consideration of a variety of information and situations.

However, whether to require the user authentication operation selectively depending on the entry or the exit may be determined by a security policy. Thus, the user authentication operation may not necessarily be required selectively depending on the exit or the entry.

Figure 14:
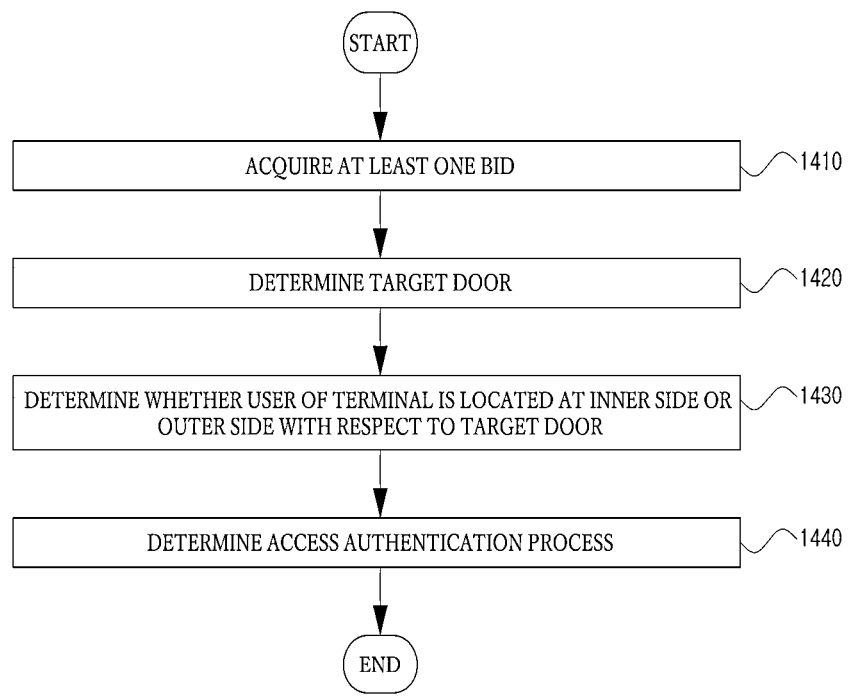
FIG. 14 is a flowchart showing an access authentication process determination method according to an embodiment.

FIG. 14 is a flowchart showing an access authentication process determination method according to an embodiment.

Referring to FIG. 14, an access authentication process determination method according to some embodiments of the present disclosure may include acquiring at least one or more BIDs (S1410), determining a target door on which a lock/unlock control operation is to be performed using the acquired BIDs (S1420), determining whether a user of a terminal is located at an outer side or an inner side through the target door on the basis of the number of acquired BIDs and distances between a beacon and a terminal corresponding to the acquired BIDs (S1430), and determining an access authentication process on the basis of whether the user of the terminal is located at the outer side or the inner side with respect to the target door (S1440). The steps of the access authentication process determination method will be described below in detail.

According to some embodiments of the present disclosure, the step of acquiring at least one or more BIDs (S1410) may be performed.

The step of acquiring at least one or more BIDs (S1410) may be initiated by the terminal 1320. The terminal 1320 may acquire a first BID from first beacon data included in a signal transmitted by the first beacon 1311 and may acquire a second BID from second beacon data included in a signal transmitted by the second beacon 1312. A type of BID acquired by the terminal 1320 may vary depending on the position of the terminal 1320. In the example of FIG. 13, when the terminal 1320 is located in the broadcasting range 1361 of the first beacon 1311, the terminal 1320 may acquire the first BID. When the terminal 1320 is located in the broadcasting range 1372 of the second beacon 1312, the terminal 1320 may acquire the second BID. When the terminal 1320 is located in the region 1371 or 1362 in which the broadcasting range of the first beacon 1311 overlaps the broadcasting range of the second beacon 1312, the terminal 1320 may acquire the second BID together with the first BID.

The BID acquired by the terminal 1320 may be finally transmitted to the above-described user access authority determination unit 130. When the user access authority determination unit 130 is implemented in a server (e.g., a server that may be included in the control unit 730) as described above, the BID may be finally transmitted to the server. This may be regarded as a request made by the terminal 1320 to the server for accessing a door corresponding to the BID. Alternatively, when the user access authority determination unit 130 is implemented to be included in the terminal 1320, the BID need not be transmitted to another external device.

In addition, according to some embodiments of the present disclosure, the step of determining a target door on which a lock/unlock control operation is to be performed on the basis of the acquired BID (S1420) may be performed.

The step of determining a target door (S1420) may be performed by the user access authority determination unit 130. That is, when the user access authority determination unit 130 is implemented in the above-described server (e.g., a server included in the control unit 1330), the step of determining a target door (S1420) may be performed by the server. On the other hand, when the user access authority determination unit 130 is configured to be included in the terminal 1320, the step of determining a target door (S1420) may be performed by the terminal 1320.

In order to implement an access authentication process determination method according to embodiments of the present disclosure, the user access authority determination unit 130 may access the database described in step S820 of FIG. 8. The database may include information regarding doors corresponding to the beacons 1311 and 1312 having a plurality of BIDs. The user access authority determination unit 130 may extract identification information of a door matching the acquired BID from the database.

For example, in an example of FIG. 13, information in which the first BID and the second BID match the door 1340 (or information in which the first BID and the second BID match identification information assigned to a locking unit corresponding to the door 1340) may be stored in the database.

When the terminal 1320 acquires at least one of the first BID and the second BID, the user access authority determination unit 130 may use the database to determine the door 1340 as the target door. When the terminal 1320 is located outside the region 1361, 1362, 1371, or 1372 and thus does not acquire a BID or when the terminal 1320 acquires a BID other than the first BID and the second BID, the user access authority determination unit 130 may not determine the door 1340 as the target door.

In addition, according to some embodiments of the present disclosure, the step of determining whether a user of a terminal is located at an outer side or an inner side with respect to the target door on the basis of the number of acquired BIDs and distances between a terminal and beacons corresponding to the acquired BIDs (S1430) may be performed. Step S1430 may be performed by the user access authority determination unit 130.

In some embodiments, on a condition that a plurality of beacons are located near a door, when the number of acquired BIDs is one, the user access authority determination unit 130 may determine whether the user of the terminal is located at an outer side or an inner side with respect to the door using the acquired BID. For example, information regarding BIDs that may be acquired by the terminal at the outer side or the inner side with respect to the door may be stored in the database, and the user access authority determination unit 130 may determine whether the user of the terminal is located at the outer side or the inner side with respect to the door using the database. As a detailed example, in the example of FIG. 13, information indicating that only the first BID or both of the first BID and the second BID are acquired from the outer side with respect to the door 1340 may be stored. Also, information indicating that only the second BID or both of the first BID and the second BID are acquired from the inner side with respect to the door 1340 may be stored. When the terminal 1320 acquires only the first BID, the user access authority determination unit 130 may acquire information indicating that the terminal 1320 is located at the outer side of the door from the database. When the terminal 1320 acquires only the second BID, the user access authority determination unit 130 may acquire information indicating that the terminal 1320 is located at the inner side with respect to the door from the database.

In other embodiments, on a condition that a plurality of beacons are located near a door, when the number of BIDs acquired is two or more, the user access authority determination unit 130 may determine whether the user of the terminal is located at an outer side or an inner side with respect to the target door on the basis of distances between a terminal and beacons corresponding to the acquired BIDs. For this, the user access authority determination unit 130 may use a received-signal strength measured by the terminal 1320 and transmission power information included in beacon data to check the distances between the terminal 1320 and the beacons 1311 and 1312.

For example, information regarding distances between the outer side with respect to the door and beacons corresponding to the BIDs and information regarding distances between the inner side with respect to the door and beacons corresponding to the BIDs (or information regarding beacons installed at the outer side with respect to the door and information regarding beacons installed at the inner side with respect to the door) may be included in the database. The user access authority determination unit 130 may use the database to determine whether the user of the terminal is located at the outer side or the inner side with respect to the door. As a detailed example, in the example of FIG. 13, information indicating that a distance between the outer side with respect to the door 1340 and the first beacon 1311 is smaller than a distance between the outer side with respect to the door 1340 and the second beacon 1312 (or information indicating that the first beacon 1311 is installed at the outer side with respect to the door 1340) and information indicating that a distance between the inner side with respect to the door 1340 and the second beacon 1312 is smaller than a distance between the inner side with respect to the door 1340 and the first beacon 1311 (or information indicating that the second beacon 1312 is installed at the inner side with respect to the door 1340) may be stored. In this case, when the user access authority determination unit 130 checks that a distance between the terminal 1320 and the first beacon 1311 is smaller than a distance between the terminal 1320 and the second beacon 1312, the user access authority determination unit 130 may determine that the terminal 1320 is located at the outer side of the door.

According to some embodiments of the present disclosure, the step of determining an access authentication process on the basis of whether the user of the terminal is located at the outer side or the inner side with respect to the target door (S1440) may be performed.

Step S1440 may be performed by the user access authority determination unit 130.

The terminal 1320 being located at the outer side with respect to the door and located in the door proximity region may denote that the user of the terminal 1320 desires to enter the inner side from the outer side. The terminal 1320 being located at the inner side with respect to the door and located in the door proximity region may denote that the user of the terminal 1320 desires to exit the inner side to the outer side. Accordingly, when it is determined that the terminal 1320 is located at the outer side of the door in step S1430, the user access authority determination unit 130 may determine that the user of the terminal enters the inner side from the outer side. When it is determined that the terminal 1320 is located at the inner side with respect to the door, the user access authority determination unit 130 may determine that the user of the terminal 1320 exits the inner side to the outer side.

In some embodiments of the present disclosure, a type of user movement includes an entering movement and an exiting movement. The entering into the inner side from the outer side through the target door is represented to the entering movement. And the exiting the inner side to the outer side through the target door is represented to the exiting movement.

In addition, on a condition that the user of the terminal 1320 desires to enter through the door 1340, an authentication operation of the user of the terminal 1320 may be needed in order to increase security because the inner side 1352 is a region that only an authorized user who has access authority is allowed to enter. On the other hand, on a condition that the user of the terminal 1320 desires to exit through the door 1340, the user authentication operation has already been performed on the user of the terminal 1320 when the user of the terminal 1320 entered through the door 1340. Thus, there may be no problem in the security although the user authentication operation is not performed.

Accordingly, when it is determined that the user of the terminal 1320 is entering the inner side with respect to the door 1340, in other words, when it is determined that the type of user movement is the entering movement, the user access authority determination unit 130 may determine to control the door according to a first access authentication process including the user authentication operation as the access authentication process. When it is determined that the user of the terminal 1320 is exiting to the outer side with respect to the door 1340, in other words, when it is determined that the type of user movement is the exiting movement, the user access authority determination unit 130 may determine to control the door according to a second access authentication process that does not include the user authentication operation as the access authentication process.

According to some embodiments of the present disclosure, the first access authentication process is defined as a process for controlling a door when the user of the terminal 1320 enters the inner side from the outer side with respect to the door, and the second access authentication process is defined as a process for controlling the door when the user of the terminal 1320 exits the inner side to the outer side with respect to the door.

According to the access management system of the present disclosure, when the user of the terminal 1320 enters the inner side from the outer side, the user authentication operation for security is necessarily needed. However, as described above, when the user of the terminal 1320 exits the inner side to the outer side, user convenience needs to be emphasized more than security accuracy. Thus, according to some embodiments of the present disclosure, basically, complex authentication procedures that are performed upon entry may be omitted upon exit. That is, according to an embodiment of the present disclosure, different access authentication processes may be applied upon entry and exit. In order to apply such different access authentication processes, a technology for determining a position of a terminal by a beacon may be applied. Thus, according to the present disclosure, it is possible to improve user convenience as well as enhance security of access management.

In some embodiments of the present disclosure, even when the user of the terminal 1320 enters the inner side from the outer side, that is, even upon entry, user convenience may be emphasized more than security accuracy. For example, the acquisition of the user authentication information may be omitted within a certain time after the user authentication operation is performed.

In an exemplary embodiment, during a predetermined time after a first access authentication process is performed to unlock a target door, the user access authority determination unit 130 may determine an access authentication process as the first access authentication process, may not acquire the user authentication information from the user, and may perform the user authentication operation using user authentication information acquired when the first access authentication process was performed.

In another exemplary embodiment, during the predetermined time after the first access authentication process is performed to unlock the target door, the access authentication process may be determined as a second access authentication process irrespective of whether the user enters or exits. Thus, during the predetermined time after the user authentication operation is performed to unlock the target door, the user access authority determination unit 130 may not acquire the user authentication information from the user and may determine whether to unlock the target door using the UID.

Various modifications of the access management methods and the access authentication process determination methods according to some embodiments of the present disclosure will be described below with reference to FIGS. 15 to 18.

Figure 15:
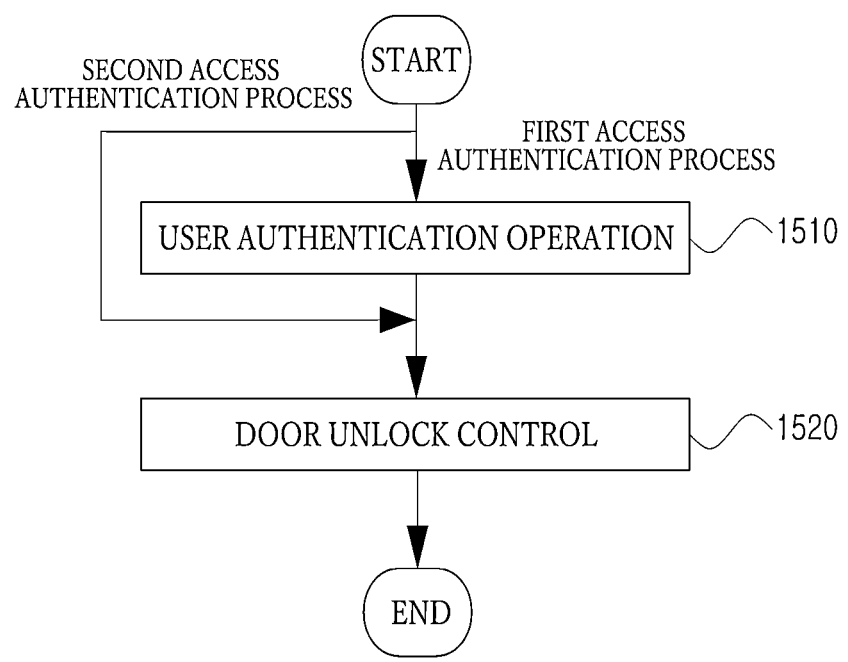
FIG. 15 is a flowchart for describing an access management method in a first access authentication process or a second access authentication process according to an embodiment.

FIG. 15 is a flowchart for describing an access management method in a first access authentication process or a second access authentication process according to an embodiment.

Referring to FIG. 15, an access management method according to some embodiments of the present disclosure may include performing a user authentication operation (S1510) and controlling unlocking of a door (S1520).

The steps of the access management method will be described below in detail.

According to some embodiments of the present disclosure, the user authentication step (S1510) may be performed in a first access authentication process. In detail, in step S1510, the user access authority determination unit 130 may acquire user authentication information from a user and perform a user authentication operation using the acquired user authentication information.

However, as described above, during the predetermined time after the first access authentication process is performed to unlock the target door, the user access authority determination unit 130 may not acquire the user authentication information from the user and may perform the user authentication operation using the user authentication information acquired in the first access authentication process that was performed before the predetermined time.

In addition, the user authentication step (S1510) is not performed in the second access authentication process. When it is determined in step S1520 that the user of the terminal 1320 has authority to access the door 1340, the user authentication step (S1510) is not performed. In step S1510, the door may be controlled to be unlocked.

As described above, when the user of the terminal 1320 exits through the door 1340 or when the first access authentication process has already been performed, the second access authentication process is determined. This means that the user authentication operation has been performed in order for the user of the terminal 1320 to enter the inner side through door 1340. Thus, the target door may be allowed to be unlocked without a separate determination of special access authority. Accordingly, the user authentication operation may not be performed in the second access authentication process.

However, whether to selectively require the user authentication operation according to entry or exit may be determined by a security policy. Thus, the second access authentication process may not necessarily be determined as the access authentication process upon exit. According to a security policy, the user authentication operation may be performed even upon exit.

In addition, according to some embodiments of the present disclosure, the step of controlling unlocking of the door (S1520) may be performed. When the user is authenticated as a user who can normally access the door 1340 as a result of the user authentication, the door 1340 may be unlocked in the first access authentication process.

In detail, in step S1520, as described above in step S830 or S840, the UID may be acquired independently of the user authentication information, and the UID may also be acquired on the basis of the user authentication information. Thus, the door 1340 may be controlled to be unlocked in different ways.

i) On a condition that the user authentication information and the UID are acquired independently, when it is confirmed that the user authentication information acquired in step S1510 and user authentication information stored in the above-described database are the same, the user access authority determination unit 130 may control the door 1340 to be unlocked such that a terminal corresponding to the UID passes through the door 1340.

ii) On a condition that the UID is acquired on the basis of the user authentication information, when it is confirmed that the user authentication information acquired in step S1510 and the user authentication information stored in the above-described database are the same, the user access authority determination unit 130 may extract the UID of the user matching the stored user authentication information from the database. Subsequently, the user access authority determination unit 130 may control the door 1340 to be unlocked such that the terminal corresponding to the UID of the user passes through the door 1340.

In the second access authentication process, the door 1340 may be unlocked irrespective of the user authentication.

Figure 16:
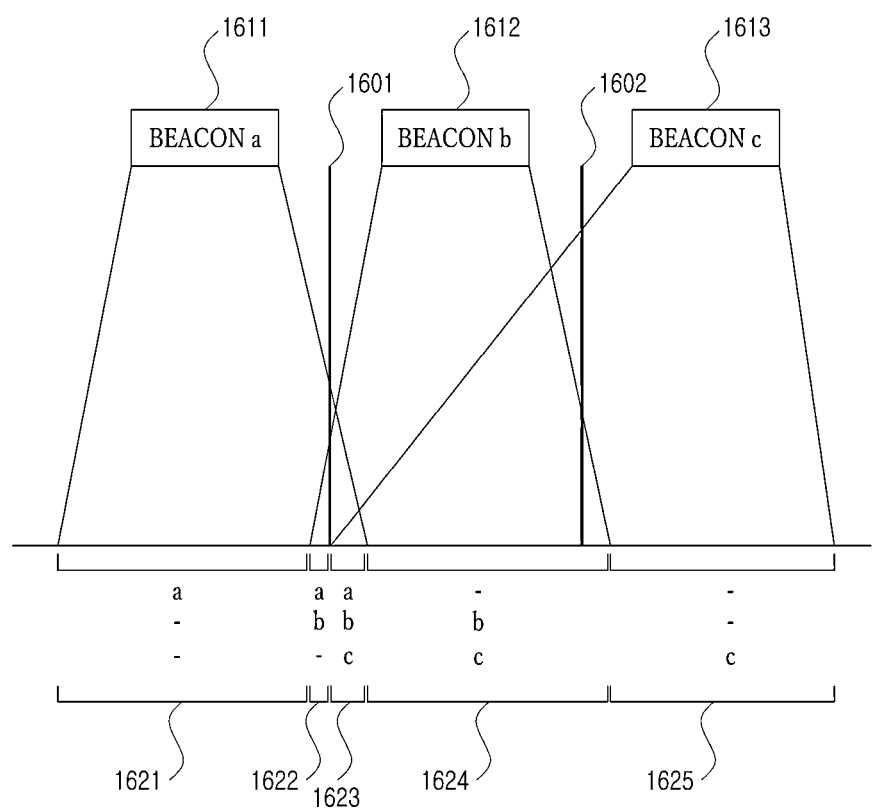
FIG. 16 is a diagram for describing determination of a target door according to an embodiment.

FIG. 16 is a diagram for describing determination of a target door according to an embodiment.

The access management method according to an embodiment of the present disclosure has been described on the assumption that there are one or two beacons. However, FIG. 16 is a diagram for further describing a method for determining a target door when there are three beacons.

Referring to FIG. 16, an environment in which two doors 1601 and 1602 are installed and three beacons 1611, 1612, and 1613 are located near the doors 1601 and 1602 is illustrated as an example. In the environment, the user access authority determination unit 130 may determine a target door which a user of a terminal is to access.

The three beacons 1611, 1612, and 1613 may be modifications of the second beacon 200 of FIG. 2. In detail, broadcasting ranges of the three beacons 1611, 1612, and 1613 may be the same as or different from one another. In the example of FIG. 16, a broadcasting range of beacon a 1611 includes regions 1621, 1622, and 1623, a broadcasting range of beacon b 1612 includes regions 1622, 1623, and 1624, and a broadcasting range of beacon c 1613 includes regions 1623, 1624, and 1625. Thus, the terminal 1320 may acquire only BID a, which is a BID of beacon a 1611, in the region 1621, may acquire BID a and BID b, which is a BID of beacon b 1612, in the region 1622, and may acquire BID a, BID b, and BID c, which is a BID of beacon c 1613, in the region 1623. In addition, the terminal 1320 may acquire BID b and BID c in the region 1624, and may acquire only BID c in the region 1625.

In some embodiments of the present disclosure, in order to determine a target door, the user access authority determination unit 130 may access a database including information regarding doors corresponding to the beacons 1611, 1612, and 1613 having a plurality of BIDs.

In addition, when the number of BIDs acquired is one, that is, when only BID a or BID c is acquired in the example of FIG. 16, the user access authority determination unit 130 does not use a distance between the beacon and the terminal and may extract the target door corresponding to the acquired BID from the database. In FIG. 16, when only BID a is acquired, the user access authority determination unit 130 may select the door 1601 as the target door. Also, when only BID c is acquired, the user access authority determination unit 130 may select the door 1602 as the target door.

Likewise, even when the number of BIDs acquired is two or more, the user access authority determination unit 130 may extract the target door corresponding to the BIDs acquired from the database without using distances between the beacons and the terminal. In the example of FIG. 16, when BID a and BID b are acquired, the user access authority determination unit 130 may select the door 1601 as the target door from the database. Also, when BID b and BID c are acquired, the user access authority determination unit 130 may select the door 1602 as the target door from the database.

Alternatively, even when the number of BIDs acquired is two or more, the user access authority determination unit 130 may extract the target door corresponding to the BIDs acquired from the database using distances between the terminal and the beacons. In the example of FIG. 16, when the terminal 1320 is located in the region 1623, the terminal 1320 may acquire BID a, BID b, and BID c. In this case, information regarding a door matching all of BID a, BID b, and BID c may not be stored in the database. In this case, the user access authority determination unit 130 may check distances between the terminal 1320 and the beacons 1611, 1612, and 1613 to confirm that a beacon with the greatest distance from the terminal 1320 is beacon c. In some embodiments, the user access authority determination unit 130 may select the door 1601 as the target door from the database, by using BID a and BID b rather than the BID of beacon c with the greatest distance from the terminal 1320 among BID a, BID b, and BID c acquired by the terminal 1320.

Figure 17:
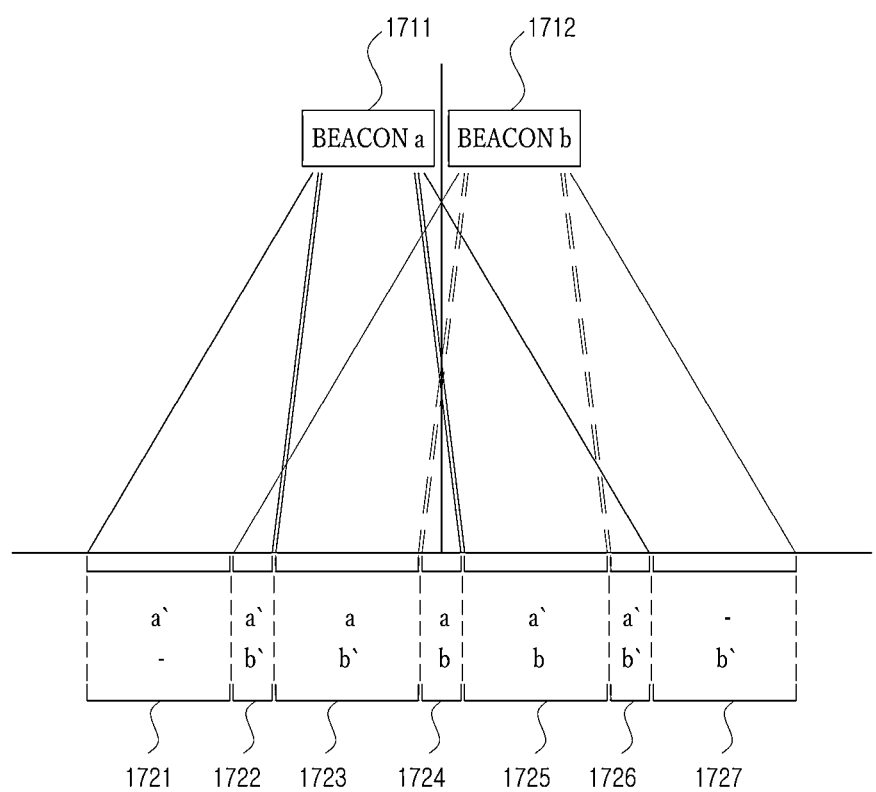
FIG. 17 is a diagram for describing positioning of a terminal according to an embodiment.

FIG. 17 is a diagram for describing positioning of a terminal according to an embodiment. That is, FIG. 17 is a diagram for describing a method of determining whether a terminal is located at an inner side or an outer side with respect to a door.

Referring to FIG. 17, an environment in which one door 1701 is installed and two beacons 1711 and 1712 are located near the door 1701 is illustrated as an example.

In this case, a region 1721 is a region where only a BID of beacon a is received. A region 1727 is a region where only a BID of beacon b is received. Regions 1722 to 1726 are regions where both of the BID of beacon a and the BID of beacon b are received. Among these, in particular, the region 1723 may be included in a door proximity region defined by beacon a, and the region 1725 may be included in a door proximity region defined by beacon b.

In some embodiments of the present disclosure, the user access authority determination unit 130 may determine a position of the terminal according to a strength of each of the acquired BIDs.

For example, when a BID with the greatest strength among BIDs being received is the BID of beacon a, the user access authority determination unit 130 may determine that the terminal is located at an outer side with respect to the door.

In more detail, when a door proximity region of beacon a 1711 is set as the regions 1723 and 1724 and a door proximity region of beacon b 1712 is set as the regions 1724 and 1725, the terminal 1320 may acquire BID a and BID b in the region 1724. Also, when the door proximity region of beacon a 1711 is set as the regions 1721 to 1726 corresponding to the broadcasting range thereof and the door proximity region of beacon b 1712 is set as the regions 1722 to 1726 corresponding to the broadcasting range thereof, the terminal 1320 may acquire BID a and BID b in the regions 1722 to 1726. In such an embodiment, the user access authority determination unit 130 may determine the position of the terminal using distances between the terminal 1320 and the beacons 1711 and 1712. In the example of FIG. 17, when it is confirmed that beacon a 1711 is a beacon with the smaller distance from the terminal 1320, the user access authority determination unit 130 may determine that the terminal 1320 is located at the outer side with respect to the door 1701. Also, when it is confirmed that beacon b 1712 is a beacon with the smaller distance from the terminal 1320, the user access authority determination unit 130 may determine that the terminal 1320 is located at an inner side with respect to the door 1701.

In other embodiments of the present disclosure, when the user access authority determination unit 130 determines the position of the terminal using the acquired BIDs, the user access authority determination unit 130 may determine the position of the terminal, that is, whether the terminal is located at the inner side or the outer side with respect to the door depending on the number and types of acquired BIDs.

For example, it is assumed that one BID is being received at a first time point, and two BIDs are being received at a second time point that is later than the first time point. Such a case may occur when the terminal enters from the region 1721 to the region 1722. Alternatively, this is the same as when the terminal enters from the region 1727 to the region 1726.

In this case, when two BIDs are received, the user access authority determination unit 130 may determines whether the user is located at the inner side or the outer side depending on whether a BID received at the first time point before the second time point is a BID of a beacon located at the inner side or a BID of a beacon located at the outer side. For example, when a BID that is received earlier is the BID of beacon a and a BID that is received later is the BID of beacon b, it may be determined that the terminal is located at the outer side of the door.

In this case, a time point when the position of the terminal (that is, the position at the inner side or the outer side with respect to the door) is determined may be a time point when two BIDs are received, as described above. When a broadcasting range of a beacon is set to be very wide and the position of the terminal is determined at a time point when two BIDs are received, resources may be unnecessarily wasted. In this case, the time point when the position of the terminal is determined may be determined on the basis of the determination of whether the terminal enters the door proximity region in consideration of a threshold of a BID that is received earlier when two BIDs are received at the same time. That is, the position of the terminal may be determined when it is determined that the terminal has entered the door proximity region with respect to at least one of the two beacons rather than when two BIDs are received. Thus, it is possible to further save resources of the terminal and more accurately reflect the intention of the user.

Figure 18:
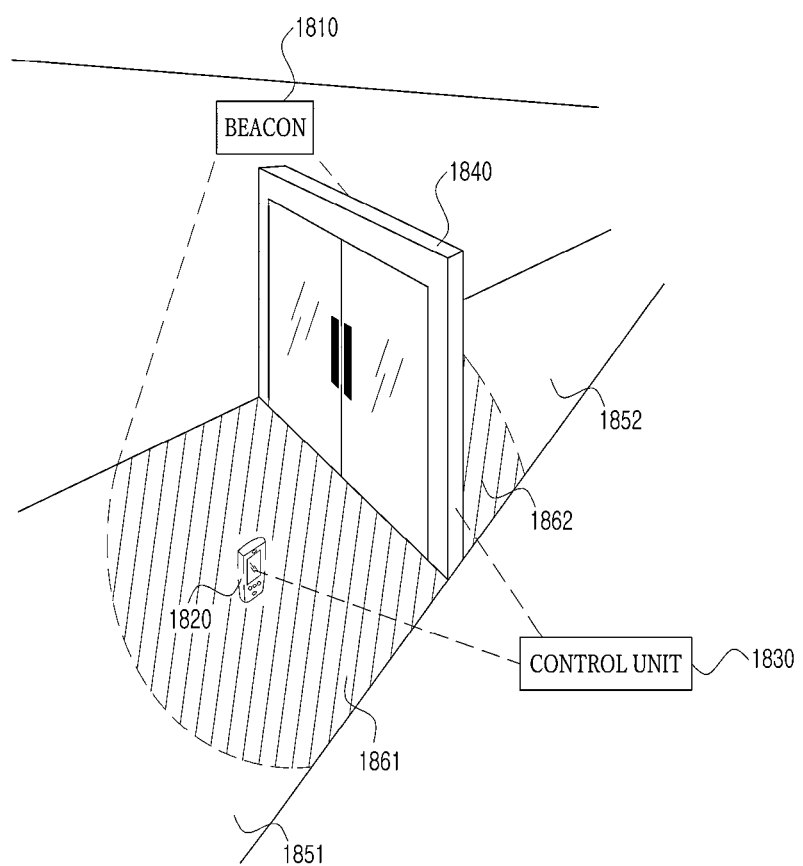
FIG. 18 is a diagram for describing an access authentication process determination method in an access management system when there is one beacon according to an embodiment.

FIG. 18 is a diagram for describing an access authentication process determination method in an access management system when there is one beacon according to an embodiment.

Referring to FIG. 18, an access management system may include a beacon 1810, a terminal 1820, and a control unit 1830.

In particular, FIG. 18 shows a system in which the beacon 1810 corresponds to a door 1840 on a one-to-one basis. In addition, the terminal 1820 shown in FIG. 18 is a device that a user carries, and the user is not shown in FIG. 18.

An outer side 1851 and an inner side 1852 may be divided by the door 1840. In some embodiments of the present disclosure, door proximity regions 1861 and 1862 may be set on the basis of the beacon 1811.

In the above-described embodiments, it is assumed that two or more beacons are disposed at both sides with respect to the door in order to determine whether the user (or the terminal) is located at an inner side or an outer side with respect to the door. This is because whether the terminal is located at the inner side or the outer side with respect to the door cannot be determined using only the signal of the beacon when the beacon and the door match on a one-to-one basis.

However, although the door and the terminal are disposed corresponding on a one-to-one basis, there may be a method for preliminarily determining whether the terminal is located at the inner side or the outer side. Thus, even when the door and the terminal correspond on a one-to-one basis, the access authentication process determination method according to the above-described embodiments may be applied. A method of locating a terminal will be briefly described below when a beacon and a door correspond on a one-to-one basis.

According to some embodiments of the present disclosure, whether the user of the terminal 1820 is located at an outer side or an inner side with respect to a target door may be determined using additional information.

Here, the additional information is information that is additionally used to control the door. For example, the additional information may include access information, commuting information, a log or the like of the user of the terminal 1820.

For example, the user access authority determination unit 130 may acquire information indicating that the user of the terminal 1820 leaves the office and check information indicating that a route by which the user leaves the office is a moving route from the inner side with respect to the door 1840 to the outer side with respect to the door 1840 through the commuting information of the user of the terminal 1820. In this case, when the user access authority determination unit 130 acquires a BID or a UID from the terminal 1820, the user access authority determination unit 130 may determine that the terminal 1820 is located at the inner side with respect to the door 1840.

The method of determining entry/exit through a door and the different access authentication process determination methods have been described above.

A method of determining abnormal access of a user and a method of managing abnormal access will be described below.

<Abnormal Access Processing Method>

Figure 19:
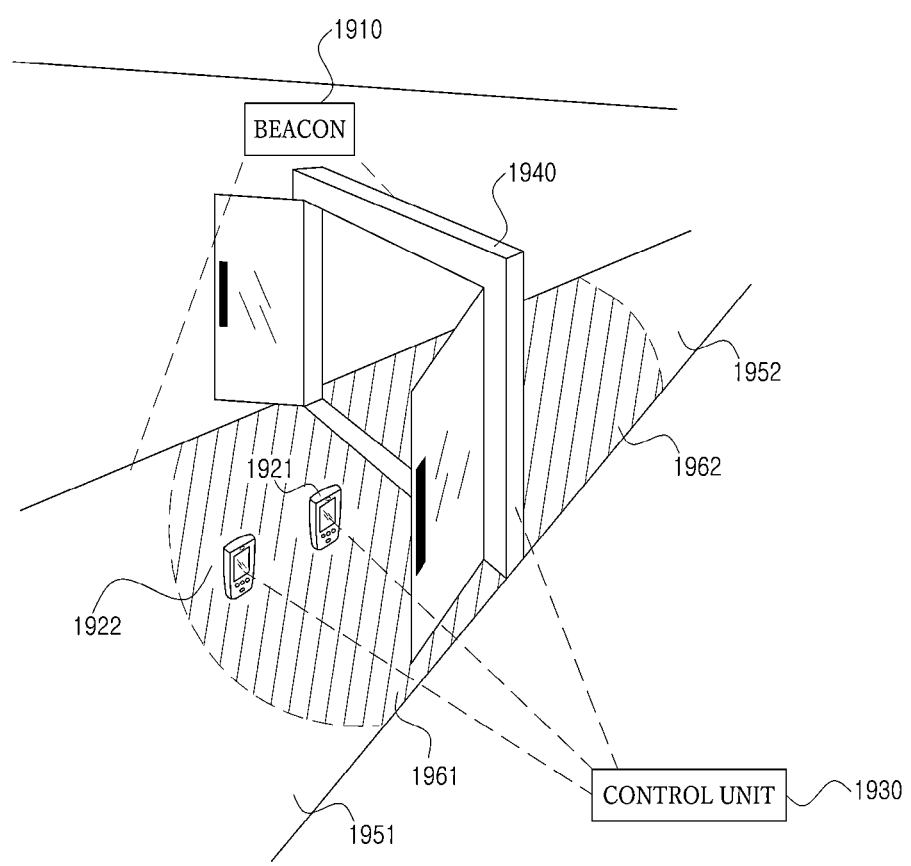
FIG. 19 is a diagram for describing an abnormal access processing method in an access management system according to an embodiment.

FIG. 19 is a diagram for describing an abnormal access processing method in an access management system according to an embodiment.

Referring to FIG. 19, an access management system may include a beacon 1910, a first terminal 1921, a second terminal 1922, and a control unit 1930.

In particular, FIG. 19 shows a system in which the beacon 1910 corresponds to a door 1940 on a one-to-one basis. However, the abnormal access processing method is also applicable to a system in which beacons 1910 correspond to the door 1940 on an n-to-one basis. In addition, the terminals 1921 and 1922 shown in FIG. 19 are devices that users carry, and the user of the first terminal 1920 and the user of the second terminal 1922 are not shown in FIG. 19.

An outer side 1951 and an inner side 1952 may be divided by the door 1940. In particular, a door proximity region 1961 determined on the basis of the beacon 1910 may be further defined at the outer side 1951, and also a door proximity region 1962 determined on the basis of the beacon 1910 may be defined at the inner side 1952. When it is determined that the terminals 1921 and 1922 have entered the door proximity region 1961 or 1962, a predetermined access management operation may be initiated by the control unit 1930.

In order for the user of the first terminal 1921 to access the door 1940, access of the user of the first terminal 1921 should be authenticated. In order for the user of the second terminal 1922 to access the door 1940, access of the user of the second terminal 1922 should be authenticated independently of the access authentication of the user of the first terminal 1921.

However, when the access of the user of the first terminal 1921 is authenticated, the control unit 1930 may unlock the door 1940. In this case, the user of the second terminal 1922 whose entry through the door 1940 is not authenticated may confirm that the door 1940 is unlocked and may access the door 1940. For example, when the door 1940 is unlocked by the user of the first terminal 1921 (that is, when the door is kept open after the door is unlocked), the user of the second terminal 1922 should perform user authentication but may think the user authentication is cumbersome and access the door 1940 without performing the user authentication. On a condition that an external intruder who is not allowed utilizes such an abnormal case to enter the inner side, internal security holes may be generated when the access management system according to embodiments of the present disclosure are utilized. In order to block such security holes, whether the user who accesses the door is a user who is allowed to access the door needs to be checked even when user authentication is not normally performed upon entry through the door.

Figure 20:
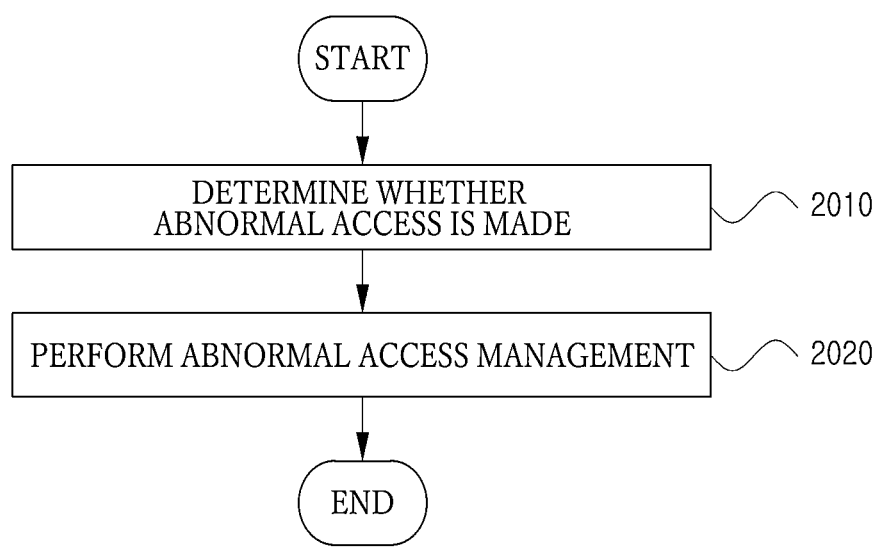
FIG. 20 is a flowchart showing an abnormal access processing method according to an embodiment.

FIG. 20 is a flowchart showing an abnormal access processing method according to an embodiment.

Referring to FIG. 20, an abnormal access processing method according to some embodiments of the present disclosure may include determining abnormal access of a user of a terminal (S2010) and performing abnormal access management on the user of the terminal when the user of the terminal passes through a target door (S2020).

According to embodiments of the present disclosure, abnormal access denotes that a user accesses a door without a normal user authentication operation. The steps of the abnormal access processing method will be described below in detail.

According to some embodiments of the present disclosure, the step of determining abnormal access of a user of a terminal (S2010) may be performed.

The step of determining abnormal access of a user of a terminal (S2010) may be performed by the user access authority determination unit 130. That is, when the user access authority determination unit 130 is implemented in the above-described server (e.g., a server included in the control unit 1930), the step of determining abnormal access of a user of a terminal (S2010) may be performed by the server. On the other hand, when the user access authority determination unit 130 is configured to be included in the terminals 1921 and 1922, step S2010 may be performed by the terminals 1921 and 1922.

In detail, the step of determining abnormal access of a user of a terminal (S2010) may be performed according to the following method.

According to some embodiments of the present disclosure, the user access authority determination unit 130 may determine whether the users of the terminals 1921 and 1922 have passed through the door. To this end, an operation of checking a position of a terminal and an operation of checking whether the checked position of the terminal is changed from an inner side to an outer side or from the outer side to the inner side may be performed.

In order to determine whether the terminals have passed through the door, the user access authority determination unit 130 may check positions of the terminals 1921 and 1922 at a time point when the terminals 1921 and 1922 make a request to access the target door 1940, that is, at a time point when the terminal 1921 and 1922 transmit the acquired BID. In order to check the position of the terminal, the user access authority determination unit 130 may determine whether the terminals 1921 and 1922 are located at the outer side or the inner side with respect to the door 1940. The description of steps S1410 to S1430 of FIG. 14 may be applied to the operation of determining whether the terminals 1921 and 1922 are located at the inner side or the outer side with respect to the door 1940, and thus a detailed description thereof will be omitted.

Next, in order to determine whether the user has passed through the door, the user access authority determination unit 130 may check whether the positions of the terminals 1921 and 1922 are changed from the inner side to the outer side with respect to the door 1940 or from the outer side to the inner side with respect to the door 1940.

For this, in an embodiment of the present disclosure, the user access authority determination unit 130 may monitor the positions of the terminals 1921 and 1922 at a plurality of time points.

In addition, in another embodiment of the present disclosure, the user access authority determination unit 130 may check whether the positions of the terminals 1921 and 1922 are changed using other additional information.

For example, a log including a time point at which the terminals 1921 and 1922 passed through the door, location information of the terminals 1921 and 1922, etc. may be recorded. The user access authority determination unit 130 may check whether the positions of the terminals 1921 and 1922 are changed by using the log. The log will be described in detail below.

As another example, on a condition that punch-in authentication of the user of the terminal is performed at the inner side, when the punch-in authentication of the users of the terminals 1921 and 1922 is checked using commuting information of the users of the terminals 1921 and 1922, the user access authority determination unit 130 may estimate that the terminal is located at the inner side.

Thus, when the positions of the terminals 1921 and 1922 at a time point when the terminals 1921 and 1922 make a request to access the door 1940 are changed from the inner side to the outer side through door 1940 or from the outer side to the inner side through the door 1940, the user access authority determination unit 130 may confirm that the terminals 1921 and 1922 have passed through the door 1940.

In addition, in some embodiments of the present disclosure, when it is checked whether the positions of the terminals 1921 and 1922 are changed, the user access authority determination unit 130 may utilize a BID of another beacon which is not a BID of a beacon corresponding to the door through which the user has passed. For example, although the BID of the beacon 1910 corresponding to the door 1940 has not been acquired from the terminals 1921 and 1922, the user access authority determination unit 130 may check that the terminals 1921 and 1922 pass through the door 1940. As a detailed example, although the BID of the beacon 1910 corresponding to the door 1940 has not been acquired from the terminals 1921 and 1922, the user access authority determination unit 130 may acquire a BID of a beacon corresponding to another door located at the inner side with respect to the door 1940 from the terminals 1921 and 1922. In this case, the user access authority determination unit 130 may confirm that the terminals 1921 and 1922, which are not authenticated to access the door 1940, have passed through the door 1940. As another detailed example, even when the BID of the beacon 1910 corresponding to the door 1940 has not been acquired from the terminals 1921 and 1922, the user access authority determination unit 130 may confirm that the terminals 1921 and 1922 pass through the door 1940 using the additional information.

Next, according to some embodiments of the present disclosure, the user access authority determination unit 130 may determine whether the user authentication has been performed.

The user access authority determination unit 130 may check that the user authentication operation has been performed. When the user authentication operation has not been performed, the user access authority determination unit 130 may determine that the users of the terminals 1921 and 1922 abnormally accessed the door 1940. For example, according to the method of determining the access authentication process described with reference to FIG. 13, a first access authentication process may be determined as the access authentication process. In this case, in order for normal access authentication of the user, when the user does not perform any user authentication operation and then passes through the door although the user authentication operation should be performed, it may be determined that the user abnormally accesses the door. For this, when it is determined that the terminal approaches the door proximity region to make a request to unlock the door, the user access authority determination unit 130 may monitor whether the terminal passes through the door after performing the user authentication operation or passes through the door without performing the user authentication operation in real time.

However, in some embodiment of the present disclosure, as described above, even when the user enters the inner side from the outer side, the access authentication process may be determined as a second access authentication process. For example, even when the user enters the inner side from the outer side during a predetermined time after the user authentication operation is performed to unlock the door, the access authentication process may be determined the second access authentication process rather than the first access authentication process. This may be to improve user convenience. According to the second access authentication process in which the user authentication operation is not required, when the user has passed through the door without performing the user authentication process, it may be determined that the user normally accesses the door.

In addition, according to some embodiments of the present disclosure, when a user of a terminal passes through a target door, the step of performing abnormal access management on the user of the terminal (S2020) may be performed. The step of performing abnormal access management on the user of the terminal (S2020) may be performed by the user access authority determination unit 130. Step S2020 will be described in detail with reference to FIG. 22.

Before an abnormal access management method according to embodiments of the present disclosure is described in detail, a log recording operation according to an embodiment of the present disclosure will be simply described first.

Figure 21:
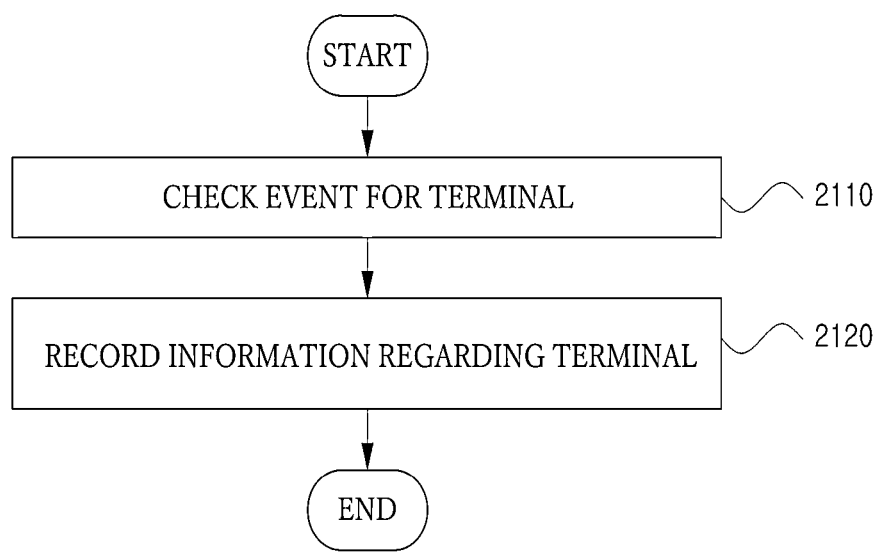
FIG. 21 is a flowchart showing a log recording operation according to an embodiment.

FIG. 21 is a flowchart showing a log recording operation according to an embodiment.

A log may denote data in which information regarding the terminals 1921 and 1922 is recorded according to elapsed time.

Referring to FIG. 21, the following log recording operation may be performed by the user access authority determination unit 130. However, the log recording operation is not necessarily performed by the user access authority determination unit 130, and may be performed by another device. For convenience of description, it is assumed in the following description that the log recording operation is performed by the user access authority determination unit 130.

In embodiments of the present disclosure, the user access authority determination unit 130 may check an event for a terminal (S2110).

Here, an event for the terminals 1921 and 1922 may denote that a specific issue has occurred in a relationship between the terminals 1921 and 1922. For example, the user access authority determination unit 130 may acquire a signal from the terminals 1921 and 1922 or may check a situation of the terminals 1921 and 1922. For example, the event may include the terminal entering within a broadcasting range of a beacon. As another example, the event may include the terminal entering a door proximity region defined by the beacon. As still another example, the event may include the terminal performing a user authentication operation. As still another example, the event may include the terminal exiting the door proximity region defined by the beacon. As still another example, the event may include the terminal departing from the broadcasting range of the beacon.

In addition, in embodiments of the present disclosure, when the event has occurred, the user access authority determination unit 130 may record information regarding the terminal (S2120).

In some embodiments of the present disclosure, the user access authority determination unit 130 may record a variety of information regarding the terminal. For example, the user access authority determination unit 130 may record information acquired from the terminal. As an example, the user access authority determination unit 130 may acquire transmission and reception time points, types, and details of signals that are transmitted and received by the terminals 1921 and 1922 and may record the acquired information. As a more detailed example, the user access authority determination unit 130 may generate a log by recording information regarding a time point at which the terminals 1921 and 1922 enter the inner side through the door 1940, a time during which the terminals 1921 and 1922 are located at the inner side through the door 1940, a time point at which the terminals 1921 and 1922 exit to the outer side through the door 1940, etc.

By utilizing the recorded log, the user access authority determination unit 130 may determine, as necessary, whether the terminal has passed through the door, whether the terminal approaches, does not pass through, and then recedes from the door, whether the user authentication operation is performed while the terminal passes through the door, or the like. That is, on a condition that the above-described log is recorded, even when abnormal access of a user is not being monitored in real time, the user access authority determination unit 130 may later determine whether abnormal access of a user with a specific UID has occurred. For example, on a condition that an entry time and an exit time of a user with a specific UID for a door proximity region are recorded, when a user authentication time of the user with the specific UID is not recorded, the user access authority determination unit 130 may later determine that there was an "abnormal access" of the user with the UID. For this, in an embodiment of the present disclosure, the user access authority determination unit 130 may determine whether the abnormal access has occurred by periodically scanning the log. In addition, in another embodiment of the present disclosure, whenever a log is generated, that is, whenever a log is added, the user access authority determination unit 130 may check the log to determine whether the abnormal access has occurred. Thus, the user access authority determination unit 130 may quickly check whether the abnormal access has occurred.

When the user access authority determination unit 130 is implemented in the above-described server (e.g., the server included in the control unit 1930), the user access authority determination unit 130 may receive information regarding the terminals 1921 and 1922 from the terminals 1921 and 1922.

Various modifications of the access management methods according to some embodiments of the present disclosure will be described below with reference to FIGS. 22 to 24.

Figure 22:
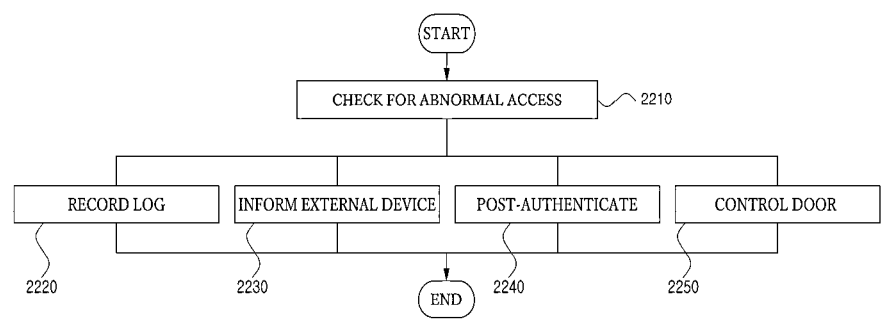
FIG. 22 is a flowchart for describing step S2020 of FIG. 20 in detail.

FIG. 22 is a flowchart for describing an abnormal access management method according to an embodiment.

Referring to FIG. 22, the abnormal access management method may include checking abnormal access (S2210), recording a log (S2220), informing an external device (S2230), performing post-authentication (S2240), and controlling a door (S2250). In addition, the abnormal access management method may be performed by the user access authority determination unit 130.

In the embodiments of the present disclosure, steps S2220 to S2250 may be performed at the same time. However, any one step may be performed earlier than the other steps. In addition, in step S2120, all of steps S2220 to S2250 may be performed. However, it should be noted that not all of steps S2220 to S2250 need to be performed, and thus only at least one of steps S2220 to S2250 may be performed.

In some embodiments of the present disclosure, the user access authority determination unit 130 may check that the terminals 1921 and 1922 abnormally access the door (S2210).

In addition, in some embodiments of the present disclosure, the user access authority determination unit 130 may perform log recording (S2220).

In some embodiment of the present disclosure, the log may include messages transmitted and received by the terminals 1921 and 1922 that abnormally access the door, positions of the terminals 1921 and 1922 that abnormally access the door, etc. Thus, when the terminals 1921 and 1922 that abnormally access the door are stolen by another person, a use history, a moving route, and so on, of the stolen terminals 1921 and 1922 are secured. Accordingly, security may be enhanced. In addition, the user access authority determination unit 130 may store the generated log in a database. In addition, when information regarding a plurality of terminals registered in an access management system is stored in the database, the user access authority determination unit 130 may record times at which the terminals 1921 and 1922 abnormally access the door, the number of times that the terminals 1921 and 1922 abnormally access the door, etc. in the database.

In addition, in some embodiments of the present disclosure, the step of informing an external device (S2230) may be performed. For example, the user access authority determination unit 130 may inform the external device, such as a security server or a terminal of a security management staff, about the abnormal access of the users of the terminal 1921 and 1922. The external device may manage the terminals 1921 and 1922 that abnormally access the door independently of the access management system. Thus, security may be enhanced because the terminals 1921 and 1922 that abnormally access the door are managed even by the external device.

In addition, in some embodiments of the present disclosure, the step of performing post-authentication (S2240) may be performed. Here, the post-authentication may denote that the user access authority determination unit 130 post-authenticates the users of the terminals 1921 and 1922 that abnormally access the door to normally pass through the target door 1940 after the users of the terminals 1921 and 1922 abnormally access the door. Step S2240 will be described in detail with reference to FIG. 23.

In addition, in some embodiments of the present disclosure, the step of controlling a door (S2250) may be performed. Step S2250 is to prevent a user who abnormally accesses the door from arbitrarily getting out to the outside when the user is an external intruder.

For example, even when the users of the terminals 1921 and 1922 that abnormally access the door make a request to access the door 1940, the user access authority determination unit 130 may control the door to be locked. As a detailed example, as described above with reference to FIG. 13, when the terminals 1921 and 1922 exit the inner side through the door 1940 to the outer side through the door 1940, the user access authority determination unit 130 may control the door to be unlocked without performing the user authentication operation. However, when the users of the terminals 1921 and 1922 abnormally access the door 1940, the user access authority determination unit 130 does not control the door to be unlocked even though the terminals 1921 and 1922 is exiting the inner side through the door 1940 to the outer side through the door 1940. This may be to prevent the terminals 1921 and 1922 that abnormally access the door 1940 from getting out to the outer side through the door 1940, thus enhancing security.

In addition, after the terminals 1921 and 1922 that abnormally access the door 1940 are post-authenticated or it is authenticated that the users of the terminals 1921 and 1922 may normally pass through the door 1940 through the user authentication operation, the user access authority determination unit 130 may control the door to be unlocked.

Figure 23:
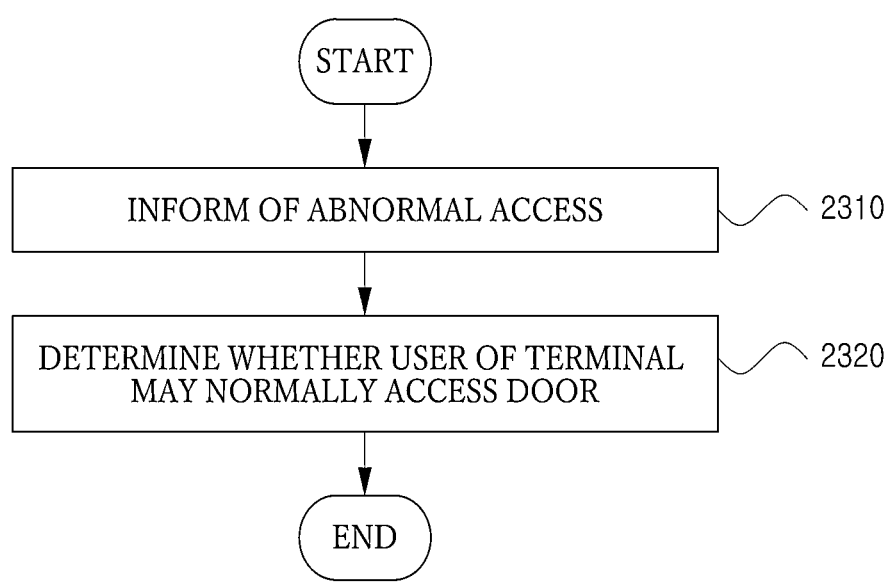
FIG. 23 is a flowchart for describing step S2240 of FIG. 22 in detail.

FIG. 23 is a flowchart for describing step S2240 of FIG. 22 in detail.

Referring to FIG. 23, step S2240 may include informing a user of abnormal access (S2310) and determining whether the user of the terminal may normally access the door (S2320). Step S2240 may be performed by the user access authority determination unit 130.

In some embodiments of the present disclosure, the step of informing the user about the abnormal access (S2310) may be performed. As described above in step S2310 of FIG. 22, the user access authority determination unit 130 may confirm that the users of the terminals 1921 and 1922 abnormally access the door and inform the users of the terminals 1921 and 1922 about the abnormal access after the confirmation of the abnormal access.

In some embodiments of the present disclosure, when the user access authority determination unit 130 is included in a server (e.g., the server that may be included in the control unit 1930), the server may transmit a message directing the terminals 1921 and 1922 to inform about the abnormal access to the terminals 1921 and 1922, and the terminals 1921 and 1922 may inform the users of the terminals 1921 and 1922 about the abnormal access according to the message.

In addition, when the user access authority determination unit 130 is included in the terminal 1921 or 1922, the user access authority determination unit 130 may confirm the abnormal access and then may inform the user of the terminal 1921 or 1922 about the abnormal access.

In some embodiments of the present disclosure, the user access authority determination unit 130 may acoustically output the abnormal access using an audio output unit of the terminal 1921 or 1922 or may visually output the abnormal access using a video output unit of the terminal 1921 or 1922. In addition, the user access authority determination unit 130 may generate vibration to inform about the abnormal access. In addition, the user access authority determination unit 130 may inform the user about the abnormal access by using a UI that is provided by a terminal-related access management application.

In addition, in some embodiments of the present disclosure, the user access authority determination unit 130 may be included in a user operating device. Here, the user operating device is not the terminal 1921 or 1922, but may indicate a device that is operated by the user, such as a personal computer (PC) of the user. In this case, the user access authority determination unit 130 may inform the users of the terminals 1921 and 1922 about the abnormal access using an audio output unit, a video output unit, etc. of the user operating device.

Also, in some embodiments of the present disclosure, the step of determining whether the user of the terminal can normally access the door (S2320) may be performed. Step S2320 is similar to or the same as the above-described user authentication method, and thus a detailed description thereof will be omitted.

However, in an embodiment of the present disclosure, in order to determine whether the user may access the door, the user access authority determination unit 130 may utilize another scheme instead of utilizing the user authentication information.

For example, this will be described with reference to FIG. 24.

Figure 24:
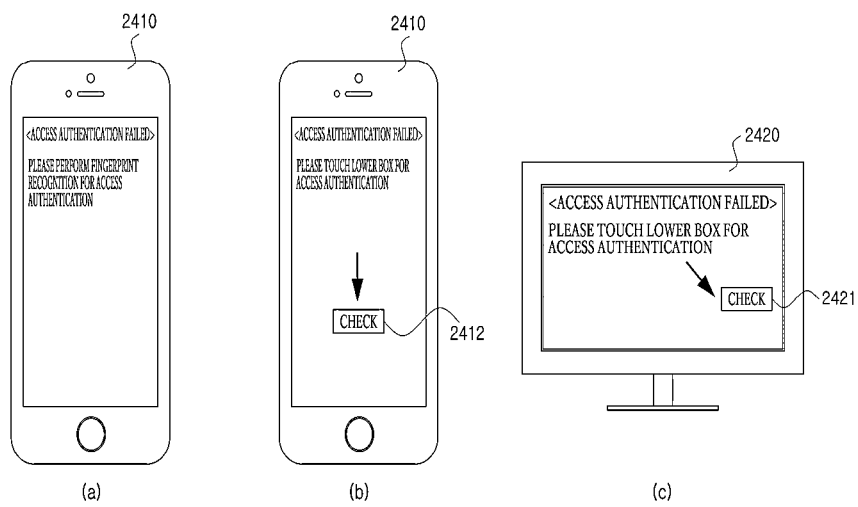
FIG. 24 is a diagram for describing post-authentication in a terminal and a user operating device according to an embodiment.

A terminal 2410 shown in FIG. 24 may be a modification of the terminal 300 of FIG. 3. A user operating device 2420 shown in FIG. 24 may denote the user operating device described above with reference to FIG. 23.

In an embodiment of the present disclosure, in (a), the user access authority determination unit 130 may be included in the terminal 2410. In some embodiments of the present disclosure, the user access authority determination unit 130 may visually output an abnormal output through a video output unit of the terminal 2410. In addition, the terminal 2410 may include a fingerprint sensor 2411 for recognizing a fingerprint of a user. The terminal 2410 may acquire fingerprint information of the user through the fingerprint sensor 2411, and the user access authority determination unit 130 may acquire the fingerprint information of the user. Next, the user access authority determination unit 130 may compare the acquired user fingerprint information with prestored user fingerprint information. When the acquired user fingerprint information and the prestored user fingerprint information match each other, the user access authority determination unit 130 may post-authenticate abnormal access of the user of the terminal 2410.

Also, in another embodiment of the present disclosure, in (a), the user access authority determination unit 130 may be included in a server. In an embodiment, the user access authority determination unit 130 may acquire user fingerprint information from the terminal 2410. As described above, when the acquired user fingerprint information and prestored user fingerprint information match each other, the user access authority determination unit 130 may post-authenticate abnormal access of the user of the terminal 2410.

Also, in another embodiment, the user access authority determination unit 130 included in the server may acquire a result of the comparison of whether the acquired user fingerprint and the prestored user fingerprint information match each other from the terminal 2410. That is, the terminal 2410 may compare the acquired user fingerprint information with the prestored user fingerprint information and provide a result of the comparison to the user access authority determination unit 130. When it is confirmed that the acquired user fingerprint information and the prestored user fingerprint information match each other from the acquired comparison result, the user access authority determination unit 130 may post-authenticate the abnormal access of the user of the terminal 2410.

In (b), the user access authority determination unit 130 may be included in the terminal 2410. The user access authority determination unit 130 may use information for checking whether the user of the terminal can normally access the door to post-authenticate the abnormal access of the user of the terminal.

In some embodiments of the present disclosure, in order to perform the post-authentication, the user access authority determination unit 130 may display a specific region 2412 through the video output unit of the terminal 2410. In this case, when touch input data is acquired from the specific region 2412 through a user input unit of the terminal 2410, the user access authority determination unit 130 may post-authenticate the abnormal access of the user of the terminal 2410 in response to the acquisition of the touch input data.

In (c), the user access authority determination unit 130 may be included in the user operating device 2420.

In some embodiments of the present disclosure, when the user of the terminal has abnormally accessed the door, the user access authority determination unit 130 may be aware of the abnormal access of the user of the terminal. For example, the user access authority determination unit 130 may acquire a message indicating that the user of the terminal has abnormally accessed the door from the server (e.g., the server included in the control unit 1930).

Next, the user access authority determination unit 130 may visually output the abnormal access through a video output unit of the user operating device 2420.

Also, in order to perform the post-authentication, the user access authority determination unit 130 may display a specific region 2421 through the video output unit of the user operating device 2420. When input data (e.g., mouse click input data) is acquired from the specific region 2421 through the user input unit of the user operating device 2420, the user access authority determination unit 130 may post-authenticate the abnormal access of the user of the terminal in response to the acquisition of the input data.

The abnormal access management method according an embodiment of the present disclosure has been described above. A door-open time control method according to an embodiment of the present disclosure will be described below.

<Door Control Method>

Figure 25:
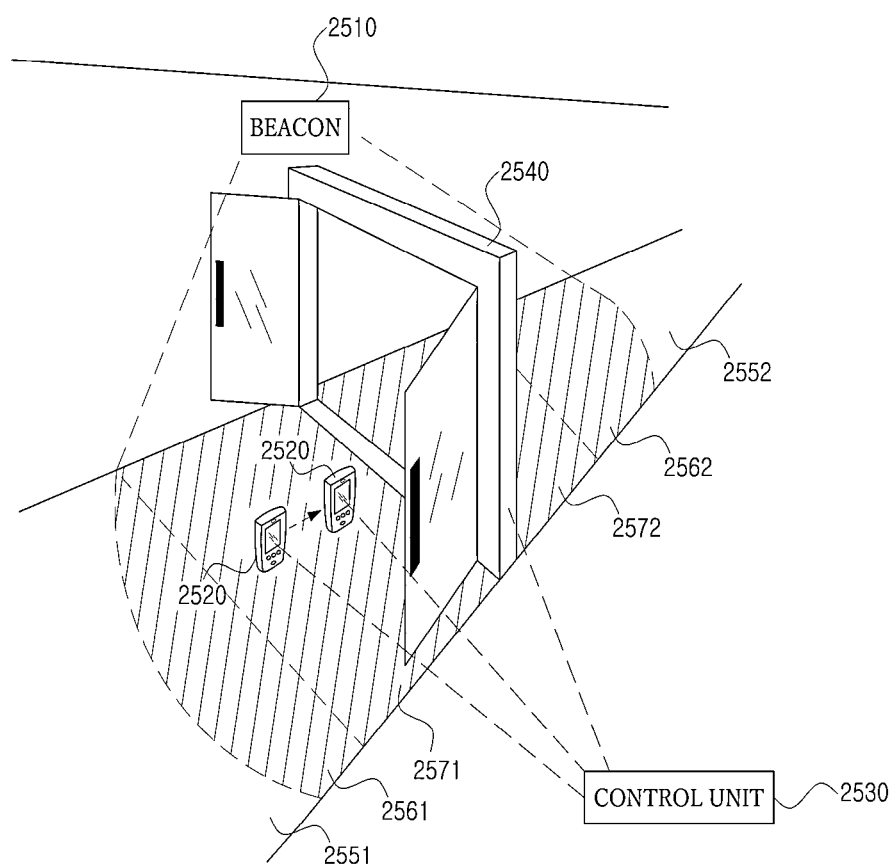
FIG. 25 is a diagram for describing a door control method according to an embodiment.

FIG. 25 is a diagram for describing a door control method according to an embodiment.

Referring to FIG. 25, an access management system may include a beacon 2510, a terminal 2520, and a control unit 2530.

In particular, FIG. 25 shows a system in which the beacon 2510 corresponds to a door 2540 on a one-to-one basis. However, the door control method is also applicable to a system in which beacons 2510 correspond to the door 2540 on an n-to-one basis. In addition, the terminal 2520 shown in FIG. 25 is a device that a user carries, and the user of the terminal 2520 is not shown in FIG. 25.

An outer side 2551 and an inner side 2552 may be divided by the door 2540. In particular, a door proximity region 2561 determined on the basis of the beacon 2510 may be further defined at the outer side 2551, and also a door proximity region 2562 determined on the basis of the beacon 2510 may be defined at the inner side 2552. When it is determined that the terminal 2520 has entered the door proximity regions 2561 and 2562, a predetermined access management operation may be initiated by the control unit 2530.

In order for the user of the terminal 2520 to access the door 2540, access of the user of the terminal 2520 should be authenticated. When the access of the user of the terminal 2520 is authenticated, the control unit 2530 may unlock the door 2540.

In some embodiments of the present disclosure, the control unit 2530 may output an unlock command in order to unlock the door 2540. According to the unlock command, a locking unit (e.g., a server included in the control unit 2530) may control a locking means to unlock the door 2540. Subsequently, the locking unit may lock the door 2540 at a predetermined time after the door 2540 is unlocked according to the unlock command. In particular, this may frequently occur in a system to which a low-cost passive-type locking unit is applied. Here, the low-cost passive-type locking unit controls the door using only the unlock command rather than a lock command and locks the door according to a time countdown.

However, when the door 2540 is locked before the user of the terminal 2520 passes through the door 2540, the predetermined access management operation should be performed again in order for the user of the terminal 2520 to pass through the door 2540. Depending on the case, the user of the terminal 2520 should perform user authentication, and thus may feel inconvenience. For this, according to the door control method of the present disclosure, the door 2540 may be appropriately control to be unlocked such that the user of the terminal 2520 comfortably passes through the door 2540.

Figure 26:
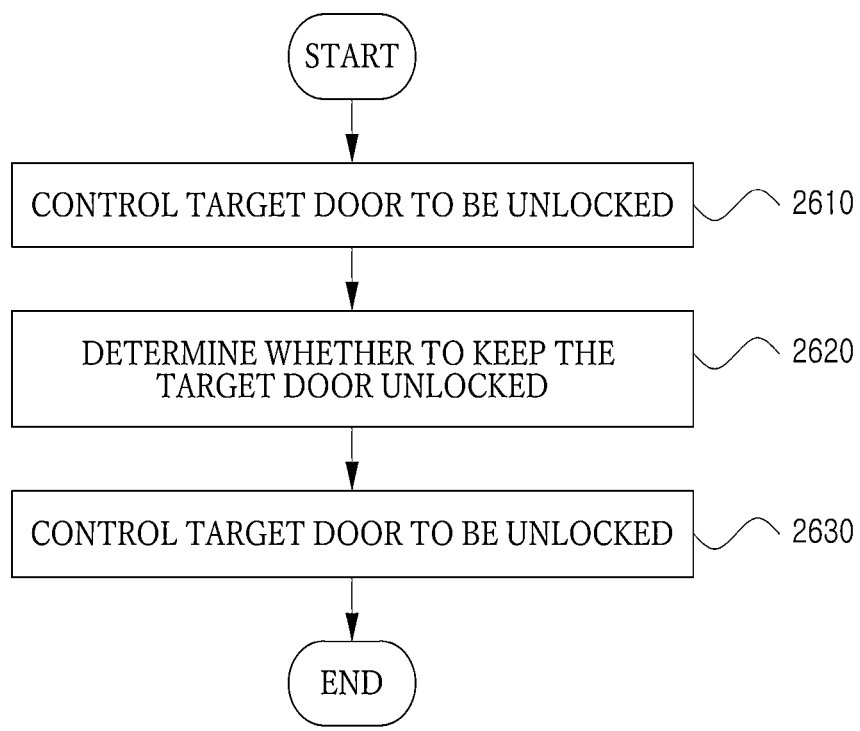
FIG. 26 is a flowchart showing a door control method according to an embodiment.

FIG. 26 is a flowchart showing a door control method according to an embodiment.

Referring to FIG. 26, the door control method according to some embodiments of the present disclosure may include controlling a target door to be unlocked (S2610), determining whether to keep the target door unlocked (S2620), and performing a door unlocking control before the target door is locked when the target door is determined to be kept unlocked (S2630).

The door control method may be performed by the user access authority determination unit 130. That is, when the user access authority determination unit 130 is implemented in the above-described server (e.g., the server included in the control unit 2530), the door control method may be performed by the server. On the other hand, when the user access authority determination unit 130 is configured to be included in the terminal 2520, the door control method may be performed by the terminal 2520.

The steps of the door control method will be described below in detail.

According to some embodiments of the present disclosure, the user access authority determination unit 130 may control the target door 2540 to be unlocked (S2610).

In order to control the target door 2540 to be unlocked, the user access authority determination unit 130 may acquire a BID of the beacon 2510, determine the target door on which a lock/unlock control operation is to be performed using the acquired BID, and determine whether the target door is to be unlocked on the basis of at least one of a UID of the terminal 2520 and user authentication information. The description of steps S830 to S840 of FIG. 8 may be applied to this case, and thus a detailed description thereof will be omitted for convenience.

According to some embodiments of the present disclosure, in order to control the target door 2540 to be unlocked, the user access authority determination unit 130 may generate an unlock command, and the door locking unit 150 may perform a door unlock control operation according to the unlock command. In this case, as long as the unlock command is not acquired within a predetermined time, the door locking unit 150 may lock the target door 2540 after the predetermined time.

According to some embodiments of the present disclosure, the user access authority determination unit 130 may determine whether to keep the target door 2540 unlocked (S2620).

For this, the user access authority determination unit 130 may determine whether a door lock control condition is satisfied. Here, the door lock control condition may be a condition for controlling the unlocked target door 2540 to be locked. In embodiments of the present disclosure, the door lock control condition may include the terminal 2520 passing through the target door 2540 or the terminal 2520 exiting the door proximity region 2561 or 2562.

According to some embodiments of the present disclosure, in order to determine whether the door lock control condition is satisfied, the user access authority determination unit 130 may determine whether the terminal 2520 has passed through the target door 2540. The description of step S2110 of FIG. 21 may be applied to this case, and thus a detailed description thereof will be omitted for convenience. When it is determined that the terminal 2520 has passed through the target door 2540, the user access authority determination unit 130 may determine that the door lock control condition is satisfied and may determine not to keep the target door 2540 unlocked. In addition, when it is determined that the terminal 2520 has not passed through the target door 2540, the user access authority determination unit 130 may determine that the door lock control condition is not satisfied and may determine to keep the target door 2540 unlocked.

According to some embodiments of the present disclosure, in order to determine whether the door lock control condition is satisfied, the user access authority determination unit 130 may determine whether the terminal 2520 has left the door proximity region 2561 or 2562. In other words, the user access authority determination unit 130 may determine whether the terminal 2520 has left the door proximity region 2561 at the outer side with respect to the door 2540 or the door proximity region 2562 at the inner side with respect to the door 2540. For example, the user access authority determination unit 130 may check a door proximity region in which the terminal 2520 is located at a time when the terminal 2520 makes a request to access the target door 2540, that is, at a time when the terminal 2520 transmits the acquired BID. After the target door 2540 is unlocked in step S2620, the user access authority determination unit 130 may determine whether the terminal 2520 has left the door proximity region.

In this case, when it is determined that the terminal 2520 has left the door proximity region, the user access authority determination unit 130 may determine that the door lock control condition is satisfied and may determine not to keep the target door 2540 unlocked.

However, when it is determined that the terminal 2520 has not left the door proximity region, the user access authority determination unit 130 may determine that the door lock control condition is not satisfied and may determine to keep the target door 2540 unlocked.

Subsequently, according to embodiments of the present disclosure, when it is determined that the target door 2540 should be kept unlocked, the user access authority determination unit 130 may perform the door unlocking control before the target door 2540 is locked (S2630).

When it is determined that the target door 2540 should be kept unlocked, the user access authority determination unit 130 may generate the unlock command in order to unlock the door.

In this case, as described above, when the locking unit receives the unlock command and performs an unlocking operation, the locking unit may perform a locking operation after a predetermined time (i.e., a lock return time). When a time period for which it is determined the door lock control condition is not satisfied is longer than the predetermined lock return time, the unlock command may be generated and also transmitted multiple times.

In embodiments of the present disclosure, when the unlock command should be generated multiple times, the user access authority determination unit 130 may generate an unlock command at a predetermined generation interval. Here, the predetermined generation interval is shorter than a predetermined time period which is from the target door 2540 being unlocked by one unlock command to the target door 2540 being locked again. That is, the predetermined generation interval may be shorter than the predetermined lock return time. In embodiments of the present disclosure, when the unlock command should be generated multiple times, the user access authority determination unit 130 may consecutively generate unlock commands and consecutively output the generated unlock commands.

The user access authority determination unit 130 may repeatedly perform steps S2620 and S2630 to keep the target door 2540 unlocked.

When the target door 2540 is determined not to be kept unlocked in step S2620, the user access authority determination unit 130 may not generate the unlock command Thus, the door locking unit 150 may lock the target door 2540 after the lock return time. On a condition that the unlock command is generated or output multiple times, when the lock return time has passed since the last time at which the last unlock command was executed by the locking unit, the target door 2540 may be locked.

In some embodiments of the present disclosure, in order to control the target door 2540 to be unlocked, the user access authority determination unit 130 may control the target door 2540 using the lock command together with the unlock command. For example, the target door 2540 is unlocked according to the unlock command, and the target door 2540 may be locked according to the lock command. When the target door 2540 is determined to be kept unlocked in step S2620, the user access authority determination unit 130 may not output the lock command That is, after the target door 2540 is determined to be kept unlocked in step S2620, the output of the lock command may be delayed until the target door 2540 is determined not to be kept unlocked in step S2620. In addition, while the output of the lock command is delayed, the unlock command may also be output. Thus, the target door 2540 may be kept unlocked. Subsequently, when the target door 2540 is determined not to be kept unlocked in step S2620, the lock command may be output to lock the target door 2540.

Figure 27:
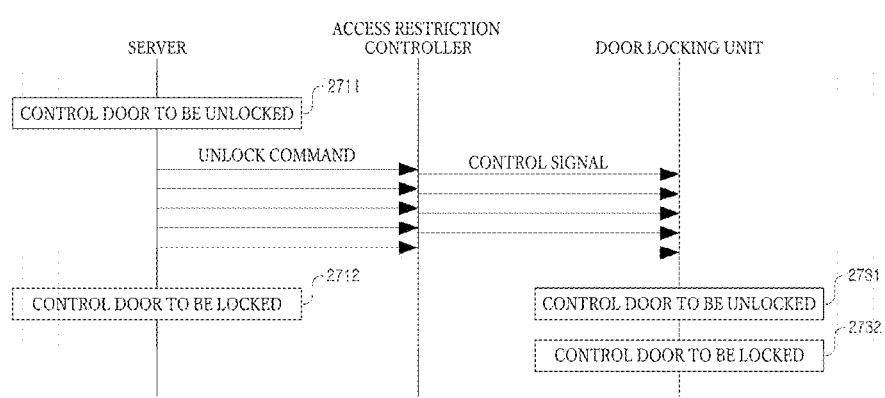
FIG. 27 is a flowchart for describing a door unlock control operation according to an embodiment.

FIG. 27 is a flowchart for describing a door unlock control operation according to an embodiment. In particular, FIG. 27 is a diagram for describing the above-described door unlock control operation in detail on the assumption that the access management system according to the present disclosure is composed of a terminal, a beacon, a server, an access restriction controller, and a door locking unit.

Referring to FIG. 27, according to some embodiments of the present disclosure, the user access authority determination unit 130 may be included in a server. The server may perform a door unlock control according to step S2610 described above with reference to FIG. 26 (S2711).

In some embodiments of the present disclosure, when the door is determined to be unlocked, the server may generate an unlock command for unlocking the door and transmit the generated unlock command to an access restriction controller. The server may determine whether to keep a target door unlocked according to step S2620 described above with reference to FIG. 26. On a condition that the target door is determined to be kept unlocked, the server may generate the unlock command at a predetermined interval while the target door is kept unlocked, and may transmit the generated unlock command to the access restriction controller.

In addition, the access restriction controller may receive the unlock commands generated at a predetermined generation interval from the server at an interval corresponding to the predetermined generation interval and generate a control signal according to the received unlock commands. The access restriction controller may transmit the control signal generated at the interval corresponding to the predetermined generation interval to a locking unit.

A door locking unit may perform a door unlock control operation according to the received control signal (S2731). Thus, while receiving the control signal, the door locking unit may physically control the locking means 630 of FIG. 6 to unlock the door.

In addition, in some embodiments of the present disclosure, the server may determine whether to keep the target door unlocked according to step S2620 described above with reference to FIG. 26. When the target door is determined not to be kept unlocked, the server may perform a door lock control (S2712). In this case, the server does not generate the unlock command, and thus the door locking unit cannot acquire the control signal. When the door locking unit cannot acquire the control signal, the door locking unit may physically control the locking means 630 of FIG. 6 to lock the door at a predetermined time after the door locking unit acquires the last control signal.

For a cheap door locking unit, which is usually used now, a door unlock time is determined as the predetermined time (i.e., a lock return time). However, depending on conditions of the user of the terminal, a time during which the door is kept unlocked may have to be adjusted. As described above with reference to FIGS. 26 and 27, in the door control method of the present disclosure, the door unlock time may be adjusted by periodically outputting the unlock command at the predetermined generation interval. According to the door control method of the present disclosure, the door unlock time may be adjusted without replacing an existing door locking unit, and thus user convenience may be enhanced.

Figure 28:
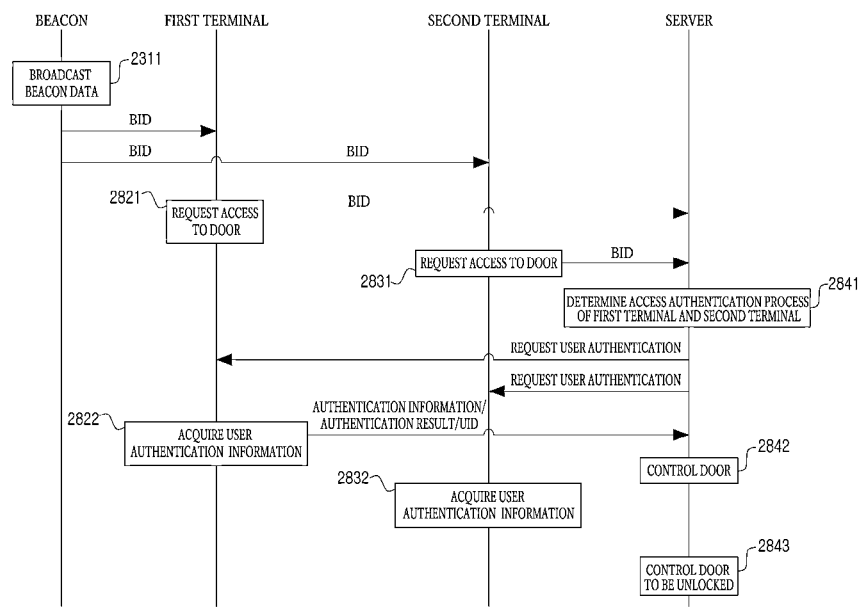
FIG. 28 is a flowchart showing a door control method according to another embodiment.

FIG. 28 is a flowchart showing a door control method according to another embodiment. In particular, FIG. 28 is a diagram for describing a modification in which the above-described door unlock time control method may be applied, when a plurality of users desire to pass through the door at almost the same time or similar times.

Referring to FIG. 28, an access management system may include a beacon, a first terminal, a second terminal, and a server. The above-described user access authority determination unit 130 may be included in the server. Here, the beacon may be a modification of the beacon 200 of FIG. 2, the first and second terminals may be modifications of the terminal 300 of FIG. 3, and the server may be a modification of the server 400 of FIG. 4. In addition, it is assumed that the first terminal and the second terminal are located in proximity to each other.

In a modification of the present disclosure, the beacon may broadcast beacon data (S2811). When the first and second terminals are located in a broadcasting range (or a door proximity region), the first and second terminals may acquire the beacon data. The first terminal may make a request to access a target door (S2821), and the second terminal may also make a request to access the target door (S2831). In this case, the first terminal may transmit an acquired BID to the server, and the second terminal may transmit an acquired BID to the server.

In addition, in a modification of the present disclosure, the first and second terminals may be located at an outer side with respect to the target door, and the server may determine an access authentication process of the first and second terminals as a first access authentication process (S2841). Thus, the server may request user authentication from the first and second terminals.

Subsequently, the first terminal may acquire user authentication information from a user (S2822) and may transmit the user authentication information, a user authentication result, or a UID of the user of the first terminal.)

First, when the first terminal transmits the user authentication information to the server, the server may perform a user authentication operation on the basis of the acquired user authentication information in step S2842. When the acquired user authentication information matches prestored user authentication information as a result of performing the user authentication operation, the server may acquire a UID of the user of the first terminal from database in which a plurality of UIDs are stored and may control the door to allow a user of a terminal corresponding to the acquired UID, that is, the user of the first terminal to pass through the door.

ii) In addition, the first terminal may compare the acquired user authentication information and user authentication information (e.g., the first terminal acquires the prestored user authentication information from the server and stores the acquired user authentication information) prestored in the first terminal to perform the user authentication operation and may transmit a user authentication result of the user authentication operation to the server. In step S2842, the server acquires the user authentication result. When the server confirms that the user authentication information acquired from the first terminal and the user authentication information prestored in the first terminal match each other from the acquired user authentication result, the server may acquire a UID of the first terminal matching the user authentication information prestored in the first terminal from the above-described database and may control the door to allow the user of the first terminal to pass through the door.

iii) In addition, the first terminal performs the user authentication operation. When it is determined that the acquired user authentication information matches the prestored user authentication information, the first terminal may transmit the UID of the first terminal to the server. In step S2842, when the server acquires the UID of the first terminal from the first terminal, the server may control the door to allow the user of the first terminal to pass through the door.

As described above, in step S2842, the server may unlock the door on the basis of the user authentication information, the user authentication result, or the UID of the user of the first terminal. This may be caused from the result obtained by the user of the first terminal performing the user authentication procedure. In this case, after performing a door unlocking operation, the server may determine whether to keep the door unlocked. When the first terminal satisfies a door lock control condition, the server may control the door to be locked. However, when the second terminal does not satisfy the door lock control condition, that is, when the second terminal does not pass through the target door or is located in the door proximity region, the server may lock the door.

This is because, when an access management operation for the first terminal and an access management operation for the second terminal are independent of each other, and a door unlock control is performed in consideration of the position of the second terminal while a user of the second terminal is not authenticated to access the target door, the unauthenticated user of the second terminal who is not authenticated to access the target door can easily access the target door, and thus security may be weakened.

In addition, in some embodiments of the present disclosure, in step S2842, the server may lock the door. That is, the server may determine whether to unlock the door in consideration of whether the user of the second terminal as well as the user of the first terminal are authenticated to access the target door. When the user of the second terminal is not authenticated to access the target door, the server may not perform the door unlock control. This is because, when the door unlock control is performed in consideration of only whether the first terminal may access the target door, the second terminal that cannot access the target door may access the unlocked target door. In summary, on a condition that there are a plurality of users who desire to access a specific door at the same time or similar times, the access management system may be designed to generate or output an unlock command for a specific door only when all of the plurality of users perform the user authentication operation. Thus, the occurrence of abnormal access users as described above may be fundamentally prevented.

In step S2842, whether to control the door to be unlocked or whether to control the door to be locked may be determined depending on a security policy. The server may selectively control the door to be unlocked or locked according the security policy.

In addition, in an embodiment of the present disclosure, like the first terminal, the second terminal may acquire user authentication information from a user (S2822), and may transmit the user authentication information, a user authentication result, or a UID of the user of the second terminal to the server. The server may authenticate the user of the second terminal to access the target door on the basis of the user authentication information of the second terminal, the user authentication result, or the UID of the user of the second terminal and may control the door to be unlocked.

Up to now, the door unlock control methods according to various embodiments and modifications of the present disclosure have been described. Various control methods of a beacon signal according to the present disclosure will be described below.

<Beacon Control Method>

Figure 29:
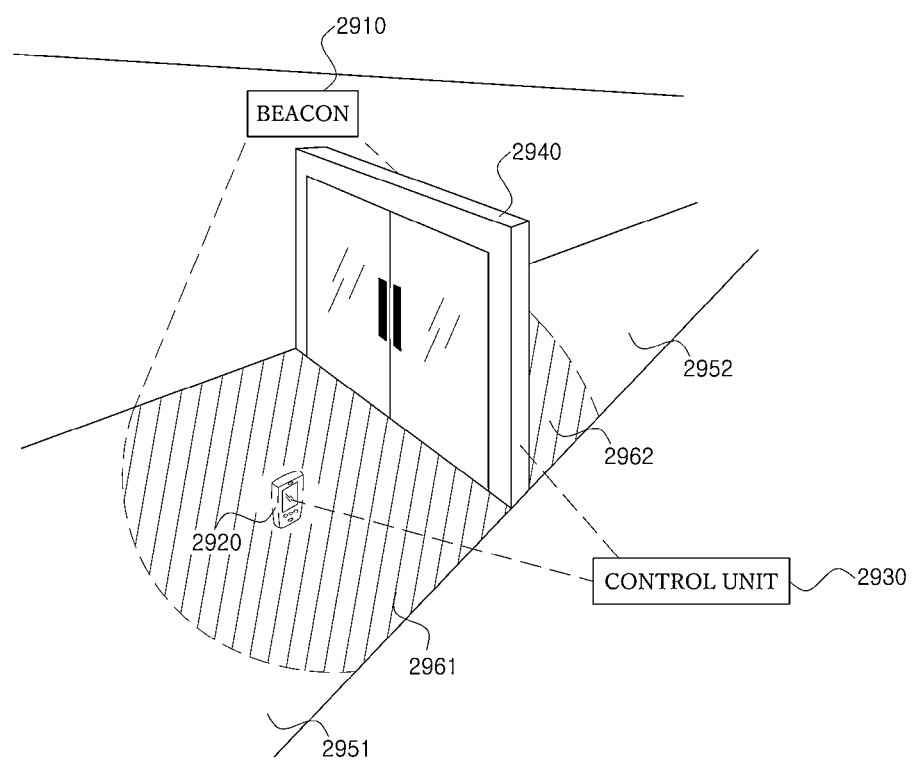
FIG. 29 is a diagram for describing a beacon control method according to an embodiment.

FIG. 29 is a diagram for describing a beacon control method according to an embodiment.

Referring to FIG. 29, an access management system may include a beacon 2910, a terminal 2920, and a control unit 2930.

In particular, FIG. 29 shows a system in which the beacon 2910 corresponds to a door 2940 on a one-to-one basis. However, the beacon control method is also applicable to a system in which beacons 2910 correspond to the door 2940 on an n-to-one basis. In addition, the terminal 2920 shown in FIG. 29 is a device that a user carries, and the user is not shown in FIG. 29.

An outer side 2951 and an inner side 2952 may be divided by the door 2940. In particular, a door proximity region 2961 determined on the basis of the beacon 2910 may be further defined at the outer side 2951, and also a door proximity region 2962 determined on the basis of the beacon 2910 may be defined at the inner side 2952. When it is determined that the terminal 2920 has entered the door proximity region 2961 at the outer side 2951 or when it is determined that the terminal 2920 has entered the door proximity region 2962 at the inner side 2952, a predetermined access management operation may be initiated.

The beacon 2910 may transmit a signal at a predetermined transmission power level and at a predetermined transmission interval in a broadcast manner. In addition, when the beacon 2910 transmits the signal, the beacon 2910 may transmit beacon data.

According to a security policy, when the terminal 2920 is located in the broadcasting range or in the door proximity region 2961 or 2962, the terminal 2920 may acquire the signal. When the terminal 2920 receives the beacon data, the terminal 2920 may appropriately process the beacon data and then transmit, to the control unit 2930, information for the access management operation according to the present disclosure or, alternatively, may transmit the beacon data to the control unit 2930 without special processing.

In some embodiments of the present disclosure, when the terminal 2920 is located in the door proximity region 2961 or 2962, the terminal 2920 may receive the beacon date from the beacon 2910. In this case, the terminal 2920 may transmit ack data (or response data) in response to the reception of the beacon data.

On the other hand, when the terminal 2920 is not located in the door proximity region 2961 or 2962, the terminal 2920 cannot receive the beacon data from the beacon 2910. Also, the ack data cannot be transmitted to the beacon 2910.

However, in this case, the beacon 2910 may periodically transmit the signal including the beacon data even when the terminal 2920 is located outside the door proximity region 2961 or 2962 and thus cannot receive the beacon data. Accordingly, continuous battery consumption of the beacon 2910 may occur.

As a detailed example, when the beacon 2910 is installed in an office of a company, terminals 2920 of office employees may acquire beacon data from the beacon 2910. However, although the office employees go home, and thus all of the terminals cannot acquire the beacon data, the beacon 2910 continuously transmits the signal including the beacon data. Thus, the battery of the beacon may be wasted.

Accordingly, in order to efficiently operate the beacon 2910, a transmission interval, a transmission power level, etc. of the signal transmitted by the beacon may be adjusted according to an environment around the beacon 2910.

Figure 30:
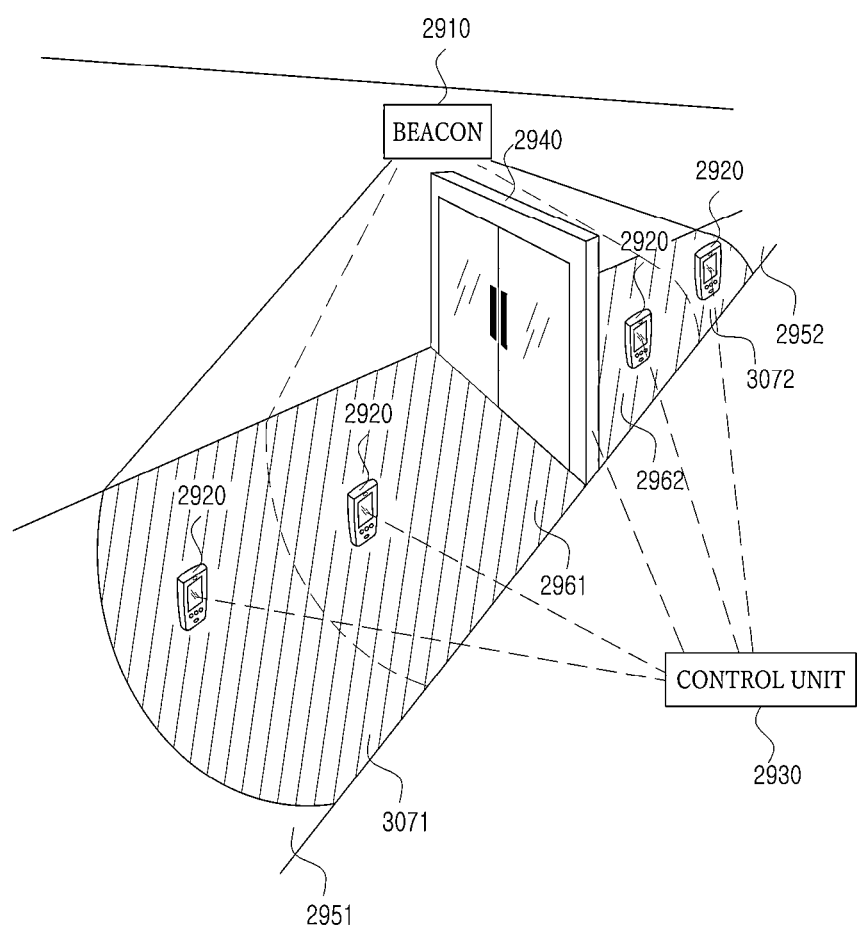
FIG. 30 is a diagram for describing a beacon control method according to another embodiment.

FIG. 30 is a diagram for describing a beacon control method according to another embodiment.

Referring to FIG. 30, an access management system may include a beacon 2910, a terminal 2920, and a control unit 2930. Elements and operations thereof of the access management system of FIG. 30 are similar to those of the access management system of FIG. 29.

However, first door proximity regions 2961 and 2962 and second door proximity regions 3071 and 3072 may be defined at an outer side 2951 and an inner side 2952, respectively. The first door proximity region 2961 or 2962 may have a smaller region than the second door proximity region 3071 or 3072, and the second door proximity region 3071 or 3072 may include the first door proximity region 2961 or 2962. In addition, the range of each door proximity region may be adjusted according to a transmission power level of the beacon 2910.

On a condition that the second door proximity region 3071 or 3072 is selected as the door proximity region, the terminal 2920 may acquire a signal when the terminal 2920 is located in the second door proximity region 3071 or 3072 larger than the first door proximity region 2961.

On the other hand, on a condition that the first door proximity region 2961 or 2962 is selected as the door proximity region, the terminal 2920 may acquire the signal when the terminal 2920 is located in the first door proximity region 2961 or 2962 and cannot acquire the signal when the terminal 2920 is located outside the first door proximity region 2961. Thus, when the terminal 2920 is located outside the first door proximity region 2961, a predetermined access management operation is not initiated, and thus the terminal 2920 cannot access the door 2940.

When the door proximity region is set to have a small range, the user may fee inconvenience depending on the case. For example, when there are many users of terminals 2920 that enter the inner side through the door 2940, e.g., during a morning peak hour, a time it takes for the users of the terminals 2920 to approach the first door proximity region 2961 or 2962 may be longer due to a number of people who desire to come to work. Even in such a situation, when the door proximity region 2961 or 2962 is set as the door proximity region, the predetermined access management operation is not initiated for a terminal 2920 located outside the first door proximity region 2961 or 2962. Thus, much time may be needed for the user of the terminal 2920 to access the door 2940.

In particular, when the beacon 2910 is installed in front of the door 2940, the door proximity region 2962 behind the door 2940 may be smaller than the door proximity region 2961 in front of the door 2940 because of the door 2940. Accordingly, a terminal located behind the door 2940 may have to approach the door 2940 more closely in order to perform a security access operation. In such a situation, when there are many users of terminals 2920 that desire to exit to the outer side through the door 2940, e.g., during an evening peak hour, quite a lot of time may be needed to exit to the outer side through the door 2940.

Accordingly, in order for the user to access the door 2940 conveniently and rapidly, a transmission interval, a transmission power level, etc. of the signal transmitted by the beacon may be adjusted according to an environment around the beacon 2910.

Figure 31:
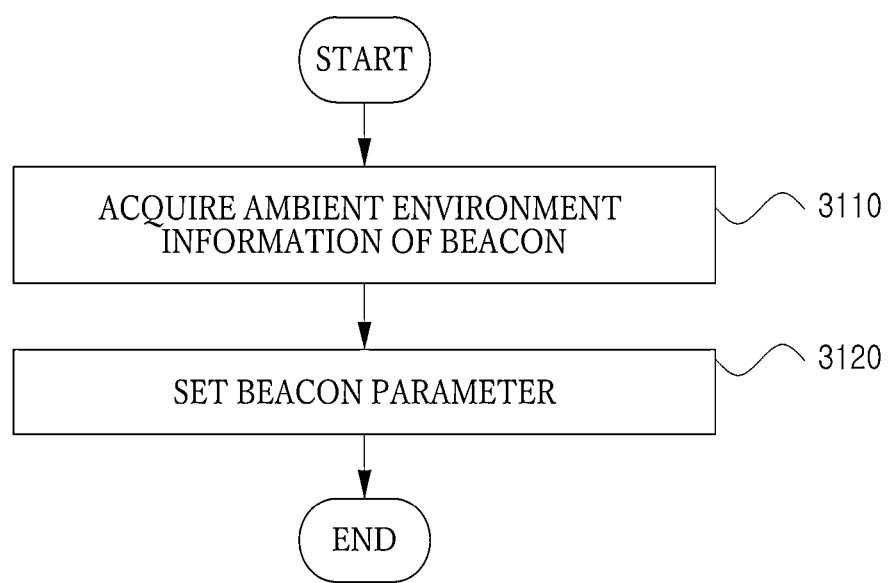
FIG. 31 is a flowchart for describing a beacon control method according to an embodiment.

FIG. 31 is a flowchart for describing a beacon control method according to an embodiment.

Referring to FIG. 31, the beacon control method according to some embodiments of the present disclosure may include acquiring ambient environment information of a beacon (S3110) and setting up a beacon parameter on the basis of the ambient environment information (S3120).

In some embodiments of the present disclosure, the beacon control method may be performed by a beacon parameter control unit that sets up a beacon parameter of the beacon 2910. In addition, the beacon control method may also be performed by the user access authority determination unit 130. The beacon parameter control unit may be included in the user access authority determination unit 130 or may be a separate unit. For convenience of description, only the beacon parameter control unit will be described below as a main agent that performs the beacon control method. However, it should be noted that the beacon control method to be described below may be performed by the user access authority determination unit 130.

In addition, in some embodiments of the present disclosure, the beacon parameter control unit may be applied to other systems having no association with the access management as well as the access management system. That is, it should be noted that the beacon parameter control unit may also be used in any field where the beacon is used (e.g., a location-based information providing system, a payment system, the marketing field, The Internet of Things, etc.).

The steps of the beacon control method will be described below in detail.

According to some embodiments of the present disclosure, the step of acquiring ambient environment information of a beacon may be performed (S3110). The ambient environment information of the beacon may indicate information from which the presence of a terminal 2920 located near the beacon 2910, the number of terminals 2920 located near the beacon 2910, etc. may be checked directly or indirectly. For example, the ambient environment information may include the current time and illumination, movement, noise, and the number of terminals near the beacon 2910.

In an embodiment of the present disclosure, the step of acquiring the ambient environment information of the beacon (S3110) may be initiated by the beacon 2910.

In some embodiments of the present disclosure, the beacon 2910 may include a timer. The beacon 2910 may acquire information on the current time through the timer.

In some embodiments of the present disclosure, the beacon 2910 may include an environmental sensor (e.g., an illumination sensor, a motion sensor, a noise sensor, etc.). In addition, the environmental sensor may be installed outside the beacon 2910, and the beacon 2910 may acquire a sensing result from the environmental sensor. For example, the beacon 2910 may sense illumination in the vicinity using an illumination sensor, sense movement in the vicinity using a motion sensor, such as an infrared sensor, and sense noise in the vicinity using a noise sensor.

In addition, in some embodiments of the present disclosure, the beacon 2910 may receive ack data from the terminal 2920. For example, when the terminal 2920 acquires beacon data from the beacon 2910, the terminal 2920 may transmit ack data corresponding to the beacon data to the beacon 2910, and the beacon 2910 may receive the ack data.

When the beacon parameter control unit is implemented in such a server as described above (e.g., a server that may be included in the control unit 2930, a server that may be included in a location-based information providing system, etc.), the ambient environment information may be finally transmitted to the server.

In addition, when the beacon parameter control unit is implemented in such a terminal 2920 as described above, the ambient environment information may be finally transmitted to the terminal 2920.

Furthermore, although not shown in FIG. 29, a beacon other than the beacon 2910 may be installed. As an example, the other beacon may be installed adjacent to the beacon 2910 or may not be installed adjacent to the beacon 2910. In addition, the other beacon may be a beacon for controlling the beacon 2910 (e.g., a master beacon) or may not be a beacon for controlling the beacon 2910. In some embodiments of the present disclosure, the beacon parameter control unit may be implemented in the other beacon. In this case, the ambient environment information may be finally transmitted to the other beacon.

Alternatively, when the beacon parameter control unit is implemented to be included in the beacon 2910, the ambient environment information need not be transmitted to another external device.

In an embodiment of the present disclosure, the step of acquiring the ambient environment information of the beacon (S3110) may be initiated by the server.

In some embodiments of the present disclosure, the server may acquire additional information such as user access information, commuting information, or a log from the ambient environment information of the beacon 2910. For example, when it is confirmed that all office employees return from the office through the commuting information, the server may confirm an environment in which there are no people in proximity of the beacon 2910.

When the beacon parameter control unit is implemented in the server as described above, the ambient environment information need not be transmitted to another external device. Alternatively, when the user access authority determination unit 130 is implemented to be included in the beacon 2910, the ambient environment information may be finally transmitted to the beacon 2910.

According to some embodiments of the present disclosure, the acquiring of the ambient environment information may be performed to estimate the number of people located in the proximity of the beacon 2910.

In some embodiments of the present disclosure, the beacon parameter control unit may estimate the number of terminals on the basis of information on the current time.

For example, the beacon parameter control unit may include at least one of information regarding a time at which a relatively large number of users are located in the vicinity of the beacon 2910 (e.g., working hour information) and information regarding a time at which a relatively small number of users are located in the vicinity of the beacons (e.g., off-hour information). From such information, the beacon parameter control unit may estimate the number of users who are currently located in the vicinity of the beacon 2910 on the basis of the current time information. For example, the beacon parameter control unit may estimate that the number of users located in the vicinity of the beacon 2910 is relatively large when the current time corresponds to a working hour, and may estimate that the number of users located in the vicinity of the beacon 2910 is relatively small when the current time corresponds to an off-hour.

Hereinafter, the number of users being relatively small may denote that the number of users is equal to or less than a predetermined first threshold, and the number of users being relatively large may denote that the number of users is greater than a predetermined second threshold. In this case, the predetermined first threshold and the predetermined second threshold may be the same number or different numbers.

In addition, in some embodiments of the present disclosure, the beacon parameter control unit may sense illumination in the vicinity of the beacon 2910 using the illumination sensor, and may estimate that the number of users located in the vicinity of the beacon 2910 is relatively small when the sensed illumination is smaller than a predetermined illumination level.

In addition, the beacon parameter control unit may sense movement in the vicinity of the beacon 2910 using the motion sensor, such as an infrared sensor, and estimate that there are no users in the vicinity of the beacon 2910 when the movement is not sensed in the vicinity of the beacon 2910.

In addition, the beacon parameter control unit may sense noise in the vicinity of the beacon 2910 using the noise sensor, and may estimate that the number of users located in the vicinity of the beacon 2910 is relatively large when the sensed noise is equal to or greater than a predetermined noise level.

In addition, in some embodiments of the present disclosure, when the beacon 2910 receives ack data corresponding to beacon data from the terminal 2920, the beacon parameter control unit may determine that a user (that is, a terminal used by the user) is located in the vicinity (e.g., a door proximity region) of the beacon 2910. In addition, when the beacon parameter control unit has not received ack data corresponding to the beacon data from the terminal 2920 during a predetermined time (e.g., 1 hour), the beacon parameter control unit may determine that a user (that is, a terminal used by the user) is not located in the vicinity of the beacon 2910.

In addition, in some embodiments of the present disclosure, the beacon parameter control unit may use additional information. For example, when it is confirmed that all office employees return from the office through the commuting information, the beacon parameter control unit may determine that a user is not located in proximity of the beacon 2910. In addition, when a predetermined number or more of the office employees return from the office, the beacon parameter control unit may estimate that the number of users located in the vicinity of the beacon 2910 is relatively small. When less than the predetermined number of the office employees return from the office, the beacon parameter control unit may estimate that the number of users located in the vicinity of the beacon 2910 is relatively large.

In addition, according to some embodiments of the present disclosure, the step of setting up a beacon parameter on the basis of the ambient environment information may be performed (S3120). Here, the beacon parameter indicates a parameter that may control an operation of the beacon 2910 and may include a signal transmission interval and a signal transmission power level of the beacon 2910, a range of a door proximity region, an operation mode, etc.

In an embodiment of the present disclosure, when there are no terminals in the vicinity of the beacon 2910 or when the number of users is relatively small, the user access authority determination unit 130 may set up the beacon parameter such that battery consumption of the beacon 2190 decreases. For example, the user access authority determination unit 130 may set the transmission interval to a long time, reduce the transmission power, or set the door proximity region to a small area in order to reduce battery consumption of the beacon 2910.

In addition, the user access authority determination unit 130 may adaptively adjust the transmission interval, the transmission power, and the door proximity region according to the number of users (that is, terminals of the users) located in the vicinity of the beacon 2910.

In addition, the operation mode of the beacon 2910 may include a general mode and a sleep mode, and the beacon parameter control unit may determine the operation mode as the sleep mode in order to reduce battery consumption of the beacon 2910. Here, the general mode may indicate a mode in which the beacon 2910 transmits a signal, and the sleep mode may indicate a mode in which the beacon 2910 does not transmit a signal. As the beacon 2910 enters the sleep mode, the beacon 2910 may not transmit a signal including beacon data. In this case, when the beacon 2910 receives a wake-up signal from an external device, the operation mode of the beacon may be changed to the general mode. In addition, when it is estimated that there is a terminal in the vicinity of the beacon 2910, the beacon parameter control unit may change the operation mode of the beacon 2910 to the general mode.

In addition, in another embodiment of the present disclosure, when the number of users located in the vicinity of the beacon 2910 is relatively large, the user access authority determination unit 130 may set the beacon parameter to allow a larger number of terminals to acquire the beacon data. For example, when the number of users located in the vicinity of the beacon 2910 is relatively large, the beacon parameter control unit may set the door proximity to a large area. For this, the user access authority determination unit 130 may set the transmission power of the beacon to be high.

In addition, in another embodiment of the present disclosure, when the number of users located in the vicinity of the beacon 2910 is relatively large, the beacon parameter control unit may set a beacon parameter to allow the terminal 2920 to more frequently (or more strongly) acquire the beacon data. For example, when the number of users located in the vicinity of the beacon 2910 is relatively large, the beacon parameter control unit may set the transmission interval to be shorter than the current transmission interval. As the transmission interval is set to be short, the beacon 2910 may transmit the beacon data at a shorter internal, and the terminal 2920 may more frequently acquire the beacon data. In addition, as the terminal 2920 acquires the beacon data more frequently, a response of the terminal 2920 may be enhanced, and accuracy of a location determination of the terminal 2920 (that is, location tracking of a user who carries the terminal 2920) may be enhanced.

In addition, embodiments of the present disclosure are not limited thereto. In still another embodiment of the present disclosure, when the number of users located in the vicinity of the beacon 2910 is relatively large, the user access authority determination unit 130 may set the beacon parameter to allow a smaller number of terminals to acquire the beacon data. When a relatively large number of users are located in the vicinity of the beacon 2910, it is quite probable that the above-described abnormal access will occur. Thus, in order to enhance security, the beacon parameter may be set to allow a smaller number of terminals to acquire the beacon data. For example, the beacon parameter control unit may set the door proximity region to be small and may set the transmission power of the beacon 2910 to be low.

In some embodiments of the present disclosure, the beacon parameter control unit may check the transmission power of the beacon 2910. When a difference between the checked transmission power of the beacon 2910 and a predetermined transmission power is equal to or greater than a predetermined value, the beacon parameter control unit may adjust the transmission power of the beacon 2910 to the predetermined transmission power.

In some embodiments of the present disclosure, the beacon parameter control unit may include a table for setting the beacon parameter and may set the beacon parameter using the table. For example, a transmission interval and a transmission power level of a beacon signal, a range of a door proximity region, a field of an operation mode, and a setting value corresponding to each field may be included in the table. In this case, the beacon parameter control unit may set the beacon parameter according to the field and the setting value, and may update the field or the setting value to adjust the beacon parameter.

When the beacon parameter control unit is implemented to be included in the beacon 2910, the beacon parameter is not set from another external device and may be autonomously set by the beacon 2910. However, when the beacon parameter control unit is implemented in an external device other than the beacon 2910, the beacon parameter may be set by the external device other than the beacon 2910.

In some embodiments of the present disclosure, when the beacon parameter control unit is implemented in the above-described server, the beacon parameter may be set by the server.

For example, the server may perform direct communication with the beacon 2910 to control the beacon parameter of the beacon 2910. In this case, the server may transmit a control signal (e.g., a control signal including a table for setting the above-described beacon parameter, a setting value corresponding to the beacon parameter, etc.) for setting the beacon parameter to the beacon 2910, and the beacon 2910 may adjust the beacon parameter according to the received control signal. As an example, the beacon 2910 may check the table from the received control signal and may adjust the beacon parameter according to the table.

As another example, the server does not perform direct communication with the beacon 2910 and may control the beacon parameter through another external device that directly communicates with the beacon 2910.

As an example, the terminal 2920 may communicate with the server and may also perform communication with the beacon 2910. In this case, the server may transmit information (e.g., the table, and the setting value corresponding to the beacon parameter, etc.) for setting the beacon parameter to the terminal 2920, and the terminal 2920 may transmit a control signal that may control the beacon parameter to the beacon 2910 on the basis of the received information. In addition, in an exemplary embodiment, the terminal 2920 may be a terminal of a manager to be described below, and the terminal of the manager may control the beacon parameter of the beacon 2910 although the server does not perform direct communication with the beacon 2910.

As another example, as described above, a beacon other than the beacon 2910 may be installed, and the other beacon may communicate with the server and the beacon 2910. In this case, the server may transmit information for setting the beacon parameter to the other beacon, and the other beacon may transmit the control signal for setting the beacon parameter to the beacon 2910 on the basis of the received information such that the beacon 2910 sets the beacon parameter.

In some embodiments of the present disclosure, when the beacon parameter control unit is implemented in the terminal 2920, the beacon parameter may be set by the terminal 2920. In addition, in some embodiments of the present disclosure, when the beacon parameter control unit is implemented in another beacon, the beacon parameter may be set by the other beacon.

It has been described above that the number of users is estimated. However, in the access management system according to an embodiment of the present disclosure, it is assumed that a one-to-one correspondence is established between a user and a terminal carried by the user. The estimation of the number of users denotes an estimation of the number of terminals used by the users.

Figure 32:
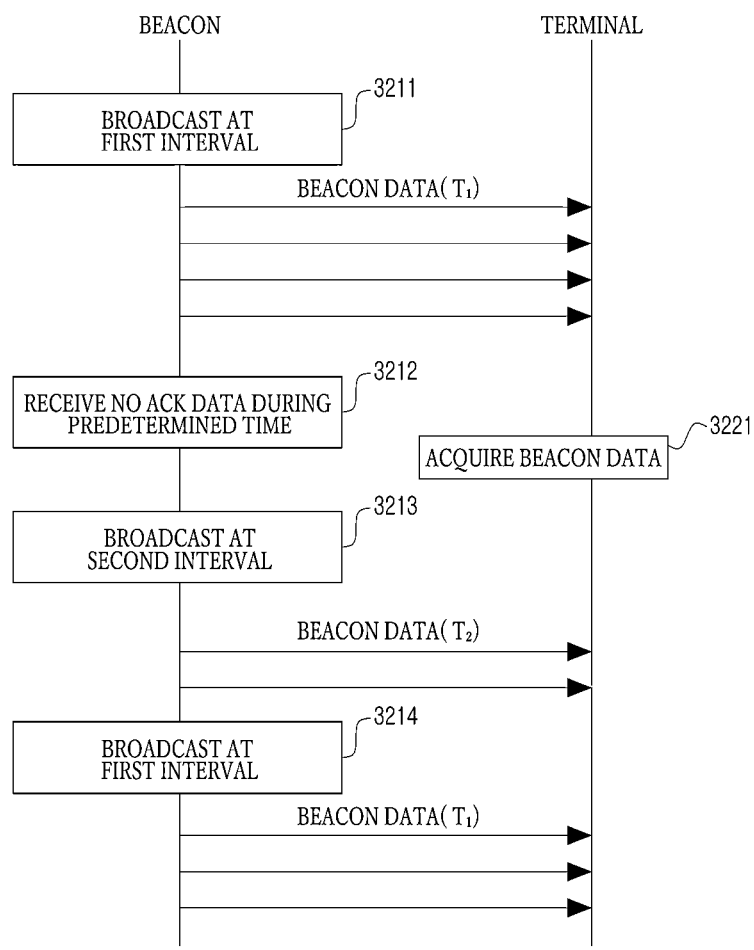
FIG. 32 is a flowchart for describing a beacon control method using ack data output from a terminal according to an embodiment.

FIG. 32 is a flowchart for describing a beacon control method using ack data output from a terminal according to an embodiment.

Referring to FIG. 32, the beacon 2910 may broadcast beacon data at a first interval (S3301). Here, the first interval and a second interval may indicate a transmission interval of the beacon 2910, and the first interval may be shorter than the second interval. It should be appreciated that the transmission interval of the beacon 2910 is not limited thereto, but may include three or more intervals.

In some embodiments of the present disclosure, when the terminal 2920 is not located in the door proximity region 2961, the terminal 2920 cannot receive the beacon data from the beacon 2910. Thus, the beacon 2910 cannot receive ack data from the terminal 2920 during a predetermined time (S3212), and the beacon 2910 may broadcast the beacon data at the second interval, which is longer than the first interval (S3213). Since the beacon 2910 not receiving the ack data denotes that the terminal 2920 is not present in the door proximity region 2961 of the beacon 2910, in order to save a battery, the beacon 2910 may broadcast the beacon data at a long transmission interval. In this case, the beacon 2910 may also decrease the transmission power and reduce the door proximity region 2961.

In addition, when the terminal 2920 is located in the door proximity region 2961, the terminal 2920 may acquire the beacon data (S3221). In addition, the terminal 2920 may transmit ack data to the beacon 2910 in response to the reception of the beacon data. When the beacon 2910 receives the ack data, the beacon 2910 may broadcast the beacon data at the first interval which is shorter than the second interval (S3214).

<Security Mode Management>

Figure 33:
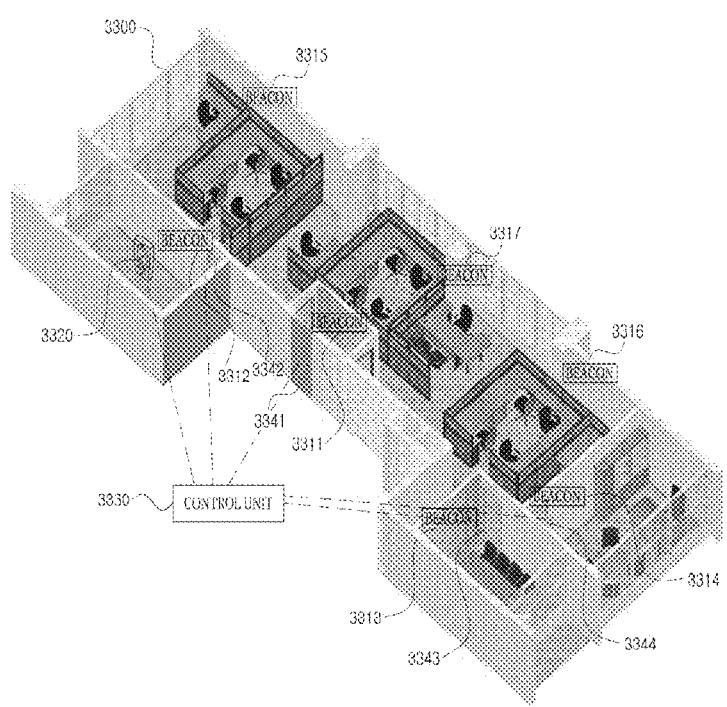
FIG. 33 is a diagram for describing a security mode management method according to an embodiment.

FIG. 33 is a diagram for describing a security mode management method according to an embodiment.

Referring to FIG. 33, in an entire security zone 3300 including a plurality of doors 3341 to 3344, an access management system may perform an access management operation. The access management system may include a plurality of beacons 3311 to 3317, a terminal 3320, and a control unit 3330.

In particular, FIG. 33 shows a system in which a one-to-one correspondence is established between the beacon 3311 and the door 3341, between the beacon 3312 and the door 3342, between the beacon 3313 and the door 3343, and between the beacon 3314 and the door 3344. However, the security mode management method is also applicable to a system in which beacons correspond to doors on an n-to-one basis. In addition, the terminal 3320 shown in FIG. 33 is a device that a user carries, and the user is not shown in FIG. 33.

In addition, a broadcasting region may be defined for each of the beacons 3311 to 3317. When it is determined that the terminal 3320 has entered the broadcasting region, the terminal 3320 may acquire beacon data of a corresponding beacon.

In addition, in some embodiments of the present disclosure, the door 3341 among the plurality of doors 3341 to 3344 may be represented as a master door. Here, the master door 3341 may denote a door through which the terminal 3320 should necessarily pass in order to enter the entire security zone 3300. For example, the master door 3341 may include a front gate of a building, a main gate of a house, a gate of an office, etc.

In some embodiments of the present disclosure, the beacons 3311 to 3314 may be used to control the doors 3341 to 3344 to be locked or unlocked. In this case, the door proximity region may be defined for each of the beacons 3311 to 3314. When it is determined that the terminal 3320 has entered the door proximity region, a certain access management operation may be initiated by the control unit 3330.

On the other hand, the beacons 3315 to 3317 are not used to control the doors 3341 to 3344 to be locked or unlocked, and may be used to determine whether the terminal 3320 is located in a region of the entire security zone 3300. It should be appreciated that the beacons 3311 to 3314 may also be used to determine whether the terminal 3320 is located in a region of the entire security zone 3300.

In addition, an operation mode of the user access authority determination unit 130 may be determined according to whether the terminal is located in the entire security zone 3300. The operation mode of the user access authority determination unit 130 may include a normal mode and a security mode. In the normal mode, the user access authority determination unit 130 may perform an operation of authenticating access of the terminal 3320 to the doors 3341 to 3344. In the security mode, the user access authority determination unit 130 may check whether the terminal is present in the entire security zone 3300 and perform an operation of strengthening security for the entire security zone 3300. In addition, even in the security mode, the user access authority determination unit 130 may perform an operation of authenticating access of the terminal 3320 to the doors 3341 to 3344.

Figure 34:
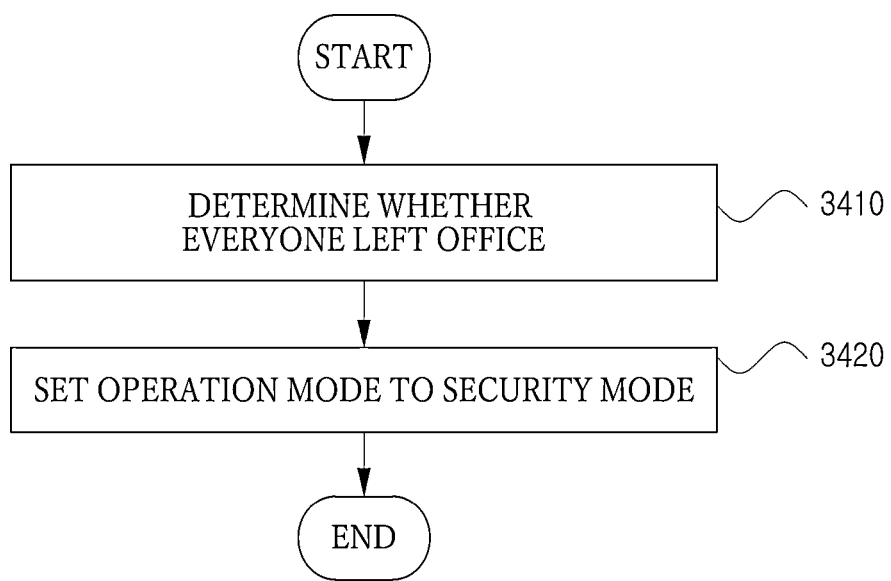
FIG. 34 is a flowchart for describing setting of a security mode according to an embodiment.

FIG. 34 is a flowchart for describing setting of a security mode according to an embodiment.

Referring to FIG. 34, in a security mode management method according to some embodiments of the present disclosure, a step of determining whether all terminals have exited an entire security zone (S3410) and a step of setting an operation mode to a security mode when it is determined that all of the terminals have exited the entire security zone (S3420) may be performed.

In some embodiments of the present disclosure, the security mode management method may be performed by the user access authority determination unit 130. The steps of the security mode management method will be described below in detail.

According to some embodiments of the present disclosure, the step of determining whether all of the terminals have exited an entire security zone may be performed.

For this, the master door 3341 may be controlled to be locked while being closed. This is because, when the master door 3341 is opened or controlled to be unlocked, access of a user may be free and the user access authority determination unit 130 need not operate in the security mode. Accordingly, when the master door 3341 is controlled to be locked while being closed, that is, when the access of the user is not free, the user access authority determination unit 130 may determine whether all terminals have exited the entire security zone.

In addition, in some embodiments of the present disclosure, the user access authority determination unit 130 may determine whether all users have exited the entire security zone 3300 on the basis of ambient environment information of the beacons 3311 to 3317.

As described with reference to FIG. 32, the user access authority determination unit 130 may check whether there is a terminal in the vicinity of the beacons 3311 to 3317 on the basis of the ambient environment information of the beacons 3311 to 3317.

For example, in some embodiments of the present disclosure, the beacons 3311 to 3317 may include an environmental sensor (e.g., an illumination sensor, a motion sensor, a noise sensor, etc.) and may acquire a sensing value (e.g., an illumination value, movement information, or a noise value) for an ambient environment from the environmental sensor. In this case, when the acquired sensing value is equal to or less than a predetermined criterion, that is, when an acquired illumination value is less than a predetermined illumination value, movement is not sensed in the vicinity of the beacons 3311 to 3317, or an acquired noise value is smaller than a predetermined noise value, the user access authority determination unit 130 may determine that users of all of the terminals have exited the entire security zone 3300.

In addition, as another example, when the terminal 3320 acquires beacon data from any one of the beacons 3311 to 3317, the terminal 3320 may transmit the ack data to the beacon. When the beacons 3311 to 3317 do not acquire the ack data corresponding to the beacon data from the terminal 3320 during a predetermined time, the user access authority determination unit 130 may determine that all of the terminals have exited the entire security zone 3300.

In addition, in an exemplary embodiment of the present disclosure, the user access authority determination unit 130 may determine whether all of the terminals have exited the entire security zone 3300 using additional information. For example, when it is confirmed that all office employees have left the office through the commuting information, the user access authority determination unit 130 may determine that all of the terminals have exited the entire security zone 3300. As another example, times at which the terminals exit an inner side to an outer side through the master door 3341 may be recorded in a log. When the exit times of all terminals registered in the access management system through the master door 3341 are recorded in the log, the user access authority determination unit 130 may determine that all of the terminals have exited the entire security zone 3300.

Next, according to some embodiments of the present disclosure, the step of setting an operation mode to a security mode (S3420) may be performed when it is determined that all terminals have exited the entire security zone 3300.

On a condition that step S3420 is performed, when it is determined that all of the terminals have exited the entire security zone, the user access authority determination unit 130 may automatically change the operation mode to the security mode even though a manager of the access management system does not directly set the operation mode of the user access authority determination unit 130 to the security mode. Thus, convenience of the manager may be improved.

Also, in an embodiment of the present disclosure, on a condition that the operation mode is the security mode, when the terminal 3320 normally accesses the master door 3341, the user access authority determination unit 130 may change the operation mode from the security mode to the normal mode.

In an embodiment of the present disclosure, when the operation mode is the security mode, the user access authority determination unit 130 may check whether a terminal has intruded into the entire security zone 3300 and may perform management on the intruding terminal. This will be described in detail with reference to FIG. 35.

Various modifications of the access management methods according to some embodiments of the present disclosure will be described below with reference to FIGS. 35 to 37.

Figure 35:
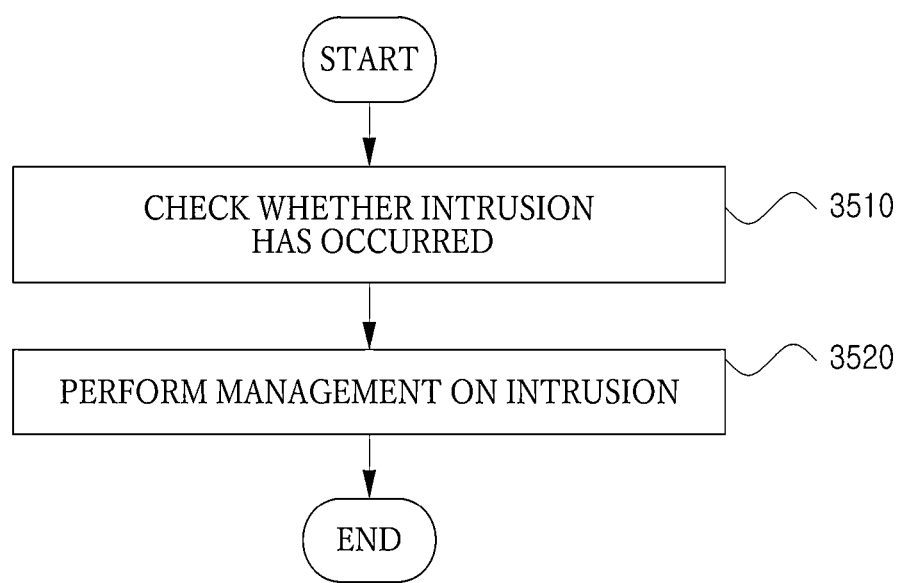
FIG. 35 is a flowchart for describing a security mode management method according to an embodiment.

FIG. 35 is a flowchart for describing a security mode management method according to an embodiment.

Referring to FIG. 35, the security mode management method may include checking whether an intrusion has occurred in an entire security zone (S3510) and performing management on a confirmed intrusion (S3520). In addition, the security mode management method may be performed by the user access authority determination unit 130.

In some embodiments of the present disclosure, the user access authority determination unit 130 may check whether an intrusion has occurred in an entire security zone 3300 (S3510).

As described above, the user access authority determination unit 130 may check whether there is a terminal in the vicinity of the beacons 3311 to 3317 on the basis of ambient environment information of the beacons 3311 to 3317. The description of step S3410 of FIG. 34 may be applied to this case, and thus a detailed description thereof will be omitted for convenience.

However, when communication of the terminal 3320 is deactivated, the terminal 3320 cannot receive the beacon data and also cannot transmit ack data corresponding to the beacon data to the beacon. In some embodiments, when the beacon cannot received the ack data, the user access authority determination unit 130 cannot check whether there is a terminal in an entire security zone 3300. For this, when the operation mode of the user access authority determination unit 130 is set to the security mode, the terminal may receive a communication activation signal from the beacons 3311 to 3317 or an external device installed in the entire security zone 3300. The description of FIG. 9 may be applied to the communication activation signal, and thus a detailed description thereof will be omitted for convenience. Thus, when the terminal 3320 is located in the entire security zone 3300 although the communication of the terminal 3320 is deactivated, the communication of the terminal 3320 may be activated. When the terminal receives the beacon data, ack data corresponding to the beacon data may be output. The user access authority determination unit 130 may check whether the terminal 3320 is present in the entire security zone 3300 according to the reception of the ack data.

In addition, in an embodiment of the present disclosure, when it is confirmed that a terminal is present in the entire security zone 3300, the user access authority determination unit 130 may determine that an intrusion has occurred.

However, the step S3510 need not necessarily be determined using the beacon data. Rather, when a specific application for performing the access management method according to an embodiment of the present disclosure is not installed in a terminal of an intruder, the beacon data that has been normally received from the beacon cannot be normally transmitted to the user access authority determination unit, etc. Even when such a terminal-related access management application as described above is not installed in the terminal of the intruder, whether the intrusion has occurred may be determined. To prepare for such a case, conventional techniques for sensing an occurrence of intrusion may be utilized. For example, devices, such as an infrared sensor, a window opening sensor, a closed-circuit television (CCTV), etc., for sensing a specific zone may be included in the access management system. Whether an intrusion has occurred may be determined according to a result sensed from the devices.

In some embodiments of the present disclosure, the user access authority determination unit 130 may perform management on the confirmed intrusion (S3520).

In some embodiments of the present disclosure, in step S3520, at least one of a log recording operation, an operation of informing an external terminal of an intrusion, an operation of checking whether an intruding terminal resides in the entire security zone 3300, and a door control operation may be performed.

In some embodiments of the present disclosure, the user access authority determination unit 130 may perform log recording on the intruding terminal (in a case in which an intruder uses a terminal in which an application for receiving beacon data from a beacon and transmitting the received beacon data to a designated external device according to the present disclosure).

For example, the user access authority determination unit 130 may generate a log by recording a time at which an intruding terminal accessed the master door 3341, a time at which an intruding terminal was located in the entire security zone 3300, a message which was transmitted or received by an intruding terminal, a location of an intruding terminal, etc. In addition, the user access authority determination unit 130 may store the generated log in a database.

Also, in some embodiments of the present disclosure, the user access authority determination unit 130 may inform an external device about the intrusion of the intruding terminal. For example, after the operation mode of the user access authority determination unit 130 is set to the security mode, the user access authority determination unit 130 may inform the external device, such as a manager terminal or a security server of the access management system, that a terminal has accessed the master door 3341. The external device may manage the intruding terminal, independently of the access management system. Thus, security may be enhanced because a user of the intruding terminal is also managed by the external device.

In addition, in some embodiments of the present disclosure, the user access authority determination unit 130 may check whether the intruding terminal can normally reside in the entire security zone 3300. This will be described in detail with reference to FIG. 36.

In addition, in some embodiments of the present disclosure, the user access authority determination unit 130 may control a door.

For example, like a case in which a terminal performs abnormal access, even when the intruding terminal desires to exit inner sides to outer sides with respect to a plurality of doors 3341 to 3347, the user access authority determination unit 130 does not control the plurality of doors 3341 to 3347 to be unlocked. This may prevent the user of the intruding terminal from getting out to the outside of the entire security zone 3300, thus enhancing security.

In addition, after it is checked that the user of the intruding terminal can normally reside in the entire security zone 3300 or it is authenticated through the user authentication that the intruding terminal may normally pass through the plurality of doors 3341 to 3347, the user access authority determination unit 130 may control the door to be unlocked.

Figure 36:
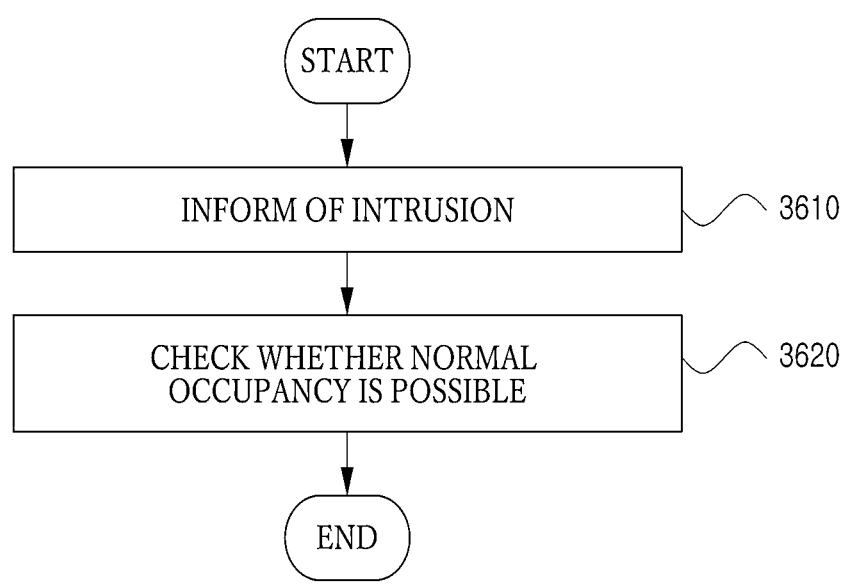
FIG. 36 is a diagram for describing a determination of whether an intruding terminal can normally reside in an entire security zone according to an embodiment.

FIG. 36 is a diagram for describing a determination of whether an intruding terminal can normally reside in an entire security zone according to an embodiment.

Referring to FIG. 36, the user access authority determination unit 130 may determine whether the intruding terminal can normally reside in the entire security zone 3300.

In some embodiments of the present disclosure, a step of informing a user of an intrusion (S3610) may be performed. As described above in step S3510 of FIG. 35, the user access authority determination unit 130 may confirm that a user of the intruding terminal has intruded into the entire security zone 3300, and then may inform the user of the intruding terminal about the intrusion.

In some embodiments of the present disclosure, when the user access authority determination unit 130 is included in a server (e.g., a server that may be included in the control unit 3330), the server may transmit a message directing the intruding terminal to inform the user of the intruding terminal about the intrusion to the intruding terminal, and the intruding terminal may inform the user of the intruding terminal about the intrusion according to the message.

In some embodiments of the present disclosure, the user access authority determination unit 130 may acoustically output the intrusion using an audio output unit of the intruding terminal or may visually output the intrusion using a video output unit of the intruding terminal. In addition, the user access authority determination unit 130 may generate vibration to inform about the intrusion. In addition, the user access authority determination unit 130 may inform the user about the intrusion using a UI that is provided by a terminal-related access management application.

In addition, in some embodiments of the present disclosure, the user access authority determination unit 130 may be included in a user operating device. In this case, the user access authority determination unit 130 may inform the user of the intruding terminal about the intrusion using an audio output unit, a video output unit, etc. of the user operating device.

Also, in some embodiments of the present disclosure, the step of determining whether the user of the intruding terminal can normally reside in the entire security zone 3300 may be performed.

In an embodiment of the present disclosure, the user access authority determination unit 130 may determine whether a user of a terminal may normally access the master door 3341 on the basis of user authentication information. For this, the intruding terminal may acquire the user authentication information, and the user access authority determination unit 130 may acquire the user authentication information from the intruding terminal.

The description of FIG. 23 may be applied to the user authentication operation performed through the user authentication information, and thus a detailed description thereof will be omitted for convenience.

Also, when the acquired user authentication information matches the user authentication information stored in the database as a result of the user authentication operation, the user access authority determination unit 130 may determine that the user of the intruding terminal can normally access the master door 3341 and may confirm that the user of the intruding terminal can normally reside in the entire security zone 3300.

Figure 37:
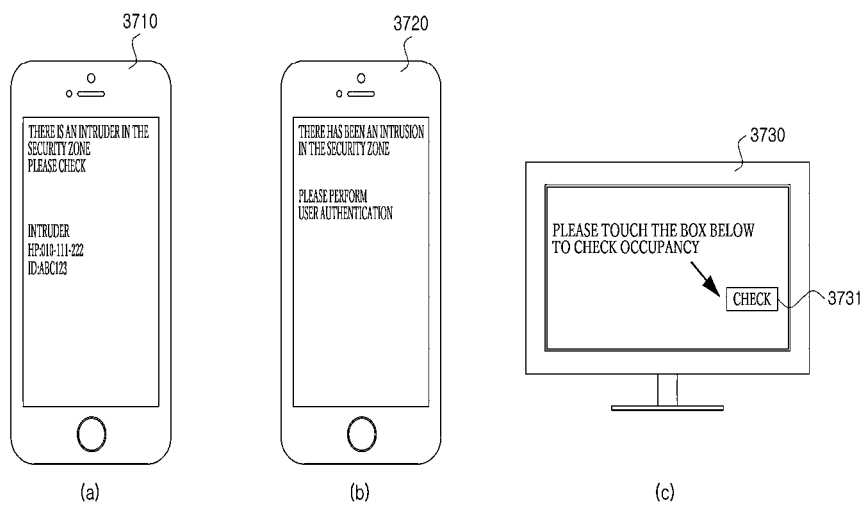
FIG. 37 is a diagram for describing various embodiments of a manager terminal, a user terminal, and a user operating device in a security mode according to an embodiment.

FIG. 37 is a diagram for describing various embodiments of a manager terminal, a user terminal, and a user operating device in a security mode according to an embodiment.

Referring to FIG. 37, a terminal 3710 and a terminal 3720 may be modifications of the terminal 300 of FIG. 3, and a user operating device 3730 may denote the user operating device described above with reference to FIG. 35. In particular, the terminal 3720 may indicate a manager terminal of an access management system.

In (a), the user access authority determination unit 130 may be included in the manager terminal 3710. In some embodiments of the present disclosure, the user access authority determination unit 130 may visually output the presence of an intruder in the entire security zone through a video output unit of the manager terminal 3710. In an embodiment of the present disclosure, the user access authority determination unit 130 may acquire information regarding an intruding terminal (e.g., a communication number of the intruding terminal, identification information of the intruding terminal, an ID in an access management system of a user of the intruding terminal, etc.) and may visually output the information regarding the intruding terminal.

In an embodiment of the present disclosure, in (b), the user access authority determination unit 130 may be included in the intruding terminal 3720. The user access authority determination unit 130 may inform that the user of the intruding terminal 3720 has intruded into the entire security zone 3300.

As an example, the user access authority determination unit 130 may display a message indicating that the user of the intruding terminal 3720 has intruded into the entire security zone 3300 and a message directing the user to perform user authentication through a video output unit of the intruding terminal 3720.

Also, the terminal 3720 may acquire user authentication information, and the user access authority determination unit 130 may acquire the user authentication information. Next, the user access authority determination unit 130 may compare the acquired user authentication information with user authentication information prestored in a database. When the acquired user authentication information matches prestored user authentication information, the user access authority determination unit 130 may check whether the user of the terminal 3720 can normally reside in the entire security zone. Here, the prestored user authentication information may match user identification information of a terminal that may access the master door.

Also, in another embodiment of the present disclosure, in (b), the user access authority determination unit 130 may be included in a server. In an embodiment, the user access authority determination unit 130 may acquire user authentication information from the terminal 3720. When the acquired user authentication information and the prestored user authentication information match each other, the user access authority determination unit 130 may confirm that the user of the terminal 3720 can normally reside in the entire security zone.

Also, in another embodiment, the user access authority determination unit 130 included in the server may acquire a result of the comparison of whether the acquired user authentication information and the prestored user authentication information match each other from the terminal 3720. That is, the terminal 3720 may compare the acquired user authentication information with the prestored user authentication information and provide a result of the comparison to the user access authority determination unit 130. When it is confirmed that the acquired user authentication information and the prestored user authentication information match each other from the acquired comparison result, the user access authority determination unit 130 may confirm that the user of the terminal 3720 can normally reside in the entire security zone.

In (c), the user access authority determination unit 130 may be included in the user operating device 3730.

In some embodiments of the present disclosure, when the user of the intruding terminal intrudes into the entire security zone 3300, the user access authority determination unit 130 may be aware of the intrusion of the user of the intruding terminal. For example, the user access authority determination unit 130 may acquire a message indicating that the user of the intruding terminal has made the intrusion from the server (e.g., a server included in the control unit 3330).

Next, the user access authority determination unit 130 may visually output the intrusion through a video output unit of the user operating device 3730.

<Registration Method of User of Unregistered Terminal>

Figure 38:
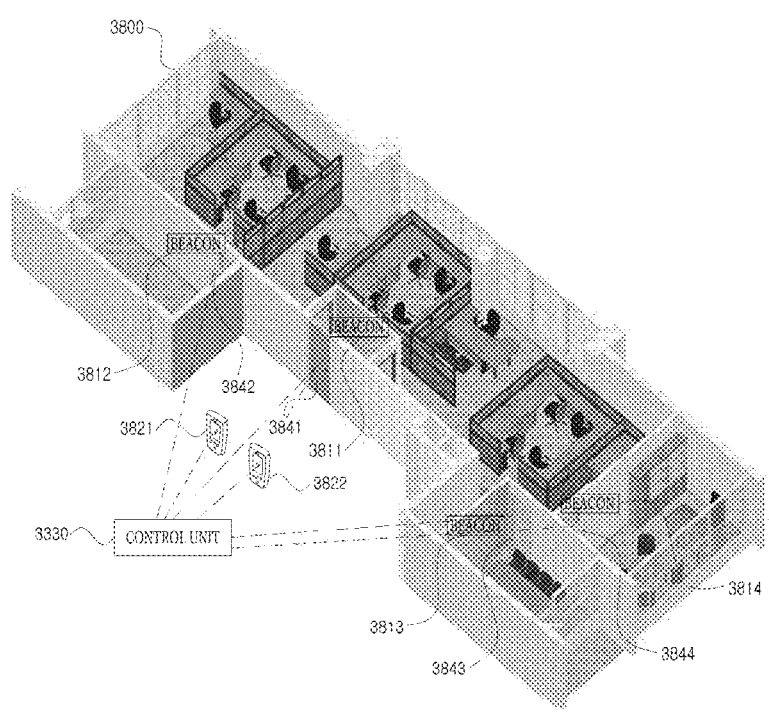
FIG. 38 is a diagram for describing a method of registering a user of an unregistered terminal according to an embodiment.

FIG. 38 is a diagram for describing a method of registering a user of an unregistered terminal according to an embodiment.

Referring to FIG. 38, in an entire security zone 3800 including a plurality of doors 3841 to 3844, an access management system may perform an access management operation. The access management system may include a plurality of beacons 3811 to 3814, an unregistered terminal 3821, a manager terminal 3822, and a control unit 3830.

In particular, FIG. 38 shows a system in which a one-to-one correspondence is established between the beacon 3811 and the door 3841, between the beacon 3812 and the door 3842, between the beacon 3813 and the door 3843, and between the beacon 3814 and the door 3844. However, the terminal registration method is also applicable to a system in which beacons correspond to doors on an n-to-one basis. In addition, the unregistered terminal 3821 shown in FIG. 38 is a device that a user carries, and the manager terminal 3822 is a device that a manager carries. Also, the user and the manager are not shown in FIG. 38.

In addition, in some embodiments of the present disclosure, the door 3841 among the plurality of doors 3841 to 3844 may be represented as a master door. Here, the master door 3841 may denote a door through which a terminal should necessarily pass in order to enter the entire security zone 3800.

In an embodiment of the present disclosure, the unregistered terminal 3821 may denote a terminal of a user who is unregistered in the access management system. Thus, the unregistered terminal 3821 may be blocked from accessing the doors 3841 to 3844.

In addition, in an embodiment of the present disclosure, the manager terminal 3822 may denote a terminal of a manger having authority to manage the access management system.

When the user of the unregistered terminal 3821 is arbitrarily registered in the access management system, security of the access management system may be weakened. For example, the user of the unregistered terminal 3821 may be a person having no authority to access the entire security zone 3800. When such a person is registered, the person may freely access the entire security zone 3800. In addition, when the person registers user authentication information of another person, the security may be possibly weakened in the future. In order to prevent such problems, the user of the unregistered terminal 3821 may be registered in the access management system only when a predetermined condition is satisfied.

Figure 39:
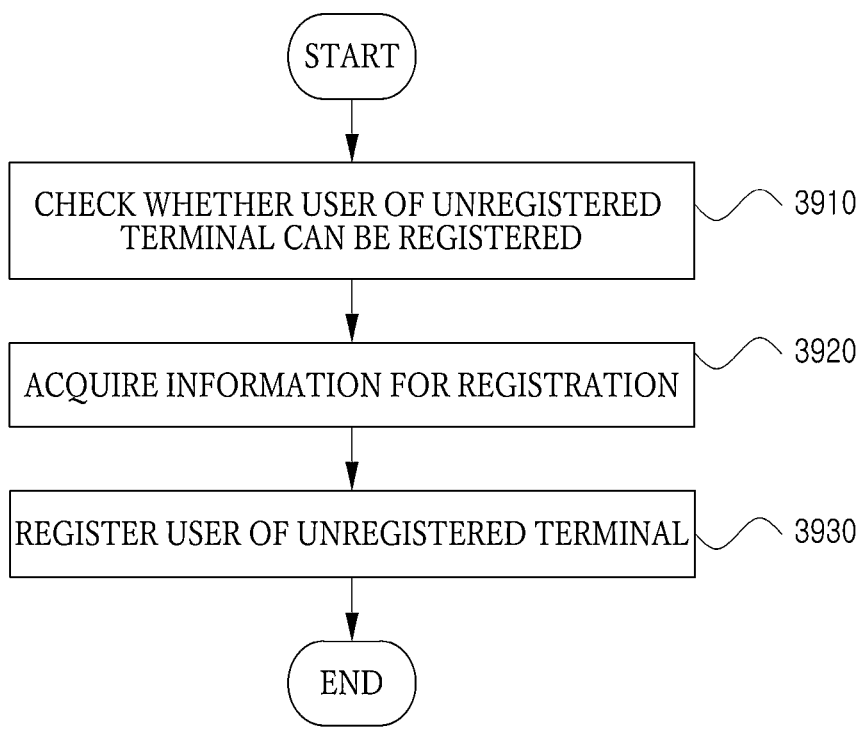
FIG. 39 is a flowchart showing a method of registering a user of an unregistered terminal according to an embodiment.

FIG. 39 is a flowchart showing a method of registering a user of an unregistered terminal according to an embodiment.

Referring to FIG. 39, a method of registering a user of an unregistered terminal according to some embodiments of the present disclosure may include checking whether a user of an unregistered terminal can be registered (S3910), acquiring information for registration of the user of the unregistered terminal (S3920), and registering the user of the unregistered terminal on the basis of the information for registration of the user of the unregistered terminal (S3930).

In some embodiments of the present disclosure, the method of registering a user of an unregistered terminal may be performed by a registration unit. Here, the registration unit may be defined as a device that registers a user who carries an unregistered terminal in an access management system.

In some embodiments of the present disclosure, the registration unit may be implemented in the form of a server (e.g., a server included in the control unit 3830).

Also, in some embodiments of the present disclosure, the registration unit may be implemented to be included in the unregistered terminal 3821 or the manager terminal 3822.

In addition, in some embodiments of the present disclosure, the registration unit may operate while being included in the user access authority determination unit 130, and may also operate independently of the user access authority determination unit 130.

The steps of the registration method of a user of an unregistered terminal will be described below in detail.

According to some embodiments of the present disclosure, the step of checking whether a user of an unregistered terminal can be registered (S3910) may be performed.

In some embodiments of the present disclosure, the registration unit may use a BID acquired from the unregistered terminal 3821 to check whether the user of the unregistered terminal 3821 can be registered.

In some embodiments of the present disclosure, when the unregistered terminal 3821 and the manager terminal 3822 are located within a predetermined distance, the registration unit may determine that the user of the unregistered terminal 3821 can be registered.

In some embodiments of the present disclosure, the registration unit may use the BID acquired from the unregistered terminal 3821 and a BID acquired from the manager terminal 3822 to determine whether the unregistered terminal 3821 and the manager terminal 3822 are located within the predetermined distance.

For this, the registration unit may acquire the BID from the unregistered terminal 3821. The acquisition of the BID from the unregistered terminal 3821 may be initiated by the unregistered terminal 3821, and the BID acquired by the unregistered terminal 3821 may be finally acquired by the above-described registration unit.

In addition, the registration unit may acquire the BID from the manager terminal 3822 during a predetermined time period including a time point at which the BID is acquired from the unregistered terminal 3821. That is, the registration unit may acquire the BID from the manager terminal 3822 during a time period from a first time point that is before the time point at which the BID is acquired from the unregistered terminal 3821 to a second time point that is after the time point at which the BID is acquired from the unregistered terminal 3821. Here, the predetermined time period, the first time point, and the second time point may be set by the registration unit. In addition, the acquisition of the BID from the manager terminal 3822 may be initiated by the manager terminal 3822, and the BID acquired by the manager terminal 3822 may be finally acquired by the above-described registration unit. Also, the registration unit may acquire a UID of a user of the manager terminal 3822 from the manager terminal 3822 and may identify the manager terminal 3822 using the UID of the user of the manager terminal 3822.

Also, the registration unit may compare the BID acquired from the unregistered terminal 3821 and the BID acquired from the manager terminal 3822 to determine whether the unregistered terminal 3821 and the manager terminal 3822 are located within the predetermined distance.

In an embodiment, when the BID acquired from the unregistered terminal 3821 and the BID acquired from the manager terminal 3822 match each other, the registration unit may determine that the unregistered terminal 3821 and the manager terminal 3822 are located within the predetermined distance.

Also, in an embodiment, when at least one of BIDs acquired from manager terminal 3822 is included in the BID acquired from the unregistered terminal 3821, the registration unit may determine that the unregistered terminal 3821 and the manager terminal 3822 are located within the predetermined distance.

As it is checked that the unregistered terminal 3821 and the manager terminal 3822 are located within the predetermined distance, the registration unit may check that the user of the unregistered terminal 3821 can be registered.

After it is checked that the unregistered terminal 3821 and the manager terminal 3822 are located within the predetermined distance, it is checked that the unregistered terminal 3821 and the manager terminal 3822 may not be located within the predetermined distance through the BID acquired from the unregistered terminal 3821 and the BID acquired from the manager terminal 3822. In this case, the registration unit may confirm that the user of the unregistered terminal 3821 cannot be registered.

Also, in some embodiments of the present disclosure, when the unregistered terminal 3821 is located at a specified position, the registration unit may determine that the user of the unregistered terminal 3821 can be registered.

In an embodiment of the present disclosure, when the BID acquired from the unregistered terminal 3821 is a predetermined BID, the registration unit may confirm that the user of the unregistered terminal 3821 is located at a specified position. For example, a registration beacon may be installed near a place of the manager, and the unregistered terminal 3821 may approach the registration beacon and acquire a BID from the registration beacon. In this case, when it is checked that the BID acquired from the unregistered terminal 3821 is the BID of the registration beacon, the registration unit may determine that the user of the unregistered terminal 3821 can be registered.

After it is determined that the user of the unregistered terminal 3821 can be registered, the BID acquired from the unregistered terminal 3821 may not match the BID of the registration beacon since the unregistered terminal 3821 leaves the specific position. In this case, the registration unit may determine that the user of the unregistered terminal 3821 cannot be registered.

Also, in some embodiments of the present disclosure, when the unregistered terminal 3821 and the manager terminal 3822 are located at the specific position, the registration unit may determine that the user of the unregistered terminal 3821 can be registered.

For example, when the BID acquired from the unregistered terminal 3821 and the BID acquired from the manager terminal 3822 include a BID of the beacon 3811 corresponding to the master door 3841, the registration unit may confirm that the user of the unregistered terminal 3821 is located at the specific position and may determine that the user of the unregistered terminal 3821 can be registered.

After it is determined that the user of the unregistered terminal 3821 can be registered, any one of the BID acquired from the unregistered terminal 3821 and the BID acquired from the manager terminal 3822 may not include the BID of the beacon 3811 since the unregistered terminal 3821 or the manager terminal 3822 leaves the vicinity of the beacon 3811 corresponding to the master door 3841. In this case, the registration unit may confirm that the user of the unregistered terminal 3821 is located at the specific position and may determine that the user of the unregistered terminal 3821 cannot be registered. That is, according to embodiments of the present disclosure, a series of procedures associated with the unregistered terminal may be allowed to be performed only when a condition in which the user can be registered is continuously satisfied while the procedures are performed.

In addition, in some embodiments of the present disclosure, when the manager terminal 3822 requests that the registration unit register the user of the unregistered terminal 3821, the registration unit may determine that the user of the unregistered terminal 3821 can be registered.

According to some embodiments of the present disclosure, when the user of the unregistered terminal can be registered, the step of acquiring information for registering the user of the unregistered terminal (S3920) may be performed.

In some embodiments of the present disclosure, the registration unit may acquire an ID of the user of the unregistered terminal 3821 in order to register the user of the unregistered terminal 3821. The acquisition of the UID of the user of the unregistered terminal 3821 may be initiated by the unregistered terminal 3821, and the UID of the user of the unregistered terminal 3821 may be finally acquired from the above-described registration unit. As an example, the registration unit may acquire at least one of a UUID, a UID, an IP address, a MAC address, a CPU (MCU) serial number, an HDD serial number, and a communication number of the unregistered terminal 3821 and may set at least one piece of the acquired information as the UID of the unregistered terminal 3821.

Also, it should be noted that the UID of the user of the unregistered terminal 3821 may be acquired in step S3910 other than in step S3920.

Also, in some embodiments of the present disclosure, the registration unit may acquire user authentication information of the user of the unregistered terminal 3821 in order to register the user of the unregistered terminal 3821. According to embodiments of the present disclosure, the user authentication information of the user of the unregistered terminal 3821 may be acquired first by the unregistered terminal 3821, and then may be finally transmitted to the registration unit.

However, according to a security policy of an operating system of the unregistered terminal 3821, the user authentication information of the user of the unregistered terminal 3821 may not be transmitted to an external device. To prepare for such a case, the registration unit may not acquire and register the user authentication information of the user of the unregistered terminal 3821. When the user authentication information of the user of the unregistered terminal 3821 is not registered as described above, the user access authority determination unit 130 may control access to the door using the UID of the user of the unregistered terminal 3821.

In an embodiment, when a terminal-related access management application is running in the unregistered terminal 3821, the user of the unregistered terminal 3821 may be blocked by the terminal-related access management application from being registered in the access management system while it is impossible to register the user of the unregistered terminal 3821. For example, when it is impossible to register the user of the unregistered terminal 3821, the terminal-related access management application may deactivate a UI (e.g., a user registration UI, a user authentication UI, etc.) provided to register the user of the unregistered terminal 3821. On the other hand, while it is possible to register the user of the unregistered terminal 3821, the user of the unregistered terminal 3821 may be allowed to be registered in the access management system by the terminal-related access management application. For example, when it is possible to register the user of the unregistered terminal 3821, the terminal-related access management application may activate the UI provided to register the user of the unregistered terminal 3821.

Also, in some embodiments of the present disclosure, the registration unit may acquire information regarding an accessible door of the user of the unregistered terminal 3821 in order to register the user of the unregistered terminal 3821. Here, the accessible door of the user of the unregistered terminal 3821 may indicate a door that may be accessed by the user of the unregistered terminal 3821 among the plurality of doors 3841 to 3844. However, the information regarding the accessible door of the user of the unregistered terminal 3821 need not be acquired in step S3920 and may be acquired after the user of the unregistered terminal 3821 is registered.

In an embodiment, the information regarding the accessible door of the user of the unregistered terminal 3821 may be set by the manager terminal 3822.

In another embodiment, the information regarding the accessible door of the user of the unregistered terminal 3821 may be determined by a predetermined policy and a status of the user of the unregistered terminal 3821. When a policy about a door that may be accessed among the plurality of doors 3841 to 3844 by a group to which the user of the unregistered terminal 3821 belongs is predetermined, the accessible door of the user of the unregistered terminal 3821 may be determined as the door that may be accessed by the group to which the user of the unregistered terminal 3821 belongs.

In addition, according to some embodiments of the present disclosure, the step of registering the user of the unregistered terminal on the basis of the information for registering the user of the unregistered terminal (S3930) may be performed. Step S3930 will be described in detail with reference to FIG. 40.

Various modifications of the registration method of the unregistered terminal according to some embodiments of the present disclosure will be described below with reference to FIGS. 40 to 43.

Figure 40:
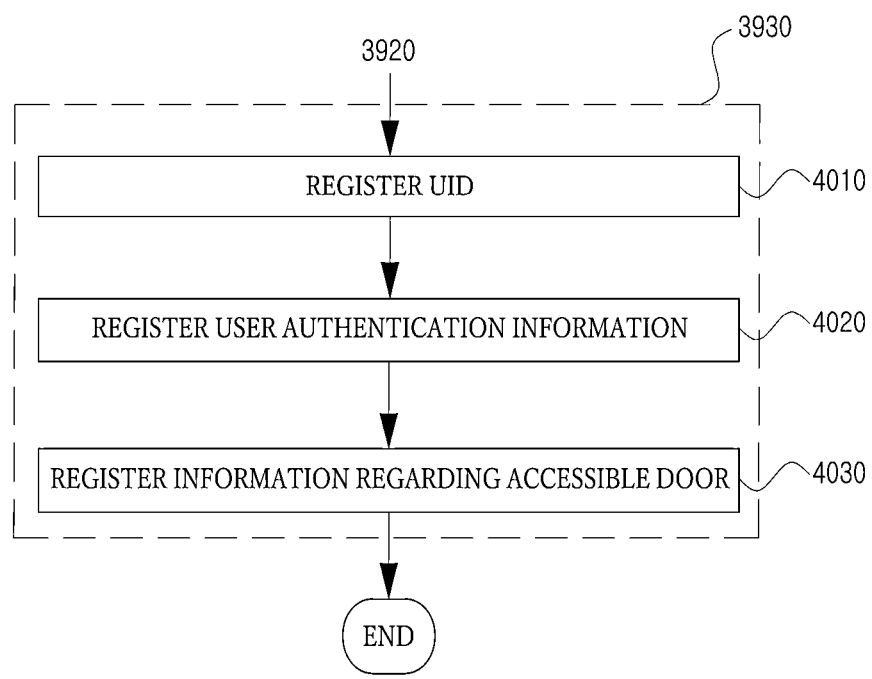
FIG. 40 is a flowchart for describing step S3930 of FIG. 39 in detail.

FIG. 40 is a flowchart showing step S3930 of FIG. 39 in detail.

Referring to FIG. 40, the step of registering the user of the unregistered terminal on the basis of the information for registering the user of the unregistered terminal (S3930)

may include registering the UID of the unregistered terminal (S4010), registering user authentication information of the user of the unregistered terminal (S4020), and registering information regarding an accessible door of the user of the unregistered terminal (S4030).

In the registration method of the user of the unregistered terminal according to some embodiments of the present disclosure, the registration unit may register information regarding the unregistered terminal (S4010).

In some embodiments of the present disclosure, the registration unit may register the user of the unregistered terminal 3821 in the above-described database. Also, the registration unit may generate an account of the user of the unregistered terminal 3821 in the access management system and may register the UID of the user of the unregistered terminal 3821 acquired in step S3920 in the database, in addition to the account of the user of the unregistered terminal 3821.

In addition, when the account of the user of the unregistered terminal 3821 is generated, an ID assigned to the user of the unregistered terminal 3821 in the access management system from the unregistered terminal 3821 and an ID used by the user of the unregistered terminal 3821 to log in to identify the user of the terminal in the access management application may be generated. In this case, the registration unit may register the IDs as the UID of the user of the unregistered terminal 3821.

In the registration method of the user of the unregistered terminal according to some embodiments of the present disclosure, the registration unit may register user authentication information of the user of the unregistered terminal (S4020). In the above-described example, the registration unit may register the user authentication information of the user of the unregistered terminal 3821 in the database.

However, as described above, the registration of the user authentication information of the user of the unregistered terminal 3821 is not essential. When the user authentication information of the user of the unregistered terminal 3821 is not acquired in step S3920, the registration unit may not register the user authentication information of the user of the unregistered terminal 3821. In this case, the user access authority determination unit 130 may control access to the door using the UID of the user of the unregistered terminal 3821.

Also, in the registration method of the user of the unregistered terminal according to some embodiments of the present disclosure, the registration unit may register information regarding an accessible door of the user of the unregistered terminal (S4030). In the above-described example, the registration unit may register the information regarding the accessible door of the user of the unregistered terminal 3821 in the database.

In addition, according to some embodiments of the present disclosure, step S4030 may be performed after the above-described steps S4010 and S4020. However, embodiments of the present disclosure are not limited thereto, and it should be noted that step S4030 may be performed at the same time as step 4010 or performed between steps S4010 and S4020.

However, the information regarding the accessible door of the user of the unregistered terminal 3821 need not be registered in step S3930 and may be registered in the database after the user of the unregistered terminal 3821 is registered.

Figure 41:
FIG. 41 is a diagram for describing a registration notification in an unregistered terminal according to an embodiment.

FIG. 41 is a diagram for describing a registration notification in an unregistered terminal according to an embodiment.

Referring to FIG. 41, an unregistered terminal 4110 may be a modification of the terminal 300 of FIG. 3, and may indicate the unregistered terminal 3821.

In some embodiments of the present disclosure, the registration unit may provide guidance information for registration in the access management system to the unregistered terminal 4110.

As an example, when the unregistered terminal 4110 is located in a door proximity region set by the beacon 3811 corresponding to the door 3841, the unregistered terminal 4110 may acquire a BID of the beacon 3811 from the beacon 3811 and may transmit the BID of the beacon 3811 and specific information (e.g., a MAC address, etc.) of the unregistered terminal 4110. In this case, the user access authority determination unit 130 may confirm that the unregistered terminal 4110 has no authority to access the door 3841 and may block the unregistered terminal 4110 from accessing the door 3841.

Additionally, the registration unit may generate a guidance message including information indicating that registration is needed to access the door 3841 and information regarding the manager and may transmit the generated guidance message to the unregistered terminal 4110.

Figure 42:
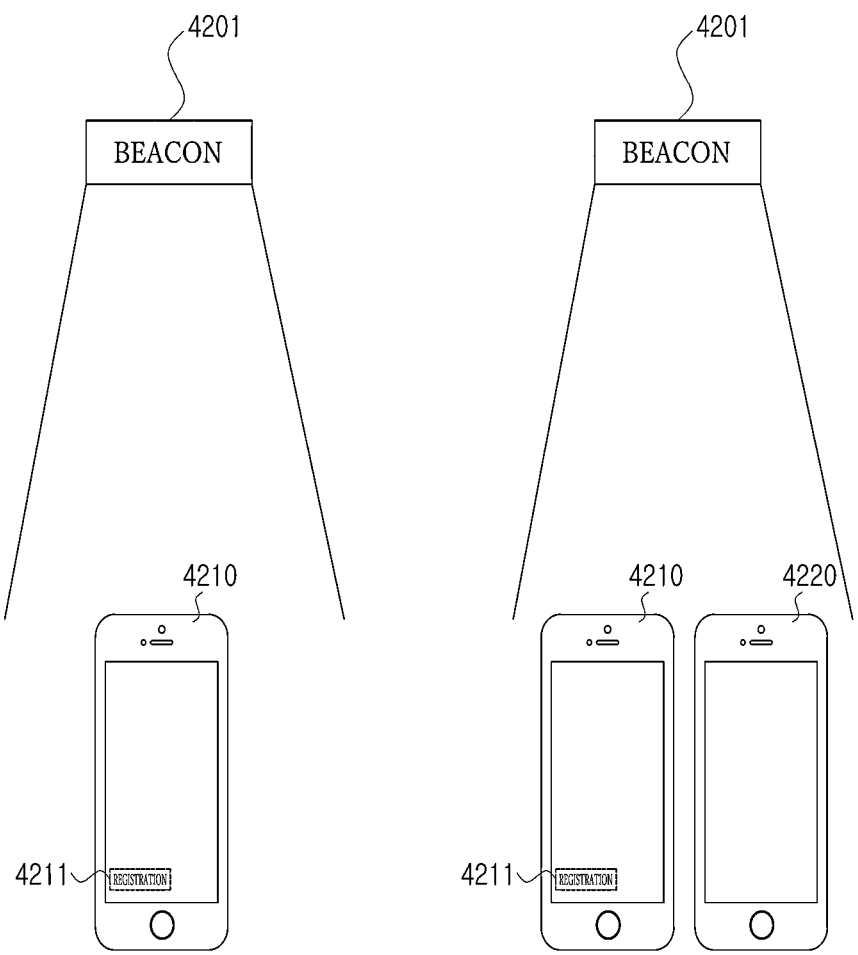
FIG. 42 is a diagram for describing registration of an unregistered user in an unregistered terminal according to another embodiment.

FIG. 42 is a diagram for describing registration of an unregistered user in an unregistered terminal according to another embodiment.

Referring to FIG. 42, an unregistered terminal 4210 may be a modification of the terminal 300 of FIG. 3 and indicate the unregistered terminal 3821, and a manager terminal 4220 may be a modification of the terminal 300 of FIG. 3 and indicate the manager terminal 3822. In addition, the beacon 4201 may be a modification of the beacon 200 of FIG. 2 and indicate the beacon 3811 corresponding to the master door 3841.

In some embodiments of the present disclosure, while the user of the unregistered terminal 4210 cannot be registered, the user of the unregistered terminal 4210 may be blocked from being registered in the access management system by the terminal-related access management application that is running in the unregistered terminal 4210.

For example, as shown in (a), when the unregistered terminal 4210 is located in a door proximity region of the beacon 4201, but the manager terminal 4220 is not located in the door proximity region, the user of the unregistered terminal 4210 cannot be registered. In this case, the terminal-related access management application may block the user of the unregistered terminal 4210 from being registered, by deactivating a UI 4211 for registering the user of the unregistered terminal 4210.

Alternatively, as shown in (b), when the unregistered terminal 4210 and the manager terminal 4220 are located in the door proximity region of the beacon 4201, the user of the unregistered terminal 4210 can be registered. In this case, the terminal-related access management application may register the user of the unregistered terminal 4210 by activating the UI 4211 for registering the user of the unregistered terminal 4210.

Figure 43:
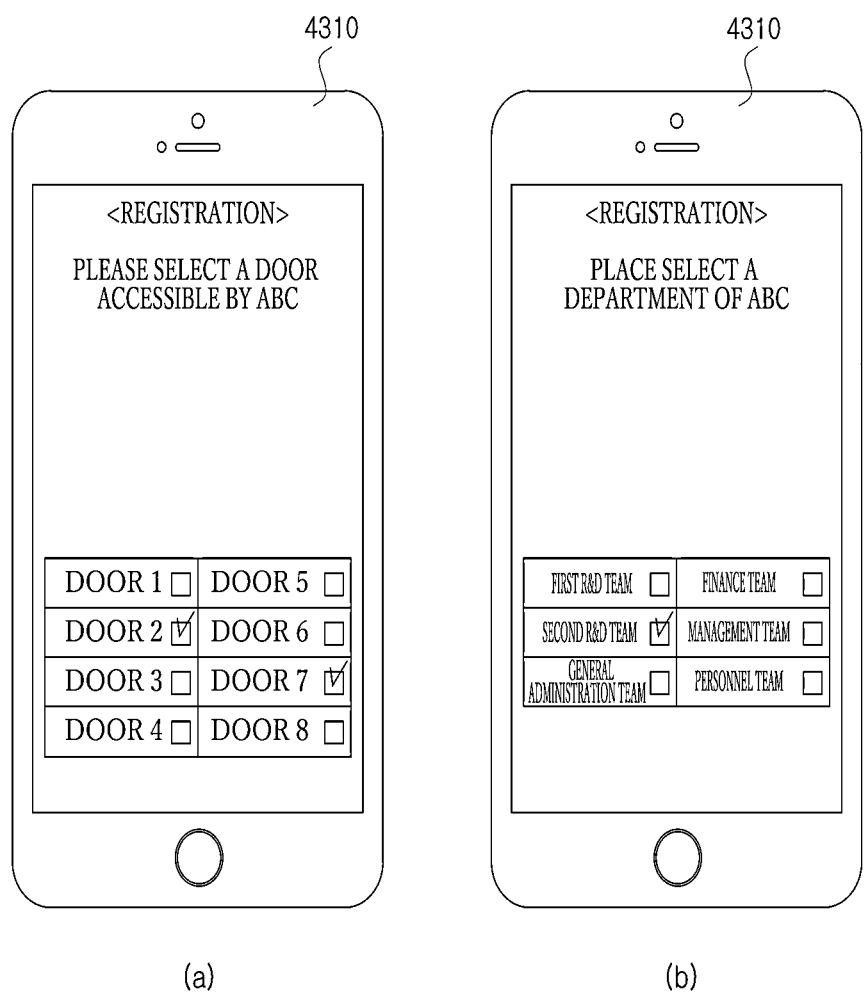
FIG. 43 is a diagram for describing setting of information regarding an accessible door of a user of an unregistered terminal according to an embodiment.

FIG. 43 is a diagram for describing setting of information regarding an accessible door of a user of an unregistered terminal according to an embodiment.

Referring to FIG. 43, a manager terminal 4310 may be a modification of the terminal 300 of FIG. 3, and may indicate the manager terminal 3822.

In some embodiments of the present disclosure, the manager terminal 4310 may set information regarding an accessible door of a user of the unregistered terminal 3821. A manager terminal-related access management application that is running in the manager terminal 4310 may provide a UI for setting the information regarding the accessible door of the user of the unregistered terminal 3821.

For example, as shown in (a), the manager terminal-related access management application may provide a UI 4311 for selecting an accessible door of the user of the unregistered terminal 3821 among a plurality of doors, and the registration unit may select the door selected through the UI 4311 as the accessible door of the user of the unregistered terminal 3821.

As another example, as shown in (b), the manager terminal-related access management application may provide a UI 4312 for selecting a group to which the user of the unregistered terminal 3821 belongs. In this case, a policy about an accessible door of the group to which the user of the unregistered terminal 3821 belongs may be predetermined. The registration unit may confirm the group to which the user of the unregistered terminal 3821 belongs and may select the accessible door of the group to which the user of the unregistered terminal 3821 belongs as the accessible door of the user of the unregistered terminal 3821.

<Access Control in Access Management System to which Beamforming Technique is Applied>

As described above, elements (a beacon, a terminal, a server, an access restriction controller, a locking unit, etc.) of an access management system may perform wireless communication with each other. In particular, signals transmitted and received by the elements may have directivity, and signals are focused in a specific direction. Thus, the elements may transmit and receive signals over a long distance at low power. It is possible to accurately and simply find a position of an element that has transmitted a signal because the signal has directivity. There are several techniques for allowing a signal to have directivity. However, a representative embodiment in which a beamforming technique is applied to an access management system of the present disclosure will be described below in detail.

Beamforming is defined as a technique for directing a beam of an antenna only to a specific element. In an embodiment, the beam is used for transmitting signals to a subspace in a specific direction or channel such that the power of the transmitted signals is maximized or for receiving signals from the subspace in the specific direction or channel such that the power of the received signals is maximized in a communication system having a plurality of antenna devices.

It should be appreciated that, instead of the beamforming technique, other techniques for allowing signals to have directivity may be applied to an embodiment of the access management system to be described below.

Figure 44:
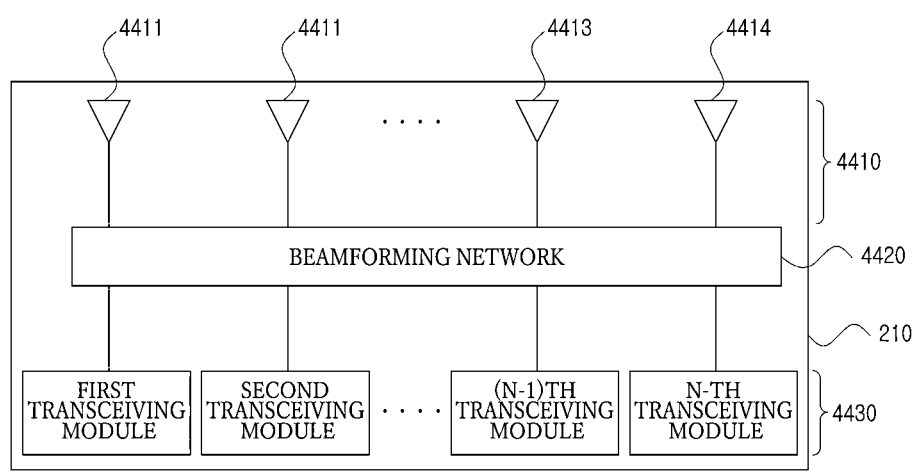
FIGS. 44 and 45 are block diagrams showing examples of the communication interface 210 of FIG. 2.
Figure 45:
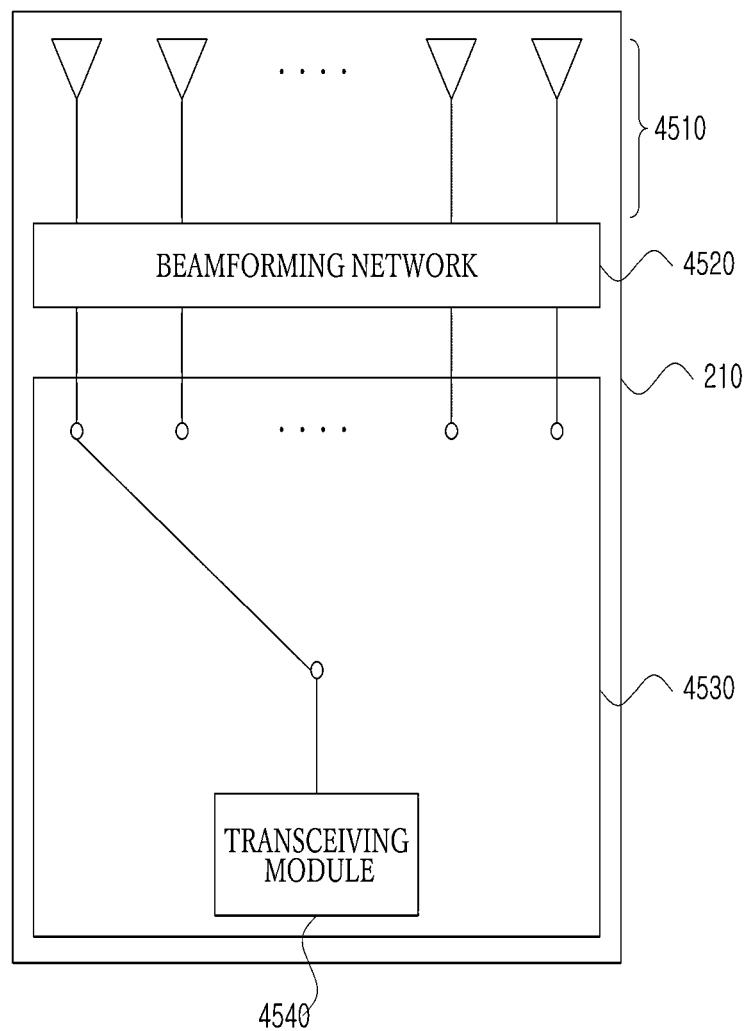

FIGS. 44 and 45 are block diagrams showing examples of the communication interface 210 of FIG. 2.

The beacon 200 described in FIG. 2 may communicate with other elements using the beamforming technique. A configuration of the communication interface 210 for transmitting and receiving signals in the form of a beam will be described below. It should be appreciated that the beamforming technique may also be used for communication between other elements (e.g., a terminal, a server, an access restriction controller, a locking unit, etc.). Thus, configurations of the communication interface 210 to be described with reference to FIGS. 44 and 45 may also be utilized for a communication interface of each of the elements.

Referring to FIG. 44, in order to transmit and receive signals in the form of a beam, the communication interface 210 may include an antenna 4410, a beamforming network 4420, and transceiving modules 4430.

The antenna 4410 is composed of array antenna devices 4411 to 4414. The array antenna devices 4411 to 4414 may have respective beam patterns, that is, radiation patterns. The beam patterns of the array antenna devices 4411 to 4414 may be combined to form and output a beam having directivity to a specific position. The antenna 4410 may also be represented as a smart antenna. In addition, the antenna 4410 may include a switched beam array antenna or an adaptive array antenna.

In FIG. 44, the number of array antenna devices 4411 to 4414 is represented as four. However, the present disclosure is not limited thereto, and thus the antenna 4410 may be composed of two or more array antenna devices. In addition, distances between the array antenna devices 4411 to 4414 may be the same or different from each other.

The beamforming network 4420 may apply signals to the array antenna devices 4411 to 4414. That is, a strength and a direction of the beam output from the antenna 4410 may be determined according to characteristics of inputs applied to the array antenna devices 4411 to 4414 by the beamforming network 4420.

A representative example of the beamforming network 4420 is a Butler matrix. The Butler matrix is a beamforming technique using a phase shift, in which the array antenna devices 4411 to 4414 may be formed of a microstrip line in order to implement the phase shift. The Butler matrix is used to increase frequency usage efficiency in the implementation of the beamforming technique. As a detailed example, a 4×4 Butler matrix may include four input ports and four output ports. When a signal is applied to any one of the four input ports, signals are output from all of the four output ports. In this case, a power level of the signal output from each of the output ports may be the same as that of the signal applied to the input port. A phase of the signal output from each of the output ports may be shifted from that of the signal applied to the input port. For example, the phases at the first to fourth output ports may be shifted by +45°−45°, +135°, and −135°, respectively. It should be appreciated that the Butler matrix may include a phase shifter (e.g., a 45° phase shifter, a 135° phase shifter, etc.) and a crossover device that crosses lines in the Butler matrix in order to perform a phase shift. Because of the phase shift, the Butler matrix may output a beam having directivity in a specific direction by adjusting the phase of the signal applied to the input port.

In addition, the transceiving modules 4430 may determine the characteristics of the inputs applied to the array antenna devices 4411 to 4414 by the beamforming network 4420.

Each of the transceiving modules 4430 may set the direction of the beam output from the antenna 4410. In an embodiment, one transceiving module may set a direction of one beam. Accordingly, the number of directions of beams output from the antenna 4410 may be equal to the number of transceiving modules 4430. It should be appreciated that one transceiving module may set directions of several beams. This will be described in detail with reference to FIG. 45.

In an embodiment, each of the transceiving modules 4430 may include a phase shifter and an attenuator. A signal in which a complex beam gain for steering a beam in a predetermined direction is reflected may be multiplied in the array antenna devices 4411 to 4414 through the beamforming network 4420 by using the phase shifter and the attenuator.

In addition, the transceiving modules 4430 may be used in various types of communication methods. For example, the transceiving modules 4430 may be Bluetooth modules for Bluetooth communication.

Referring to FIG. 45, in order to transmit and receive signals in the form of a beam, the communication interface 210 may include an antenna 4510, a beamforming network 4520, a switching circuit 4530, and a transceiving module 4540. The descriptions of the antenna 4410 and the beamforming network 4420 of FIG. 44 may be applied to the antenna 4510 and the beamforming network 4520, and thus detailed descriptions thereof will be omitted.

The description of the transceiving modules 4430 of FIG. 44 may also be applied to the transceiving module 4540. However, the transceiving module 4540 may set directions of several beams. For example, the switching circuit 4530 may connect input ports of the beamforming network 4520 with the transceiving module 4540. A signal for steering a beam in a specific direction may be applied from the transceiving module 4540 to the input ports of the beamforming network 4520 through the switching circuit 4530.

Figure 46:
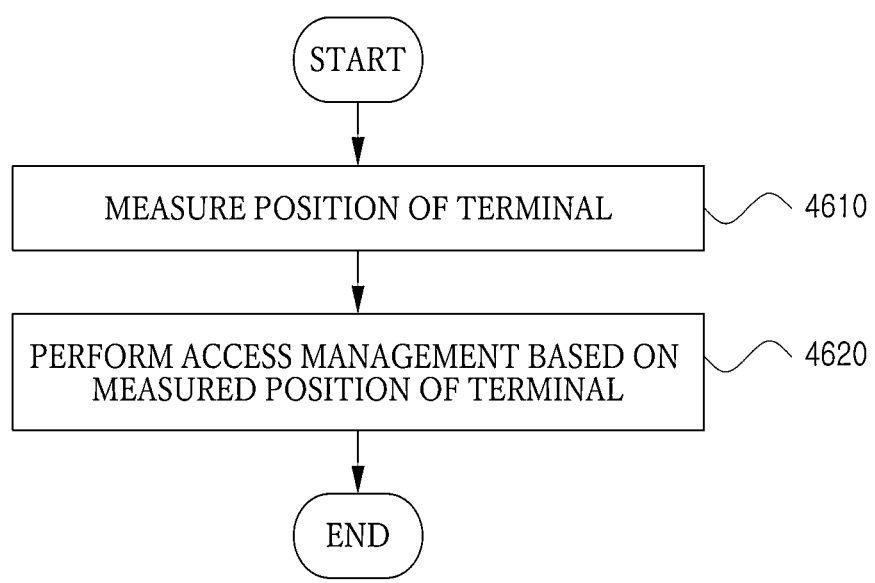
FIG. 46 is a flowchart showing an access management method according to another embodiment.

FIG. 46 is a flowchart showing an access management method according to another embodiment.

Referring to FIG. 46, the access management method according to some embodiments of the present disclosure may include measuring a position of a terminal (S4610) and performing access management based on the measured position of the terminal (S4620). The steps of the access management method will be described below in further detail.

According to some embodiments of the present disclosure, steps S4610 and S4620 are performed by the above-described user access authority determination unit. In addition, as described above, the user access authority determination unit may be implemented in a beacon, a terminal, or a server. Accordingly, steps S4610 and S4620 may also be performed by the beacon, the terminal, or the server. In addition, step S4610 may be performed by one of the beacon, the terminal, and the server, and step S4620 may be performed by another one of the beacon, the terminal, and the server.

According to some embodiments of the present disclosure, the step of measuring a position of a terminal (S4610) may be performed.

The user access authority determination unit may use directivity of a beacon to measure a position of a user on the basis of a signal transmitted at a specific position or a signal received by the beacon. Here, the position of the terminal may refer to a direction in which the terminal is located with respect to a specific object and/or a distance between the specific object and the terminal. For example, the position of the terminal may refer to a direction of the terminal with respect to the beacon, a distance between the beacon and the terminal, a direction of the terminal with respect to a target door, or a distance between the target door and the terminal. In addition, as an example, the beacon may be installed in close proximity to the target door. In this case, the direction of the terminal with respect to the beacon and the distance between the beacon and the terminal may be estimated from the direction of the terminal with respect to the target door and the distance between the target door and the terminal.

In an embodiment, the step of measuring a position of a terminal (S4610) may be initiated by the beacon or the terminal. A case in which the step of measuring a position of a terminal (S4610) is initiated by the beacon will be described with reference to FIGS. 47 and 48, and a case in which the step of measuring a position of a terminal (S4610) is initiated by the terminal will be described with reference to FIGS. 49 and 50.

In addition, according to some embodiments of the present disclosure, the step of performing access management based on the measured position of the terminal (S4620) may be performed. That is, step S4620 refers to applying the position of the terminal measured in step S4610 to the access control in the above-described access management system, the access authentication process determination method, the abnormal access processing method, the door control method, the beacon control method, the security mode management, or the method of registering a user of an unregistered terminal.

First, for the above-described access control in the access management system, the user access authority determination unit may check whether the terminal is located in a door proximity region on the basis of the distance between the beacon and the terminal. In step S920 of FIG. 9, a received-signal strength measured by the terminal and transmission power information included in beacon data are used by the user access authority determination unit to identify the distance between the beacon and the terminal. In step S4610, the user access authority determination unit may check the position of the terminal on the basis of a signal transmitted to the terminal by the beacon using directivity or a signal received by the beacon. In step S4620, the user access authority determination unit may check whether the terminal is located in the door proximity region by using the identified distance between the beacon and the terminal rather than on the basis of the received-signal strength and the transmission power information. It should be appreciated that, in step S4610, the user access authority determination unit may check the position of the terminal using the received-signal strength and the transmission power information in addition to the signal transmitted to the terminal by the beacon using directivity or the signal received by the beacon.

In addition, in the above-described access authentication process determination method, the user access authority determination unit may determine whether a user of the terminal is located at an outer side or an inner side with respect to the target door on the basis of the position of the terminal that is measured in step 4610 and may determine whether the user of the terminal enters the inner side from the outer side through the target door or exits the inner side to the outer side through the target door. In addition, the user access authority determination unit may determine an access authentication process that should be performed to unlock the target door according to whether the user is located at the inner side or the outer side with respect to the target door and/or whether the user of the terminal enters or exits through the target door.

In addition, in the above-described abnormal access processing method, the user access authority determination unit may determine whether abnormal access of the user of the terminal has occurred on the basis of the position of the terminal that is measured in step S4610. In the above-described abnormal access processing method, the user access authority determination unit may determine whether the user of the terminal passed through the door on the basis of the position of the terminal that is measured in step S4610. That is, the user access authority determination unit may check whether the position of the terminal is changed from the inner side to the outer side or from the outer side to the inner side on the basis of the position of the terminal that is measured in step S4610. The user access authority determination unit may perform abnormal access management on the user of the terminal when the user of the terminal abnormally accesses the target door, e.g., when the user passes through the target door without performing a user authentication operation.

In addition, in the above-described door control method, the user access authority determination unit may determine whether to control the target door to be unlocked on the basis of the position of the terminal that is measured in step S4610. For example, when the user access authority determination unit confirms that the terminal is located in the door proximity region using the position of the terminal that is measured in step S4610, the user access authority determination unit may control the target door to be unlocked.

In addition, the user access authority determination unit may determine whether to keep the target door unlocked using the position of the terminal that is measured in step S4610. For example, when a door lock control condition includes the terminal passing through the target door or the terminal exiting the door proximity region, the user access authority determination unit may determine whether the door lock control condition is satisfied using the position of the terminal that is measured in step S4610. When the door lock control condition is not satisfied, the user access authority determination unit may keep the target door unlocked.

In addition, in the above-described beacon control method, the presence and number of terminals located in the vicinity of the beacon may be checked on the basis of the position of the terminal that is measured in step S4610. That is, on a condition that the position of the terminal that is measured in step S4610 is confirmed, the presence and the number of terminals located in the vicinity of the beacon may be checked on the basis of the position of the terminal that is measured in step S4610 even when there is no information such as the current time of the beacon, illumination in the vicinity of the beacon, movement noise, etc. The presence and number of terminals located in the vicinity of the beacon may be used to set beacon parameters such as a transmission interval, a transmission power level, the door proximity region, and an operation mode of the beacon.

In addition, in the above-described security mode management, the user access authority determination unit may determine whether the terminal is located in an entire security zone on the basis of the position of the terminal that is measured in step S4610.

For example, on a condition that the operation mode of the user access authority determination unit is a normal mode, the user access authority determination unit may check that all users of terminals exit the entire security zone when there are no terminals that are located in the entire security zone.

As another example, on a condition that the operation mode of the user access authority determination unit is a security mode, the user access authority determination unit may determine that an intrusion has occurred and perform management on the intrusion when a terminal is confirmed as being located in the entire security zone on the basis of the position of the terminal that is measured in step S4610.

In addition, in the above-described method of registering a user of an unregistered terminal, the position of the terminal that is measured in step S4610 may be used to check whether a user of an unregistered terminal can be registered. In detail, the position of the terminal that is measured in step S4610 may be used to determine whether the unregistered terminal is located at a predetermined distance from a manager terminal. When the unregistered terminal is located at the predetermined distance from the manager terminal, it may be determined that the user of the terminal can be registered.

Figure 47:
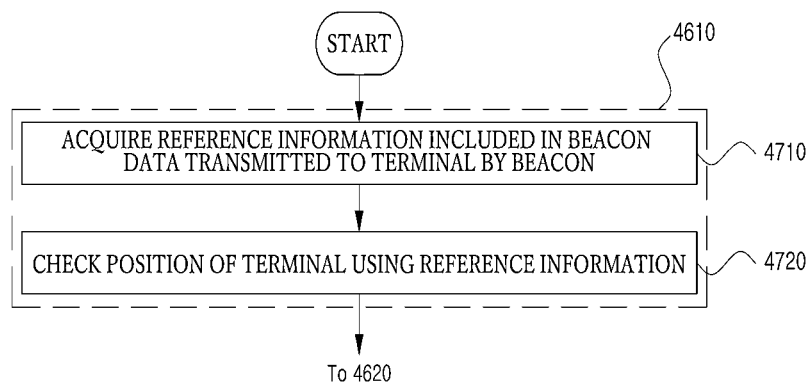
FIG. 47 is a flowchart showing step S4610 of FIG. 46 in detail according to an embodiment.

FIG. 47 is a flowchart showing step S4610 of FIG. 46 in further detail according to an embodiment.

Referring to FIG. 47, step S4610 may include acquiring reference information included in beacon data that is transmitted from the beacon to the terminal (S4710) and checking the position of the terminal using the reference information (S4720). Step S4610 may be performed by the user access authority determination unit.

Steps S4710 and S4720 will be described below with reference to FIG. 48.

According to some embodiments of the present disclosure, the step of acquiring the reference information included in the beacon data that is transmitted from the beacon to the terminal (S4710) may be performed.

Figure 48:
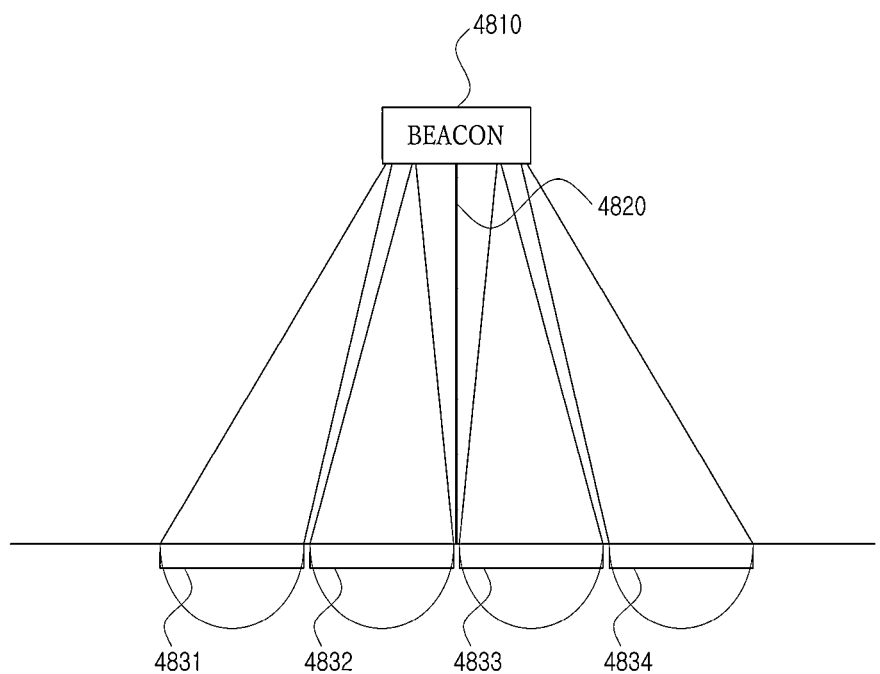
FIG. 48 is a diagram for describing measurement of a position of a terminal according to an embodiment.

As shown in FIG. 48, a beacon 4810 may be installed in close proximity to a target door 4820. FIG. 48 shows only one beacon 4810, however, the present disclosure is not limited thereto, and there may be two or more beacons.

In an embodiment, the step of measuring a position of a terminal (S4610) may be initiated by the beacon. First, as described above, the beacon 4810 may transmit a signal including beacon data to the terminal. In this case, the signal including the beacon data may be transmitted over a broadcasting range in a broadcast manner. For example, a broadcasting region may include outer regions 4831 and 4832 and inner regions 4833 and 4834 of the target door.

In addition, the beacon 4810 may transmit different beacon data to the regions 4831 to 4834 using directivity of the beamforming technique. That is, signals having different beam directions and different beacon data may be transmitted to the regions 4831 to 4834. The beacon 4810 may preset beacon data corresponding to the regions 4831 to 4834 and may steer beams toward the regions 4831 to 4834 (that is, beam steering) to transmit signals having the beacon data corresponding to the regions 4831 to 4834. For example, the beacon 4810 may sequentially perform beam steering on the regions 4831 to 4834 and may sequentially broadcast the signals having the beacon data corresponding to the regions 4831 to 4834.

In more detail, first, the beacon data being different refers to the reference information included in the beacon data being different. Here, the reference information is information for identifying the position of the terminal. In an embodiment, the reference information may be information added to the information included in above-described the beacon data or may be information included in the above-described beacon data.

For example, the reference information may additionally include a position indicator in the above-described beacon data. As an example, a value of the position indicator may be set as any one of a, b, c, and d. The position indicator a may refer to the beacon data being transmitted to the first region 4831, and the position indictor d may refer to the beacon data being transmitted to the fourth region 4834. In addition, beacon data with the position indicator a is represented as first beacon data, and beacon data with the position indicators b, c, and d may be represented as second, third, and fourth beacon data, representatively.

As another example, the reference information may be a BID, which is the information included in the above-described beacon data. In this case, the BID indicates one beacon 4180 and its different position. For example, a value of the BID of the beacon device 4810 may be set in the format of x-y (e.g., 1-1, 1-2, 1-3, and 1-4). Here, x of the BID indicates the beacon 4810, and y of the BID indicates a region. That is, the BID 1-1 refers to a signal being transmitted from the beacon 4810 to the first region 4831, and the BID 1-4 refers to a signal being transmitted from the beacon 4810 to the fourth region 4834.

In some embodiments of the present disclosure, the user access authority determination unit may acquire the reference information from the beacon 4810 or the terminal. For example, when the user access authority determination unit is included in the beacon 4810, the user access authority determination unit may acquire reference information included in a signal that is transmitted by the beacon 4810 to the terminal. Alternatively, in response to a signal transmission of the beacon 4810, when the terminal transmits an ack signal to the beacon 4810, the user access authority determination unit may acquire reference information included in a signal corresponding to the ack signal.

As another example, when the user access authority determination unit is included in the terminal, the user access authority determination unit may extract the reference information from a signal received by the terminal from the beacon 4810.

As still another example, when the user access authority determination unit is included in the server, the user access authority determination unit may receive the reference information transmitted by the beacon 4810 to the terminal from the beacon 4810 or the terminal.

In addition, in some embodiments of the present disclosure, the step of checking the position of the terminal using the reference information (S4720) may be performed. In an embodiment, the user access authority determination unit may check the position of the terminal using only the reference information. For example, as described above, the terminal may acquire different beacon data according to the position of the terminal. For example, the terminal may acquire first beacon data including first reference information when the terminal is located in the region 4831, may acquire second beacon data including second reference information when the terminal is located in the region 4832, may acquire third beacon data including third reference information when the terminal is located in the region 4833, and may acquire fourth beacon data including fourth reference information when the terminal is located in the region 4834. In this case, when the user access authority determination unit acquires the first beacon data, the user access authority determination unit may confirm that the terminal is located in the region 4831 through the first reference information and may confirm that the terminal is located at an outer side with respect to the target door 4820. In addition, when the user access authority determination unit acquires the third reference information from the beacon or the terminal, the user access authority determination unit may confirm that the terminal is located in the region 4833 through the third reference information and may confirm that the terminal is located at an inner side with respect to the target door 4820.

In addition, when the terminal sequentially acquires the first beacon data and then the second beacon data from the beacon 4810, the user access authority determination unit may confirm that the terminal moves from the region 4831 to the region 4832. In addition, when the user access authority determination unit sequentially acquires the second reference information and then the third reference information from the terminal or the beacon 4810, the user access authority determination unit may confirm that the terminal enters the inner side from the outer side through the target door 4840. In addition, when the user access authority determination unit sequentially acquires the third reference information and then the second reference information from the terminal or the beacon 4810, the user access authority determination unit may confirm that the terminal exits the inner side from the outer side through the target door 4840.

In an embodiment, the user access authority determination unit may check the position of the terminal using information other than the reference information. For example, when the terminal is located in the region 4831 or the region 4832, the terminal may acquire the first beacon data including the first reference information. When the terminal is located in the region 4833 or the region 4834, the terminal may acquire the second beacon data including the second reference information. In this case, the user access authority determination unit may confirm that the terminal is located at an outer side with respect to the target door 4820 using the first reference information. However, the user access authority determination unit cannot confirm that the terminal is located in the region 4831 or the region 4832. In this case, the user access authority determination unit may check a distance between the beacon 4810 and the terminal using a received-signal strength measured by the terminal and/or transmission power information included in the beacon data in response to the reception of the signal from the beacon 4810, and may check the position of the terminal using the distance between the beacon 4810 and the terminal. For example, when the terminal acquires the first beacon data from the beacon 4810 and it is determined that the difference between the beacon 4810 and the terminal is a predetermined distance or less using the received-signal strength and/or the transmission power information, the user access authority determination unit may confirm that the terminal is located in the region 4832.

In addition, in an embodiment, the beacon 4810 may transmit two or more different pieces of beacon data to any one of the regions 4831 to 4834. That is, the beacon 4810 may transmit two or more pieces of beacon data having different reference information to any one of the regions 4831 to 4834.

In this case, the user access authority determination unit may relatively compare strengths of signals including the two or more different pieces of the beacon data, select a signal including any one piece of the beacon data from among the signals including the two or more different pieces of the beacon data, and check the position of the terminal using reference information included in beacon data of the selected signal.

For example, the beacon 4810 may transmit the first beacon data including the first reference information and the second beacon data including the second reference information to the region 4831. That is, a first signal including the first beacon data and a second signal including the second beacon data may be transmitted to the terminal located in the region 4831. In this case, according to directivity of the beamforming technique, transmission power of the first signal transmitted to the region 4831 may be higher than that of the second signal transmitted to the region 4831. Thus, a strength of the first signal received in the region 4831 may be higher than that of the second signal received in the region 4831.

In this case, the user access authority determination unit may compare received-signal strengths of the first signal and the second signal, which are measured by the terminal, and choose the first signal, which has the higher strength than the second signal, in response to the reception of the first and second signals from the beacon 4810. In addition, as another example, the user access authority determination unit may choose the first signal having the higher transmission power than the second signal by using transmission power information included in the first beacon data and the second beacon data. As still another example, the user access authority determination unit may check the transmission power of the first signal and the transmission power of the second signal from the beacon 4810 and may choose the first signal having a higher transmission power than the second signal.

As a similar example, the transmission power of the first signal transmitted to the region 4831 may be the same as the transmission power of the second signal transmitted to the region 4831. In this case, the strength of the first signal received in the region 4831 may be lower than the strength of the second signal received in the region 4831. In this case, the user access authority determination unit may compare the received-signal strengths of the first signal and the second signal, which are measured by the terminal, and choose the first signal, which has the higher strength than the second signal.

Subsequently, the user access authority determination unit may confirm that the terminal is located in the first region 4831 using the first reference information of the first beacon data included in the chosen first signal.

In addition, in some embodiments of the present disclosure, the strengths of the signals including the beacon data transmitted to the regions may be different from each other. In this case, the user access authority determination unit may check the position of the terminal on the basis of the strength of the signal received by the terminal.

For example, the first signal transmitted to the region 4831 by the beacon 4810 may have a first strength, and the second signal transmitted to the region 4832 by the beacon 4810 may have a second strength. As an example, the first signal may be smaller than the second signal. When the terminal receives the first signal with the first strength, the user access authority determination unit may confirm that the terminal is located in the first region 4831. When the terminal receives the second signal with the second strength, the user access authority determination unit may confirm that the terminal is located in the second region 4832.

In addition, the third signal transmitted to the region 4833 by the beacon 4810 may have a third strength, and the fourth signal transmitted to the region 4834 by the beacon 4810 may have a fourth strength. In this case, the first to fourth strengths may be different from each other. That is, the transmission power of the first signal, the transmission power of the second signal, the transmission power of the third signal, and the transmission power of the fourth signal may be set to be different from each other in the beacon 4810.

The user access authority determination unit may check whether the strength of the signal received by the terminal corresponds to the first strength, the second strength, the third strength, or the fourth strength and may determine a region corresponding to the strength of the corresponding signal as the region in which the terminal is located.

As described above, the beacon 4810 may use directivity to transmit different beacon data to the different regions 4831 to 4834. Accordingly, the user access authority determination unit may accurately estimate the position of the terminal even when there is one beacon 4810.

Figure 49:
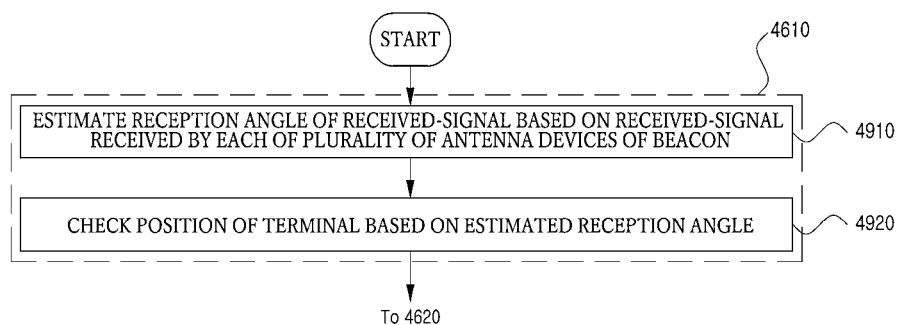
FIG. 49 is a flowchart showing step S4610 of FIG. 46 in further detail according to another embodiment.

FIG. 49 is a flowchart showing step S4610 of FIG. 46 in further detail according to another embodiment.

Referring to FIG. 49, step S4610 may include estimating a reception angle of a signal received by each of a plurality of antenna devices of a beacon on the basis of the received-signal (S4910) and checking a position of a terminal on the basis of the estimated reception angle (S4920). Step S4610 may be performed by the user access authority determination unit.

According to some embodiments of the present disclosure, the step of estimating a reception angle of a signal received by each of a plurality of antenna devices of a beacon on the basis of the received signal (S4910) may be performed.

As shown in (a) and (b) of FIG. 50, a beacon 5010 may be installed in close proximity to a target door 5070. FIG. 50 shows only one beacon 5010, however, the present disclosure is not limited thereto, and there may be two or more beacons.

In an embodiment, the step of measuring a position of a terminal (S4610) may be initiated by the terminal 5020. First, the terminal 5020 may transmit a signal 5030 to the beacon 5010. In this case, the signal 5030 transmitted by the terminal 5020 may or may not have the form of a beam.

In addition, the terminal 5020 may transmit a signal to the beacon 5010 irrespective of acquiring beacon data from the beacon 5010. That is, the terminal 5020 may also transmit the signal 5030 after the terminal 5020 is located within a broadcasting region of the beacon 5010 to acquire a BID from the beacon 5010. The terminal 5020 may also transmit the signal 5030 when the terminal 5020 is located outside the broadcasting region of the beacon 5010, or before the terminal 5020 acquires the BID from the beacon 5010 even though the terminal 5020 is located within the broadcasting region of the beacon 5010.

As shown in (a) of FIG. 50, the beacon may include a plurality of array antenna devices 5011 to 5014. In this case, distances between the plurality of array antenna devices 5011 to 5014 may be the same or different from each other. When the signal 5030 is transmitted to the terminal 5020, the transmitted signal 5030 may have the form of a planar wave and may be received by each of the plurality of array antenna devices 5011 to 5014. In this case, there may be a phase difference between plane waves received by the plurality of array antenna devices 5011 to 5014, and the strengths of the plane waves received by the plurality of array antenna devices 5011 to 5014 may also be different due to the phase difference. The beacon 5010 may measure strengths of the plane waves received by the plurality of array antenna devices 5011 to 5014 and may compare the measured strengths to estimate a reception angle (or a transmission angle) of the transmitted signal 5030. In order to estimate the reception angle (or the transmission angle) of the transmitted signal 5030, a conventional reception angle (or transmission angle) estimation technique may be applied. A detailed description of the reception angle (or transmission angle) estimation technique may unnecessarily obscure the technical spirit of the present disclosure and thus will be omitted herein.

In addition, in some embodiments of the present disclosure, the step of checking the position of the terminal on the basis of the estimated reception angle (S4920) may be performed.

In an embodiment, the user access authority determination unit may check the position of the terminal using the estimated reception angle. For example, when the reception angle of the signal acquired from the terminal 5021 by the beacon 5010 is θ1, the beacon 5010 may prestore position information (e.g., for θ1, a distance between the terminal 5021 and the target door 5070 is 5 meters, and for θ2, a distance between the terminal 5021 and the target door 5070 is 2 meters) corresponding to the estimated reception angle and extract the position of the terminal from the stored position information using the estimated reception angle θ1.

In addition, the user access authority determination unit may use the position of the terminal found on the basis of the estimated reception angle to check whether the terminal is located at an inner side or an outer side with respect to the target door 5070. For example, since the estimated reception angles θ1 and θ4 have similar absolute values and different signs, it may be determined that the terminal is located at the inner side or the outer side with respect to the target door 5070, and also the positions of the terminal 5021 and a terminal 5024 may be distinct from each other.

In addition, the user access authority determination unit may use the position of the terminal confirmed on the basis of the estimated reception angle to determine whether the terminal enters or exits through the target door 5070. For example, when the estimated reception angle is sequentially changed in the order of θ1, θ2, θ3, and θ4, the user access authority determination unit may determine that the terminal enters the inner side from the outer side. In addition, when the estimated reception angle is sequentially changed in the order of θ3, θ2, θ1, the user access authority determination unit may determine that the terminal exits the inner side to the outer side.

In addition, in another embodiment, the user access authority determination unit may check the position of the terminal using information other than the estimated reception angle. For example, when the reception angle of the signal acquired from the terminal 5021 by the beacon 5010 is θ1, the user access authority determination unit may estimate a distance between the beacon and the terminal 5021 or a distance between the terminal 5021 and the target door 5070 in consideration of the reception angle θ1 and a height at which the beacon 501 is installed. As another example, the user access authority determination unit may estimate the position of the terminal using a received-signal strength measured by the terminal and/or transmission power information included in beacon data in response to the reception of the signal from the beacon 4810 in addition to the estimated reception angle θ1. For example, the estimated reception angle θ1 and the estimated reception angle θ2 may have similar values because the beacon 5010 is installed at a relatively high point. In this case, when the terminal 5021 receives a signal from the beacon 5010, the user access authority determination unit may acquire a received-signal strength measured by the terminal and/or transmission power information included in the beacon data from the terminal 5021 in response to the reception of the signal from the beacon 4810, may acquire a distance between the beacon 4810 and the terminal using the acquired received-signal strength and/or transmission power information, and then may check the position of the terminal using the acquired distance between the beacon 4810 and the terminal.

In addition, in an embodiment, the user access authority determination unit may estimate the position of the terminal on the basis of the estimated reception angle and identify the target door 5070 on the basis of the estimated position of the terminal. For example, as described above, the beacon 5010 may acquire the signal 5030 from the terminal 5020 before the terminal 5020 acquires the BID from the beacon 5010. In this case, the user access authority determination unit may identify the target door 5070 on the basis of the estimated position of the terminal. For example, when the beacon that receives the signal from the terminal 5020 is provided in a plurality, the user access authority determination unit may estimate a reception angle on the basis of signals received from the plurality of beacons and may estimate a distance between each of the beacons and the terminal 5020 according to the estimated reception angle. In this case, the user access authority determination unit may select a beacon located closest to the terminal 5020 and may set a door corresponding to the selected beacon as a target door for an access of a user of the terminal 5020.

Of course, when the beacon 5010 acquires the signal 5030 from the terminal 5020 before the terminal 5020 acquires the BID from the beacon 5010, the beacon 5010 may transmit beacon data including the BID to the terminal 5020 in the form of a beam, and the user access authority determination unit may identify the target door using the BID acquired by the terminal 5020.

Figure 51:
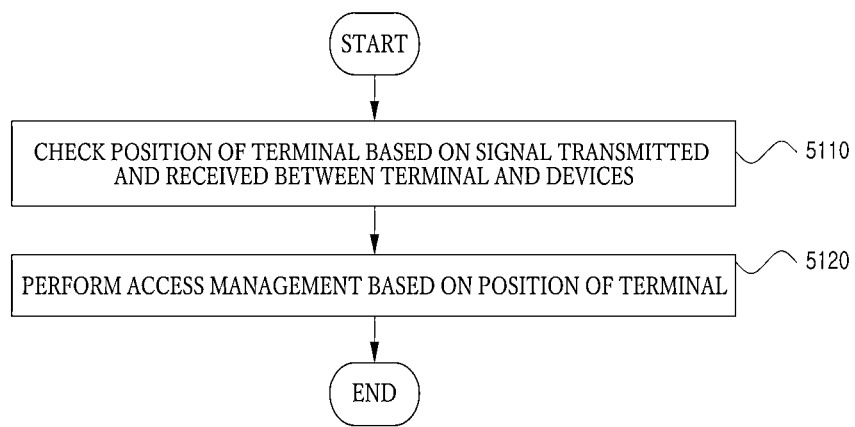
FIG. 51 is a flowchart showing an access management method according to still another embodiment.

FIG. 51 is a flowchart showing an access management method according to still another embodiment.

Referring to FIG. 51, the access management method according to some embodiments of the present disclosure may include checking a position of a terminal on the basis of a signal transmitted and received between a terminal and devices (S5110) and performing access management on the basis of the position of the terminal (S5120). The steps of the access management method will be described below in further detail.

According to some embodiments of the present disclosure, steps S5110 and S5120 are performed by the above-described user access authority determination unit. In addition, the user access authority determination unit may be implemented in a beacon, a terminal, a server, or at least one of devices. Accordingly, steps S5110 and S5120 may also be performed by the beacon, the terminal, the server, or at least one of the devices. In addition, step S5110 may be performed by one of the beacon, the terminal, the server, and the devices, and step S5120 may be performed by another one of the beacon, the terminal, the server, and the devices.

In addition, each of the above-described devices may be an apparatus that transmits a signal to the terminal or receives a signal from the terminal. The device may be the above-described beacon or an apparatus independent from the beacon. One of the devices may be the beacon, and the remaining devices may be apparatuses independent from the beacon. In addition, the devices may transmit a signal to the terminal in the form of a beam using the beamforming technique and may receive a signal from the terminal in the form of a beam. For example, the devices may include a plurality of array antenna devices, and may transmit and receive a signal in the form of a beam using the plurality of array antenna devices. However, the present disclosure is not limited thereto, and thus the devices may also transmit and receive a signal in a form other than a beam.

According to some embodiments of the present disclosure, the step of checking a position of a terminal on the basis of a signal transmitted and received between a terminal and devices (S5110) may be performed.

The user access authority determination unit may apply triangulation to the signal transmitted and received between the terminal and the devices to measure distances between the terminal and the devices or a distance between a target door and the terminal. In an embodiment, the devices may be preset to correspond to the target door.

Figure 52:
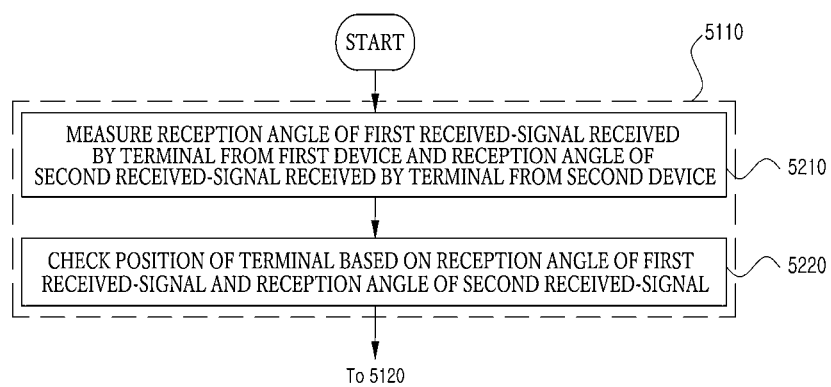
FIG. 52 is a flowchart showing step S5110 of FIG. 51 in further detail according to an embodiment.
Figure 53:
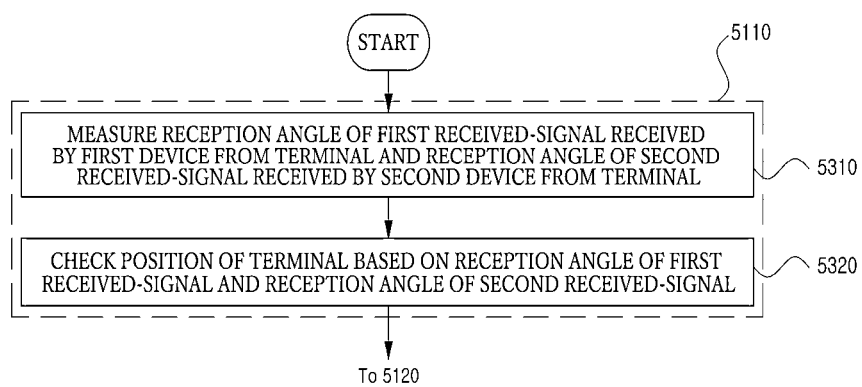
FIG. 53 is a flowchart showing step S5110 of FIG. 51 in further detail according to another embodiment.

Generally, triangulation is used to measure a distance from a target apparatus using an arrival time or a strength of a signal transmitted and received among the target apparatus and two transceiving devices. However, the present disclosure does not use an arrival time or a strength of a transmitted or received signal. The present disclosure may measure the distances between the terminal and the devices or the distance between the target door and the terminal by applying triangulation to a direction of the transmitted or received signal (e.g., a reception angle of the transmitted or received signal). FIGS. 51 to 53 will be described below with reference to FIG. 54.

Figure 54:
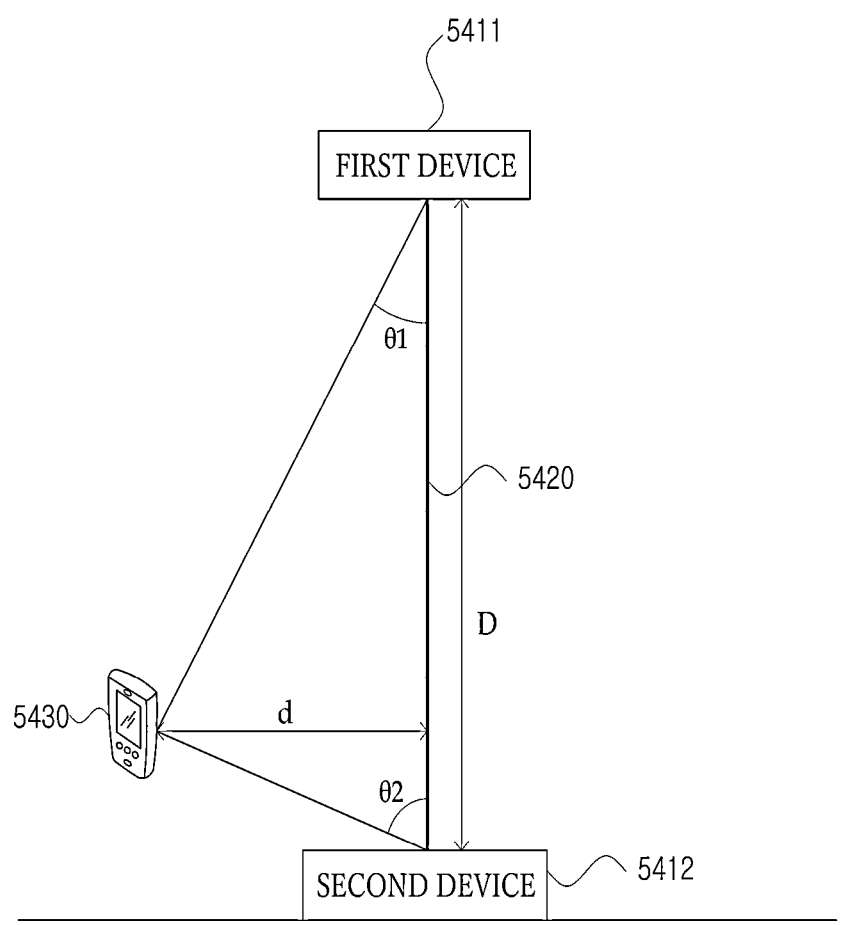
FIG. 54 is a diagram for describing measurement of a position of a terminal according to still another embodiment.

For example, referring to FIG. 54, a first device 5411 and a second device 5412 may be installed above or below the target door. FIG. 54 shows that the first device 5411 is installed on the top of the target door 5420, and the second device 5412 is installed on the bottom of the target door 5420. However, the present disclosure is not limited thereto, and the first device 5411 and the second device 5412 may be installed at the center of the target door 5420. In addition, a beacon is not shown in FIG. 54, but a beacon may be installed in the vicinity of the target door 5420. In addition, the beacon may be at least one of the first device 5411 and the second device 5412.

In FIG. 54, the first device 5411 and the second device 5412 may transmit and receive a signal to and from a terminal 5430. In order to check a direction of the signal transmitted and received between the terminal 5430 and the first device 5411, the user access authority determination unit may acquire a transmission and reception angle θ1 of a signal transmitted and received between the terminal 5430 and the first device 5411 and a transmission and reception angle θ2 of a signal transmitted and received between the terminal 5430 and the second device 5412. In addition, the user access authority determination unit may check a distance D between the first device 5411 and the second device 5412. For example, the distance D may be preset and may be measured in response to the transmission and reception of a signal between the first device 5411 and the second device 5412. A distance d between the terminal 5430 and the target door 5420 may be derived from Equation 1 below:

$$d = \frac{D}{\cos\theta 1 + \cos\theta 2}$$ [Equation 1]

In an embodiment, the step of checking a position of a terminal on the basis of the signal transmitted and received between the terminal and the devices (S5110) may be initiated by the devices or the terminal. A case in which step S5110 is initiated by the devices will be described with reference to FIG. 52, and a case in which step S5110 is initiated by the terminal will be described with reference to FIG. 53.

In addition, according to some embodiments of the present disclosure, the step of performing access management based on the measured position of the terminal (S5120) may be performed. That is, step S5120 refers to applying the position of the terminal measured in step S5110 to the access control in the above-described access management system, the access authentication process determination method, the abnormal access processing method, the door control method, the beacon control method, the security mode management, or the method of registering a user of an unregistered terminal.

The description of step S4620 may be applied to step S5120, and thus a detailed description thereof will be omitted.

FIG. 52 is a flowchart showing step S5110 of FIG. 51 in further detail according to an embodiment.

Referring to FIG. 52, step S5110 may include measuring a reception angle of a first received-signal received by a terminal from a first device and a reception angle of a second received-signal received by the terminal from a second device (S5210) and checking a position of the terminal on the basis of the reception angle of the first received-signal and the reception angle of the second received-signal (S5220). Step S5110 may be performed by the user access authority determination unit.

In some embodiments of the present disclosure, the step of measuring a reception angle of a first received-signal received by a terminal from a first device and a reception angle of a second received-signal received by the terminal from a second device (S5210) may be performed.

In an embodiment, step S5210 may be initiated by a beacon. Referring to FIG. 54, first, as described above, the first device 5411 and the second device 5412 may transmit signals to the terminal 5430. In this case, the first device 5411 and the second device 5412 may transmit signals to the terminal 5430 in the form of a beam or in a form other than a beam. When the first device 5411 and the second device 5412 transmit the signals to the terminal 5430 in the form of a beam, the first device 5411 and the second device 5412 may steer the beam toward a predetermined plurality of regions (that is, beam steering) and sequentially transmit the signals to the regions.

In addition, the first device 5411 and the second device 5412 may broadcast the signals within a predetermined broadcasting range and may transmit the signals to the specified terminal 5430. In addition, when at least one of the first device 5411 and the second device 5412 is a beacon, the beacon may transmit a signal composed of beacon data including a BID to the terminal 5430. In addition, when at least one of the first device 5411 and the second device 5412 is not a beacon, the at least one device may transmit a signal composed of data other than the beacon data to the terminal 5430.

In an embodiment, the terminal 5430 may distinguish the first received-signal received from the first device 5411 and the second received-signal received from the second device 5412 and may estimate a reception angle of the first received-signal and a reception angle of the second received-signal. As an example, the terminal 5430 may include a plurality of array antenna devices, and the plurality of array antenna devices may receive planar waves of the first received-signal. In this case, there may be a phase difference between the planar waves received by the plurality of array antenna devices, and the strengths of the planar waves received by the plurality of array antenna devices may also be different due to the phase difference. The terminal 5430 may measure the strengths of the planar waves of the first received-signals received by the plurality of array antenna devices and may compare the measured strengths to estimate the reception angle of the first received-signal. The reception angle of the second received-signal may also be estimated in the same manner.

In addition, the first device 5411 and the second device 5412 may extract transmission angles of the signals transmitted to the terminal 5430. For example, when the first device 5411 and the second device 5412 transmit the signals through the above-described beam steering, the first device 5411 and the second device 5412 may extract transmission angles that are determined during beam steering. In order to estimate the reception angles (or transmission angles) of the first and second received-signals, a conventional reception angle (or transmission angle) estimation technique may be applied. A detailed description of the reception angle (or transmission angle) estimation technique may unnecessarily obscure the technical spirit of the present disclosure and thus will be omitted herein.

In addition, in some embodiments of the present disclosure, the step of checking a position of the terminal on the basis of the reception angle of the first received-signal and the reception angle of the second received-signal (S5220) may be performed.

In an embodiment, the user access authority determination unit may acquire the estimated reception angle of the first received-signal and the estimated reception angle of the second received-signal from the terminal 5430. For example, when the user access authority determination unit is included in the terminal 5430, the user access authority determination unit may extract the reception angle of the first received-signal and the reception angle of the second received-signal without acquiring information from an external device. In addition, when the user access authority determination unit is included in the first device 5411, the second device 5412, or a server, the user access authority determination unit may acquire the reception angle of the first received-signal and the reception angle of the second received-signal from the terminal 5430.

In another embodiment, the user access authority determination unit may acquire the transmission angle of the first received-signal and the transmission angle of the second received-signal from the first device 5411 and the second device 5412, respectively. For example, when the user access authority determination unit is included in the first device 5411 and the second device 5412, the user access authority determination unit may transmit the transmission angle of the first received-signal and the transmission angle of the second received-signal without acquiring information from an external device. As another example, when the user access authority determination unit is included in the beacon, the terminal 5430, or a server rather than the first device 5411 and the second device 5412, the user access authority determination unit may acquire the transmission angle of the first received-signal and the transmission angle of the second received-signal from the first device 5411 and the second device 5412, respectively.

In addition, the user access authority determination unit may check the distance D between the first device 5411 and the second device 5412, and may check the distance d between the terminal 5430 and the target door 5420 by applying the reception angle (or the transmission angle) of the first received-signal and the reception angle (or the transmission angle) of the second received-signal, in addition to the distance D, to the above-described Equation 1.

In addition, in another embodiment, the user access authority determination unit may acquire a received-signal strength of a signal received by the terminal 5430 and/or transmission power information included in the signal, may acquire a distance between the terminal and the first device 5411 and/or the second device 5412 using the acquired received-signal strength and transmission power information, and may measure the position of the terminal using the distance between the terminal and the first device 5411 and/or the second device 5412 and the distance d.

As described above, the terminal may check the position of the terminal using the received-signals that are received from two or more devices, thus measuring the position of the terminal without additional information, increasing convenience, and enhancing measurement accuracy.

FIG. 53 is a flowchart showing step S5110 of FIG. 51 in further detail according to another embodiment.

Referring to FIG. 53, step S5110 may include measuring a reception angle of a first received-signal received by a first device from a terminal and a reception angle of a second received-signal received by a second device from the terminal (S5310) and checking a position of the terminal on the basis of the reception angle of the first received-signal and the reception angle of the second received-signal (S5320). Step S5110 may be performed by the user access authority determination unit. In some embodiments of the present disclosure, the step of measuring a reception angle of a first received-signal received by a first device from a terminal and a reception angle of a second received-signal received by a second device from the terminal (S5310) may be initiated.

In an embodiment, step S5310 may be initiated by a beacon. Referring to FIG. 54, first, as described above, the terminal 5430 may transmit signals to the first device 5411 and the second device 5412. In this case, the terminal 5430 may transmit the signals to the first device 5411 and the second device 5412 in the form of a beam or in a form other than a beam.

In addition, the terminal 5430 may transmit the signals to the first device 5411 and the second device 5412 irrespective of acquiring beacon data from the beacon. That is, the terminal 5430 may transmit the signals to the first device 5411 and the second device 5412 after the terminal 5430 is located within a broadcasting region of the beacon to acquire a BID from the beacon. The terminal 5430 may also transmit the signals to the first device 5411 and the second device 5412 when the terminal 5430 is located outside the broadcasting region of the beacon or before the terminal 5430 acquires the BID from the beacon even though the terminal 5430 is located within the broadcasting region of the beacon.

In an embodiment, as described above, the first device 5411 and the second device 5412 may compare strengths of planar waves received by the plurality of array antenna devices to estimate the reception angle of the first received-signal and the reception angle of the second received-signal.

In another embodiment, the terminal 5430 may extract a transmission angle of the signal transmitted to the first device 5411 and a transmission angle of the signal transmitted to the second device 5412. In order to estimate the reception angles (or the transmission angles) of the first and second received-signals, a conventional reception angle (or transmission angle) estimation technique may be applied. A detailed description of the reception angle (or transmission angle) estimation technique may unnecessarily obscure the technical spirit of the present disclosure and thus will be omitted herein.

In addition, in some embodiments of the present disclosure, the step of checking the position of the terminal on the basis of the reception angle of the first received-signal and the reception angle of the second received-signal (S5320) may be performed.

In an embodiment, the user access authority determination unit may acquire the estimated reception angle of the first received-signal and the estimated reception angle of the second received-signal from the first device 5411 and the second device 5412, respectively. For example, when the user access authority determination unit is included in the first device 5411 and the second device 5412, the user access authority determination unit may extract the reception angle of the first received-signal and the reception angle of the second received-signal without acquiring information from an external device. In addition, when the user access authority determination unit is included in the terminal 5430 or a server, the user access authority determination unit may acquire the reception angle of the first received-signal and the reception angle of the second received-signal from the first device 5411 and the second device 5412, respectively.

In another embodiment, the user access authority determination unit may acquire the transmission angle of the signal transmitted to the first device 5411 and the transmission angle of the signal transmitted to the second device 5412 from the terminal 5430. For example, when the user access authority determination unit is included in the terminal 5430, the user access authority determination unit may transmit the transmission angle of the first received-signal and the transmission angle of the second received-signal without acquiring information from an external device. As another example, when the user access authority determination unit is included in the first device 5411 and the second device 5412 or the server, the user access authority determination unit may acquire the transmission angle of the first received-signal and the transmission angle of the second received-signal from the terminal 5430.

In addition, the user access authority determination unit may check the distance D between the first device 5411 and the second device 5412, and may check the distance d between the terminal 5430 and the target door 5420 by applying the reception angle (or the transmission angle) of the first received-signal and the reception angle (or the transmission angle) of the second received-signal, in addition to the distance D, to the above-described Equation 1.

In addition, in another embodiment, as described above in step S5210, the user access authority determination unit may measure the position of the terminal using a received-signal strength of a signal received by the terminal 5430 and/or transmission power information included in the signal.

As described above, two or more devices may check the position of the terminal using the received-signals that are received from the terminal, thus measuring the position of the terminal without additional information, increasing convenience, and enhancing measurement accuracy.

According to the present disclosure, it is possible to allow a user to access a door more conveniently by performing access authentication using a terminal that is usually carried by the user without a separate authentication means.

According to the present disclosure, it is also possible to increase convenience of the user and security of the access management system by performing user authentication using a terminal that is usually carried by the user.

According to the present disclosure, it is possible to implement the access management system using a device that is previously installed, and thus to save an establishment cost of the access management system.

According to the present disclosure, it is possible to allow the user conveniently access a door by separately performing access authentication when the user moves from an outer side to an inner side through the door and when the user moves from the inner side to the outer side through the door.

According to the present disclosure, it is possible to enhance security of the access management system by managing a user who has abnormally accessed the door.

According to the present disclosure, it is possible to allow the user to perform access authentication conveniently by performing post-authentication of abnormal access using a terminal that is carried by the user who abnormally accessed the door.

According to the present disclosure, it is possible to increase user convenience by adjusting a door opening time by periodically outputting an unlock command without replacing an existing locking unit.

According to the present disclosure, it is possible to adjust battery consumption of the beacon by adjusting a beacon parameter according to an ambient environment of the beacon.

According to the present disclosure, it is possible to increase security of the access management system by setting an operation mode to a security mode and managing users who abnormally leave the entire security zone when everyone leaves the entire security zone.

According to the present disclosure, it is possible to enhance security of the access management system by registering an unregistered terminal under the management of a manager terminal to block a user having no registration authority from being registered in the access management system.

According to the present disclosure, it is possible to enhance user convenience and security of the access management system by accurately measuring a position of a terminal.

The method according to an embodiment may be implemented as program instructions executable by a variety of computers and recorded on a computer-readable medium. The computer-readable recording medium may include a program instruction, a data file, a data structure, or a combination thereof. The program instruction recorded on the recording medium may be designed and configured specifically for an embodiment or can be publicly known and available to those who are skilled in the field of computer software. Examples of the computer-readable medium include a magnetic medium, such as a hard disk, a floppy disk, and a magnetic tape, an optical medium, such as a compact disk read-only memory (CD-ROM), a digital versatile disk (DVD), etc., a magneto-optical medium such as a floptical disk, and a hardware device specially configured to store and perform program instructions, for example, a ROM, random access memory (RAM), flash memory, etc. Examples of the program instruction include not only machine code generated by a compiler or the like but also high-level language codes that may be executed by a computer using an interpreter or the like. The above exemplary hardware device may be configured to operate as one or more software modules in order to perform the operation of an embodiment, and vice versa.

Although the present disclosure has been described with reference to specific embodiments and features, it should be appreciated that various variations and modifications may be made from the disclosure by those skilled in the art. For example, suitable results may be achieved if the described techniques are performed in a different order and/or if components in a described system, architecture, device, or circuit are combined in a different manner and/or replaced or supplemented by other components or their equivalents.

Accordingly, other implementations, embodiments, and equivalents are within the scope of the following claims.

What is claimed is:

1. An access control method of a control unit, wherein the control unit determines whether a user has authority to access a target device corresponding to first device when a terminal carried by the user is located in a predetermined range, wherein the terminal is configured to obtain signals emitted by the first device, and wherein the first device comprises first antenna and second antenna, the access control method comprising:
    obtaining an angle of departure of the signals at the first device based on a phase difference in first and second signals, wherein the first signal is emitted by the first antenna and the second signal is emitted by the second antenna, and wherein a terminal antenna of the terminal configured to receive the first and second signals when the terminal receives the signals from the first antenna and the second antenna;
    determining whether the terminal is located in the predetermined range based on the angle of departure; and performing authentication of the user as authorized to access the target device based on the terminal being located in the predetermined range.

2. The access control method of claim 1, wherein the phase difference is based on a predetermined distance between the first antenna and the second antenna.

3. The access control method of claim 1, wherein the determining whether the terminal is located in the predetermined range comprises:
  determining a distance between the terminal and the first device, or a distance between the terminal and the target device, based on the angle of departure; and
  determining the terminal is located in the predetermined range when the distance between the terminal and the first device is shorter than first predetermined distance or the distance between the terminal and the target device is shorter than second predetermined distance.

4. The access control method of claim 3, wherein the determining a distance between the terminal and the first device or a distance between the terminal and the target device comprises:
  obtaining the distance between the terminal and the first device or the distance between the terminal and the target device, based on the angle of departure and a distance between a predetermined first position and the first device.

5. The access control method of claim 3, wherein the determining a distance between the terminal and the first device or a distance between the terminal and the target device comprises:
  obtaining the distance between the terminal and the first device or the distance between the terminal and the target device, based on the angle of departure and a received-signal strength relative to the signals being measured by the terminal.

6. The access control method of claim 1, wherein the control unit is included in the first device, the terminal or the target device.

7. The access control method of claim 1, wherein the target device includes the first device.

8. The access control method of claim 1, wherein the target device is door operating device for opening and closing a door, and wherein when a result of the authentication comprises that the user has authority to access the door, the door is opened by the target device.

9. The access control method of claim 8, wherein the determining whether the terminal is located in the predetermined range comprising determining whether the terminal is located in first range outside of the door or second range inside of the door based on the angle of departure.

10. The access control method of claim 8, wherein the performing authentication of the user as authorized to access the target device based on the terminal being located in the predetermined range comprising performing the authentication of the user based on whether the terminal is located in the first range or the second range.

11. The access control method of claim 1, wherein the target device is operation mode activation device for activating operation mode, and wherein when a result of the authentication comprises that the user has authority to activate the operation mode, the operation mode is activated by the target device.

12. The access control method of claim 1, wherein the signals are based on at least one of Bluetooth communication protocol, BLE (Bluetooth Low Energy) communication protocol or UWB (Ultra WideBand) communication protocol.

13. An access control method of a control unit, wherein the control unit determines whether a user has authority to access a target device corresponding to first device when a terminal carried by the user is located in a predetermined range, wherein the first device is configured to obtain a terminal signal emitted by the terminal, and wherein the first device comprises first antenna and second antenna, the access control method comprising:
  obtaining an angle of arrival of the terminal signal at the first device based on a phase difference in the terminal signal arriving at the first antenna and the second antenna;
  determining whether the terminal is located in the predetermined range based on the angle of arrival; and
  performing authentication of the user as authorized to access the target device based on the terminal being located in the predetermined range.

14. The access control method of claim 13, wherein the phase difference is based on a predetermined distance between the first antenna and the second antenna.

15. The access control method of claim 13, wherein the determining whether the terminal is located in the predetermined range comprises:
  determining a distance between the terminal and the first device, or a distance between the terminal and the target device, based on the angle of arrival; and
  determining the terminal is located in the predetermined range when the distance between the terminal and the first device is shorter than first predetermined distance or the distance between the terminal and the target device is shorter than second predetermined distance.

16. The access control method of claim 15, wherein the determining a distance between the terminal and the first device or a distance between the terminal and the target device comprises:
  obtaining the distance between the terminal and the first device or the distance between the terminal and the target device, based on the angle of arrival and a distance between a predetermined first position and the first device.

17. The access control method of claim 15, wherein the determining a distance between the terminal and the first device or a distance between the terminal and the target device comprises:
  obtaining the distance between the terminal and the first device or the distance between the terminal and the target device, based on the angle of arrival and a received-signal strength relative to signals being measured by the terminal.

18. The access control method of claim 13, wherein the control unit is included in the first device, the terminal or the target device.

19. The access control method of claim 13, wherein the target device includes the first device.

20. The access control method of claim 13, wherein the target device is door operating device for opening and closing a door, and wherein when a result of the authentication comprises that the user has authority to access the door, the door is opened by the target device.

21. The access control method of claim 20, wherein the determining whether the terminal is located in the predetermined range comprising determining whether the terminal is located in first range outside of the door or second range inside of the door based on the angle of arrival.

22. The access control method of claim 21, wherein the performing authentication of the user as authorized to access the target device based on the terminal being located in the predetermined range comprising performing the authentication of the user based on whether the terminal is located in the first range or the second range.

23. The access control method of claim 13, wherein the target device is operation mode activation device for activating operation mode, and wherein when a result of the authentication comprises that the user has authority to activate the operation mode, the operation mode is activated by the target device.

24. The access control method of claim 13, wherein the terminal signal is based on at least one of Bluetooth communication protocol, BLE (Bluetooth Low Energy) communication protocol or UWB (Ultra WideBand) communication protocol.

25. An access control method of a control unit, wherein the control unit determines whether a user has authority to access a target device, wherein first device comprises first antenna and second antenna, and wherein second device is configured to obtain signals emitted by the first device, the access control method comprising:
 obtaining an angle of departure of the signals at the first device based on a phase difference in first and second signals, wherein the first signal is emitted by the first antenna and the second signal is emitted by the second antenna, and wherein third antenna of the second device is configured to receive the first and second signals when the second device receives the signals from the first antenna and the second antenna;
 determining whether the second device is located in a predetermined range based on the angle of departure; and
 performing authentication of the user as authorized to access the target device based on the second device being located in the predetermined range.

26. The access control method of claim 25, wherein the control unit is included in the first device or the second device.

27. The access control method of claim 25, wherein the signals are based on at least one of Bluetooth communication protocol, BLE (Bluetooth Low Energy) communication protocol or UWB (Ultra WideBand) communication protocol.

28. An access control method of a control unit, wherein the control unit determines whether a user has authority to access a target device, wherein first device comprises first antenna and second antenna and wherein the first device is configured to obtain signal emitted by second device, the access control method comprising:
 obtaining an angle of arrival of the signal at the first device based on a phase difference in the signal arriving at the first antenna and the second antenna;
 determining whether the second device is located in a predetermined range based on the angle of arrival; and
 performing authentication of the user as authorized to access the target device based on the second device being located in the predetermined range.

29. The access control method of claim 28, wherein the control unit is included in the first device or the second device.

30. The access control method of claim 28, wherein the signal is based on at least one of Bluetooth communication protocol, BLE (Bluetooth Low Energy) communication protocol or UWB (Ultra WideBand) communication protocol.

31. A non-transitory computer-readable recording medium having recorded thereon a program for performing the method of claim 1.

32. A non-transitory computer-readable recording medium having recorded thereon a program for performing the method of claim 13.

33. A non-transitory computer-readable recording medium having recorded thereon a program for performing the method of claim 25.

34. A non-transitory computer-readable recording medium having recorded thereon a program for performing the method of claim 28.

* * * * *